United States Patent
Zhang et al.

(10) Patent No.: US 10,472,571 B2
(45) Date of Patent: Nov. 12, 2019

(54) LOW FLAMMABILITY ELECTROLYTES FOR STABLE OPERATION OF ELECTROCHEMICAL DEVICES

(71) Applicant: Battelle Memorial Institute, Richland, WA (US)

(72) Inventors: Ji-Guang Zhang, Richland, WA (US); Shuru Chen, Richland, WA (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 106 days.

(21) Appl. No.: 15/788,188

(22) Filed: Oct. 19, 2017

(65) Prior Publication Data

US 2018/0251681 A1 Sep. 6, 2018

Related U.S. Application Data

(63) Continuation-in-part of application No. PCT/US2017/033391, filed on May 18, 2017, and a
(Continued)

(51) Int. Cl.
*C09K 21/12* (2006.01)
*H01M 10/05* (2010.01)
(Continued)

(52) U.S. Cl.
CPC ............ *C09K 21/12* (2013.01); *H01M 4/405* (2013.01); *H01M 10/056* (2013.01); *H01M 2004/8684* (2013.01); *H01M 2300/0028* (2013.01)

(58) Field of Classification Search
None
See application file for complete search history.

(56) References Cited

U.S. PATENT DOCUMENTS

| 4,086,403 | A | 4/1978 | Whittingham et al. |
| 2007/0243470 | A1* | 10/2007 | Yamamoto ........ H01M 10/0567 429/326 |

(Continued)

FOREIGN PATENT DOCUMENTS

WO  WO 2015/158755 A1  10/2015

OTHER PUBLICATIONS

International Search Report and Written Opinion issued for PCT Patent Application No. PCT/US2018/049141, dated Jan. 2, 2019, 9 pp.

(Continued)

*Primary Examiner* — Scott J. Chmielecki
(74) *Attorney, Agent, or Firm* — Klarquist Sparkman, LLP

(57) ABSTRACT

Low flammability and nonflammable localized superconcentrated electrolytes (LSEs) for stable operation of electrochemical devices, such as rechargeable batteries, supercapacitors, and sensors, are disclosed. Electrochemical devices, such as rechargeable batteries, supercapacitors, and sensors, including the low flammability and nonflammable LSEs are also disclosed. The low flammability and nonflammable LSEs include an active salt, a solvent comprising a flame retardant compound, wherein the active salt is soluble in the solvent, and a diluent in which the active salt is insoluble or poorly soluble. In certain embodiments, such as when the solvent and diluent are immiscible, the LSE further includes a bridge solvent.

19 Claims, 48 Drawing Sheets
(41 of 48 Drawing Sheet(s) Filed in Color)

Related U.S. Application Data continuation-in-part of application No. 15/599,298, filed on May 18, 2017, now Pat. No. 10,367,232.

(60) Provisional application No. 62/466,267, filed on Mar. 2, 2017.

(51) Int. Cl.
*H01M 4/40* (2006.01)
*H01M 10/056* (2010.01)
*H01M 4/86* (2006.01)

(56) References Cited

U.S. PATENT DOCUMENTS

| | | | |
|---|---|---|---|
| 2010/0209782 A1 | 8/2010 | Choi et al. | |
| 2011/0111308 A1 | 5/2011 | Halalay et al. | |
| 2012/0141883 A1 | 6/2012 | Smart et al. | |
| 2014/0125292 A1 | 5/2014 | Best et al. | |
| 2014/0342249 A1 | 11/2014 | Jang et al. | |
| 2015/0364801 A1* | 12/2015 | Wijaya | H01M 4/133 429/403 |
| 2016/0020489 A1 | 1/2016 | Rhodes et al. | |
| 2016/0240896 A1 | 8/2016 | Zhang et al. | |
| 2016/0254567 A1* | 9/2016 | Cai | H01M 10/052 429/306 |
| 2016/0380314 A1* | 12/2016 | Yang | H01M 2/1653 429/231.95 |
| 2018/0251681 A1* | 9/2018 | Zhang | H01M 10/052 |
| 2018/0254524 A1* | 9/2018 | Zhang | H01M 10/0569 |
| 2019/0123390 A1* | 4/2019 | Xu | H01M 10/0569 |
| 2019/0140322 A1* | 5/2019 | Ren | H01M 10/0569 |
| 2019/0148775 A1* | 5/2019 | Zhang | H01M 10/0569 |

OTHER PUBLICATIONS

Ding et al., "Effects of carbonate solvents and lithium salts on morphology and coulombic efficiency of lithium electrode," *Journal of the Electrochemical Society* (Sep. 4, 2013) 160(10): A1894-A1901.

Doi, et al., "Dilution of highly concentrated $LiBF_4$-propylene carbonate electrolyte solution with fluoroalkyl ethers for 5-V $LiNi_{0.5}Mn_{1.5}O_4$ positive electrodes," *Journal of the Electrochemical Society*, (Jan. 24, 2017) 164(1): A6412-A6416.

Dokko et al., "Solvate ionic liquid electrolyte for Li-S batteries," *Journal of the Electrochemical Society*, (Jun. 6, 2013) 160: A1304-A1310.

Hyung et al., "Flame-retardant additives for lithium-ion batteries," *Journal of Power Sources* (2003) 119-121 383-387.

Lee et al., "A novel flame-retardant additive for lithium batteries," *Electrochemical and Solid-State Letters*, (Dec. 16, 1999) 3(2): 63-65.

Matsumoto et al., "A highly safe battery with a non-flammable triethyl-phosphate-based electrolyte," *Journal of Power Sources* (Oct. 2, 2014) 273: 954-958.

Qian et al., "High rate and stable cycling of lithium metal anodes," *Nature Communications* (Feb. 20, 2015), pp. 1-9.

Shiga et al., "Self-extinguishing electrolytes using fluorinated alkyl phosphates for lithium batteries," *Journal of Materials Chemistry A* (Feb. 8, 2017) 5: 5156-5162.

Shigematsu et al., "Thermal behavior of charged graphite and $LixCoO_2$ in electrolytes containing alkyl phosphate for lithium-ion cells," *Journal of the Electrochemical Society* (Jan. 9, 2009) 156(3): A176-A180.

Shim et al., "Electrochemical performance of lithium-ion batteries with triphenylphosphate as a flame-retardant additive," *Journal of Power Sources* (May 10, 2007) 172: 919-924.

Smart et al., "The evaluation of triphenyl phosphate as a flame retardant additive to improve the safety of lithium-ion battery electrolytes," *ECS Transactions* (2011) 35(13): 1-11.

Smith et al., "Lithium-ion electrolytes containing flame-retardant additives for increased safety characteristics," *ECS Transactions* (2009) 16(35): 33-41.

Suo et al., "'Water-in-salt' electrolyte enables high-voltage aqueous lithium-ion chemistries," *Science* (Nov. 20, 2015) 350(6263): 938-944.

Wang et al., "Nonflammable trimethyl phosphate solvent-containing electrolytes for lithium-ion batteries: I. Fundamental properties," *Journal of the Electrochemical Society*, (Aug. 24, 2001) 148(10): A1058-A1065.

Wang et al., "Nonflammable trimethyl phosphate solvent-containing electrolytes for lithium-ion Bbatteries: II, The use of an amorphous carbon anode," *Journal of the Electrochemical Society*, (Aug. 24, 2001) 148(10): A1066-A1071.

Wang et al., "Superconcentrated electrolytes for a high-voltage lithium-ion battery," *Nature Communications*, (Jun. 29, 2016) 12032: 1-9.

Xiang et al., "Dimethyl methylphosphonate (DMMP) as an efficient flame retardant additive for the lithium-ion battery electrolytes," *Journal of Power Sources* (May 6, 2007) 173: 562-564.

Xu et al., "An attempt to formulate nonflammable lithium ion electrolytes with alkyl phosphates and phosphazenes," *Journal of the Electrochemical Society* (Apr. 2, 2002) 149(5): A622-A626.

Xu et al., "Lithium metal anodes for rechargeable batteries," *Energy & Environmental Science* (2014) 7:513-537.

Xu et al., "Nonflammable electrolytes for Li-ion batteries based on a fluorinated phosphate," *Journal of the Electrochemical Society* (Jul. 2, 2002) 149(8): A1079-1082.

Yamada et al., "Review—Superconcentrated electrolytes for lithium batteries,"*Journal of the Electrochemical Society* (Oct. 9, 2015) 162(14): A2406-A2423.

Yao et al., "Comparative study of trimethyl phosphite and trimethyl phosphate as electrolyte additives in lithium ion batteries," *Journal of Power Sources* (2005) 144: 170-175.

Zhang, "Li metal anodes and Li metal batteries," presented at *The 3rd International Forum on Cathode & Anode Materials for Advanced Batteries*, Apr. 14-15, 2017, 21 pp.

Zhang et al., "Tris (2,2,2-trifluoroethyl) phosphite as a co-solvent for nonflammable electrolytes in Li-ion batteries," *Journal of Power Sources* (2003) 113: 166-172.

Zheng et al., "Electrolyte additive enabled fast charging and stable cycling lithium metal batteries," *Nature Energy* (Feb. 27, 2017) 2:1-8.

International Search Report and Written Opinion issued for PCT Patent Application No. PCT/US2017/033391, dated Nov. 27, 2017, 14 pp.

\* cited by examiner

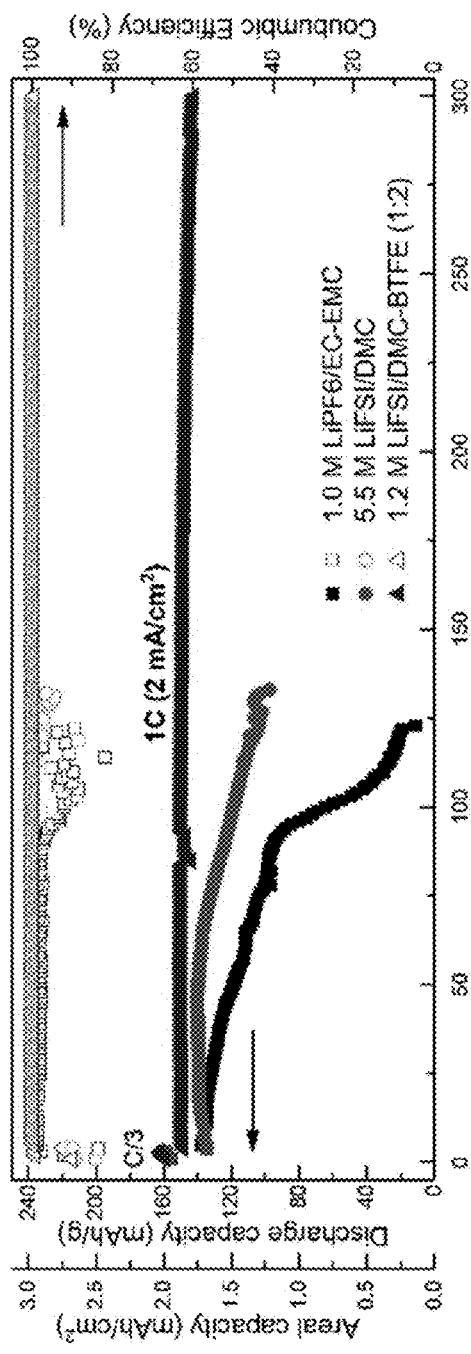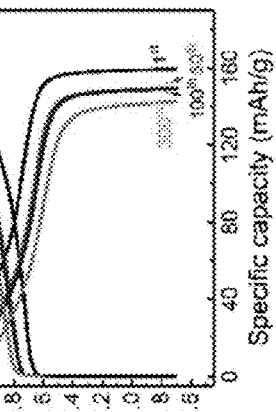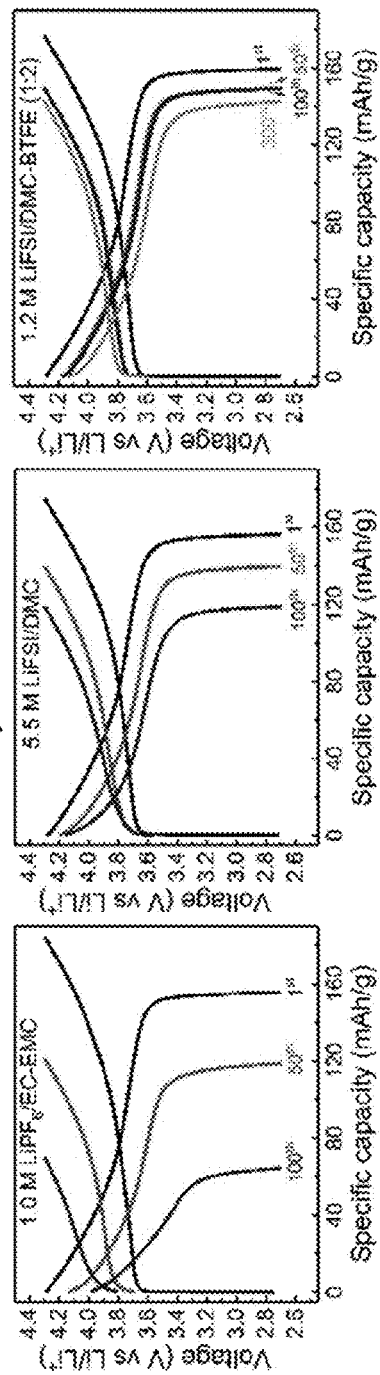
FIG. 18A
FIG. 18B
FIG. 18C
FIG. 18D

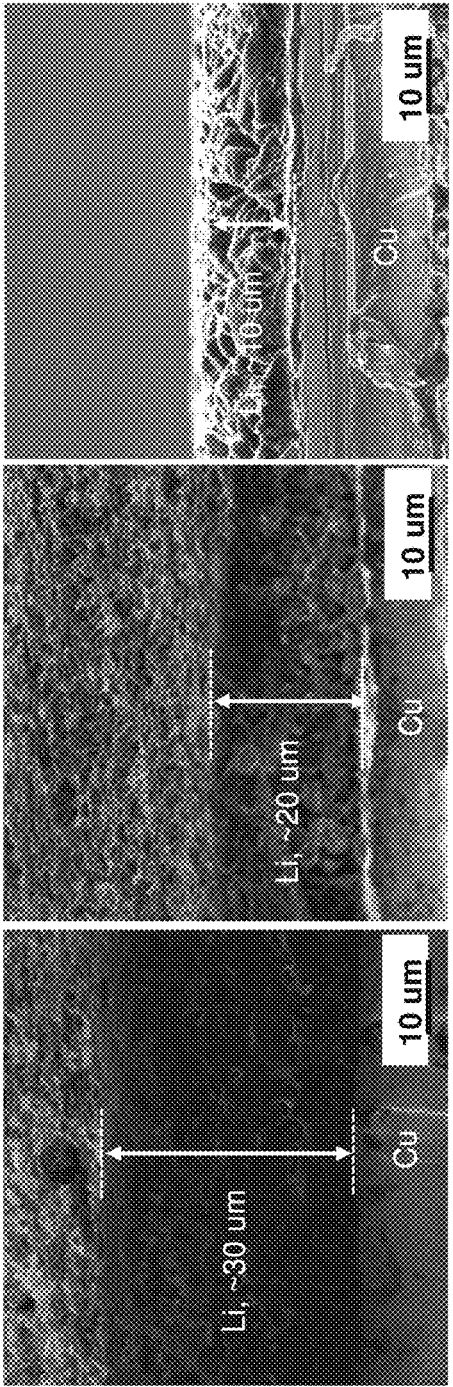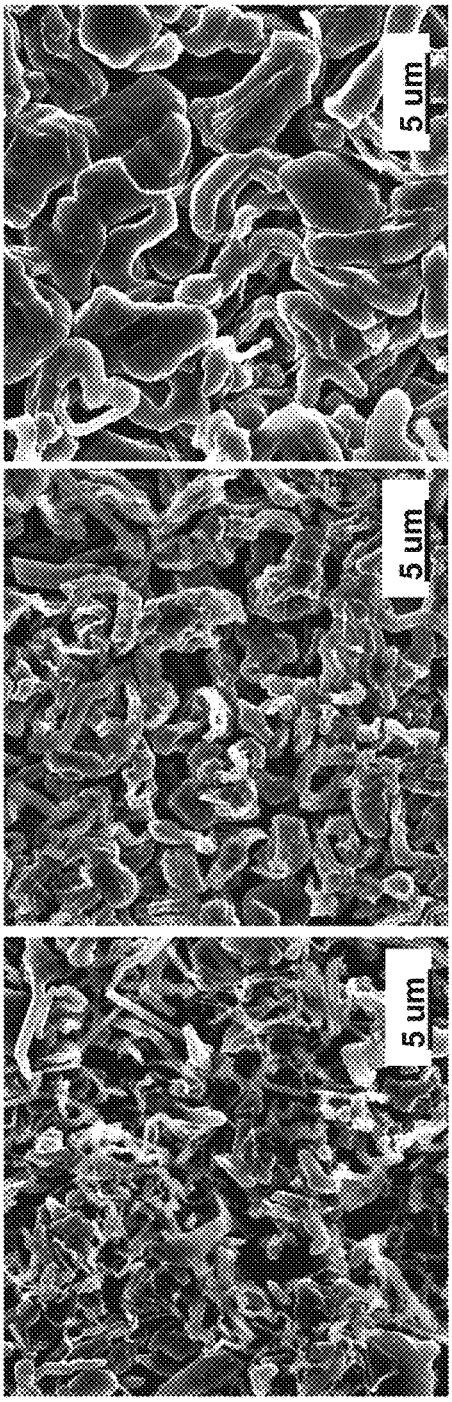
FIG. 21A FIG. 21B FIG. 21C FIG. 21D FIG. 21E FIG. 21F

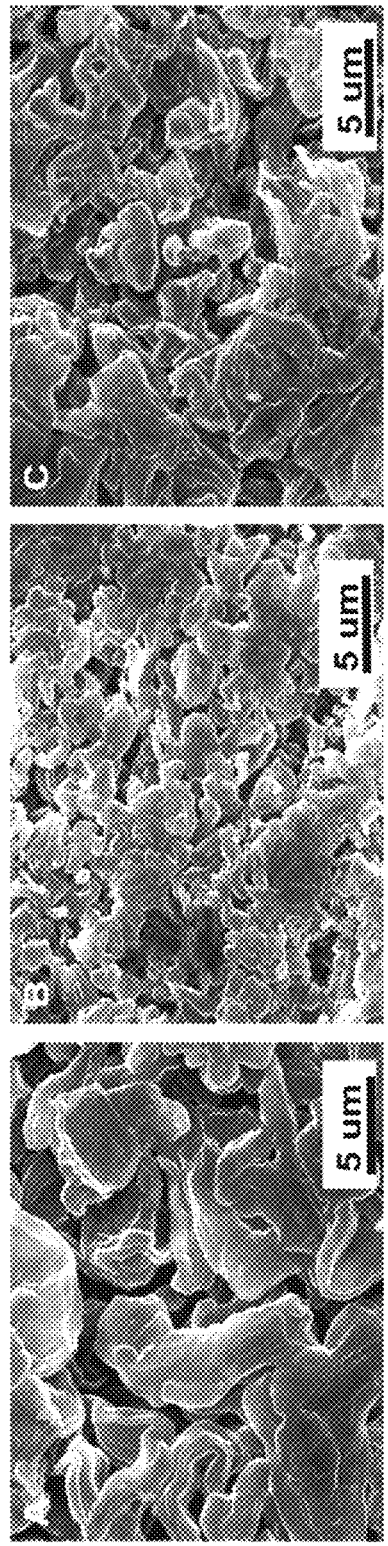

FIG. 35
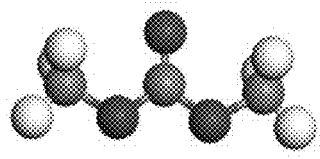 DMC
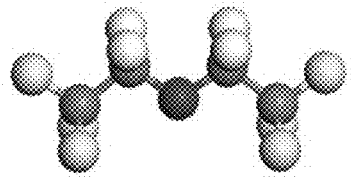 BTFE
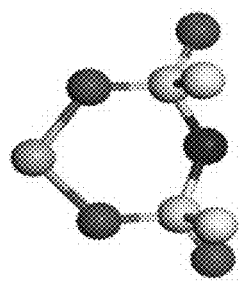 LiFSI
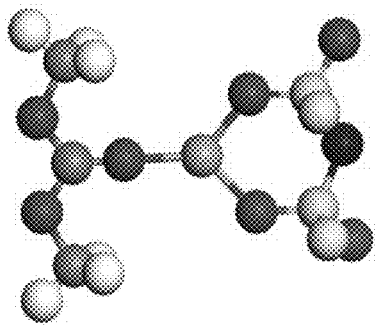 DMC+LiFSI
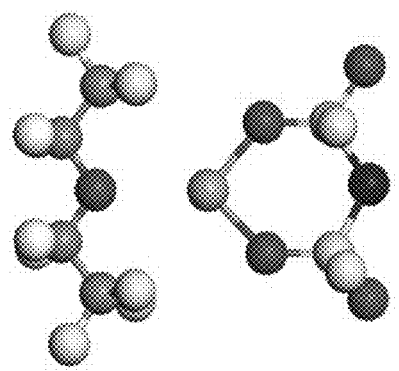 BTFE+LiFSI

FIG. 36A
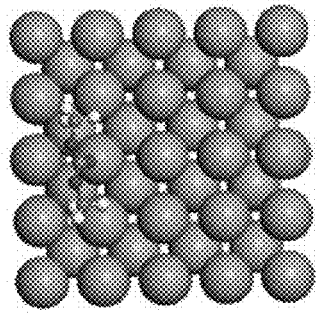
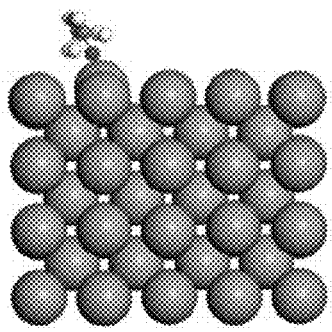
DMC
FIG. 36B
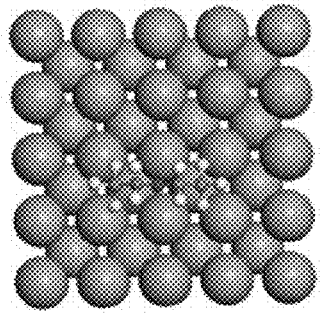
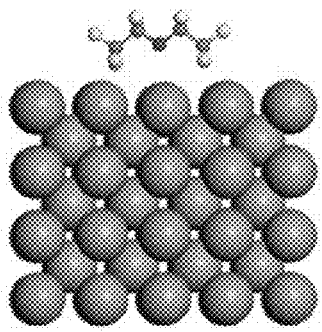
BTFE
FIG. 36C
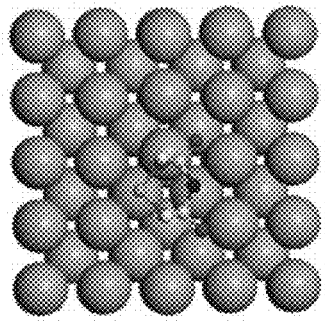
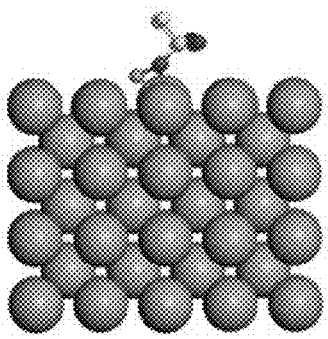
LiFSI
FIG. 36D
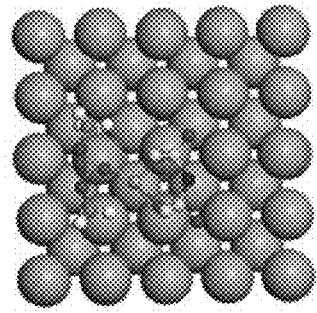
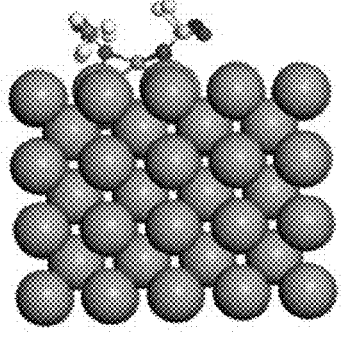
DMC-LiFSI

FIG. 36E
FIG. 36F
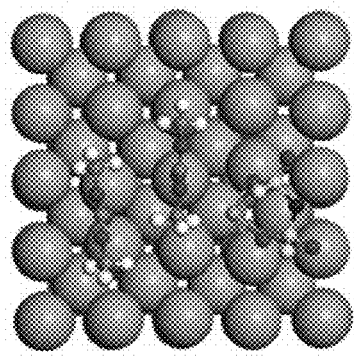
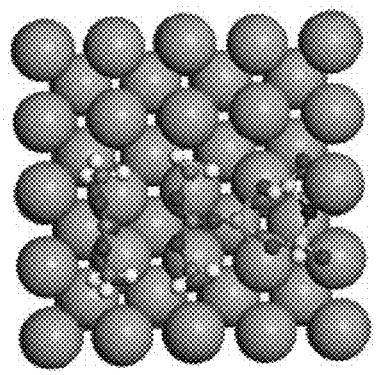
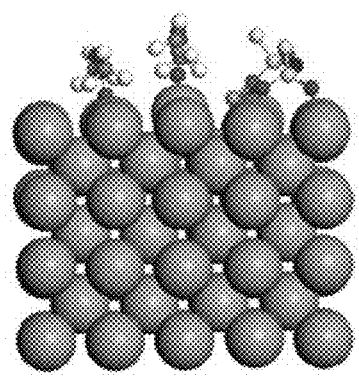
2DMC/LiFSI
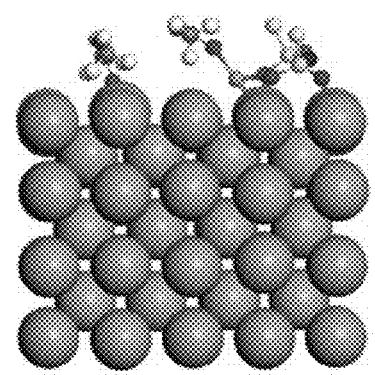
DMC/DMC-LiFSI
FIG. 37A
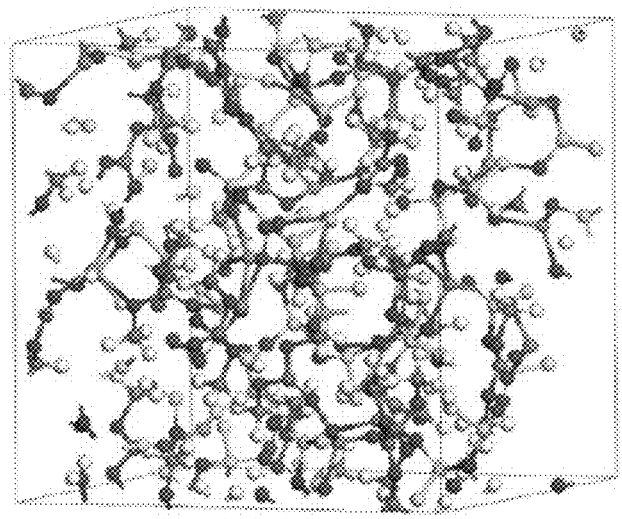
LiFSI/DMC (1:1.1)
(20 LiFSI + 22 DMC)

LiFSI/DMC/BTFE (0.94:1.1:0.55)
(19 LiFSI + 22 DMC + 11 BTFE)

LiFSI/DMC/BTFE (0.5:1.1:2.2)
(5 LiFSI + 11 DMC + 22 BTFE)

LOW FLAMMABILITY ELECTROLYTES FOR STABLE OPERATION OF ELECTROCHEMICAL DEVICES

CROSS REFERENCE TO RELATED APPLICATIONS

This application is a continuation-in-part of International Application No. PCT/US2017/033391, filed May 18, 2017, and a continuation-in-part of U.S. application Ser. No. 15/599,298, filed May 18, 2017, both of which claim the benefit of the earlier filing date of U.S. Provisional Application No. 62/466,267, filed Mar. 2, 2017, each of which is incorporated by reference in its entirety herein.

ACKNOWLEDGMENT OF GOVERNMENT SUPPORT

This invention was made with Government support under Contract Nos. DE-AC05-76RL01830 and DE-AC02-05CH11231 awarded by the U.S. Department of Energy. The Government has certain rights in the invention.

FIELD

This invention is directed to low flammability and nonflammable electrolytes for stable operation of electrochemical devices, certain embodiments of the electrolytes including an active salt, a solvent comprising a flame retardant compound, wherein the active salt is soluble in the solvent, and a diluent in which the active salt is insoluble or poorly soluble.

SUMMARY

Embodiments of low flammability and nonflammable localized superconcentrated electrolytes (LSEs, also referred to as localized high concentration electrolytes (LHCEs)) and electrochemical systems including low flammability or nonflammable LSEs are disclosed. A low flammability or nonflammable LSE includes an active salt, a solvent comprising a flame retardant compound, wherein the active salt is soluble in the solvent, and a diluent, wherein the active salt has a solubility in the diluent at least 10 times less than a solubility of the active salt in the solvent. In some embodiments, the LSE comprises at least 5 wt % of the flame retardant compound. In any or all of the foregoing embodiments, the flame retardant compound may comprise an organic phosphate, an organic phosphite, an organic phosphonate, an organic phosphoramide, an organic or inorganic phosphazene, other phosphorus-containing compounds, or any combination thereof. In some embodiments, the flame retardant compound comprises trimethyl phosphate (TMPa), triethyl phosphate (TEPa), tributyl phosphate, triphenyl phosphate, tris(2,2,2-trifluoroethyl) phosphate, bis(2,2,2-trifluoroethyl) methyl phosphate; trimethyl phosphite (TMPi), triphenyl phosphite (TEPi), tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

In any or all of the above embodiments, the solvent may further comprise a cosolvent, wherein the active salt is soluble in the cosolvent. In some embodiments, the cosolvent comprises an organic carbonate solvent, an ether solvent, an organic sulfoxide, a sulfone, an organic nitrogen-containing solvent, or any combination thereof. In certain embodiments. the cosolvent comprises 1,2-dimethoxyethane (DME), 1,3-dioxolane (DOL), tetrahydrofuran (THF), allyl ether, diethylene glycol dimethyl ether (i.e. diglyme), dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (i.e. vinyl ethylene carbonate, VEC), 4-methylene-1,3-dioxolan-2-one (i.e. methylene ethylene carbonate, MEC), 4,5-dimethylene-1,3-dioxolan-2-one, dimethyl sulfoxide (DMSO), dimethyl sulfone (DMS), ethyl methyl sulfone (EMS), ethyl vinyl sulfone (EVS), tetramethylene sulfone (i.e. sulfolane, TMS), trifluoromethyl ethyl sulfone (FMES), trifluoromethyl isopropyl sulfone (FMIS), trifluoropropyl methyl sulfone (FPMS), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof.

In any or all of the above embodiments, (i) the active salt may have a molar concentration in the electrolyte within a range of from 0.5 M to 2 M; (ii) the active salt may have a molar concentration in the solvent of greater than 3 moles of active salt per liter of the solvent; (iii) the molar concentration of the active salt in the electrolyte is at least 20% less than a molar concentration of the active salt in the solvent in the absence of the diluent, or (iv) any combination of (i), (ii), and (iii). In some embodiments, the molar concentration of the active salt in the electrolyte is at least 20% less than a molar concentration of the active salt in the solvent in the absence of the diluent.

In any or all of the above embodiments, (i) a molar ratio of the active salt to the solvent may be within a range of from 0.33 to 1.5; (ii) a molar ratio of the solvent to the diluent may be within a range of from 0.2 to 5; or (iii) both (i) and (ii). In any or all of the above embodiments, at least 90% of molecules of the solvent may be associated with cations of the active salt. In any or all of the above embodiments, fewer than 10% of molecules of the diluent may be associated with cations of the active salt.

In any or all of the above embodiments, the active salt may include a lithium salt or lithium salts mixture, a sodium salt or sodium salts mixture, a potassium salt or potassium salts mixture, or a magnesium salt or magnesium salts mixture. In some embodiments, the active salt comprises lithium bis(fluorosulfonyl)imide (LiFSI), lithium bis(trifluoromethanesulfonyl)imide (LiTFSI), lithium bis(pentafluoroethanesulfonyl)imide (LiN(SO$_2$CF$_2$CF$_3$)$_2$, LiBETI), lithium (fluorosulfonyl trifluoromethanesulfonyl)imide (LiN(SO$_2$F)(SO$_2$CF$_3$), LiFTFSI), lithium (fluorosulfonyl pentafluoroethanesulfonyl)imide (LiN(SO$_2$F)N(SO$_2$CF$_2$CF$_3$), LiFBETI), lithium cyclo(tetrafluoroethylenedisulfonly)imide (LiN(SO$_2$CF$_2$CF$_2$SO$_2$), LiCTFSI), lithium (trifluoromethanesulfonyl)(n-nonafluorobutanesulfonyl)imide (LiN(SO$_2$CF$_3$)(SO$_2$-n-C$_4$F$_9$), LiTNFSI), lithium cyclohexafluoropropane-1,3-bis(sulfonyl)imide, sodium bis(fluorosulfonyl)imide (NaFSI), sodium bis(trifluoromethylsulfonyl)imide (NaTFSI), sodium bis(pentafluoroethanesulfonyl)imide (NaN(SO$_2$CF$_2$CF$_3$)$_2$, NaBETI), sodium (trifluoromethanesulfonyl)(n-nonafluorobutanesulfonyl)imide (NaN(SO$_2$CF$_3$)(SO$_2$-n-C$_4$F$_9$), NaTNFSI, lithium bis(oxalato)borate (LiBOB), sodium bis(oxalato)borate (NaBOB), lithium difluoro oxalato borate anion (LiDFOB), LiPF$_6$, LiAsF$_6$, LiBF$_4$, lithium trifluoromethanesulfonate (LiCF$_3$SO$_3$, or LiTf), lithium nonafluorobutanesulfonate (LiC$_4$F$_9$SO$_3$, LiNFBS), LiClO$_4$, LiI, LiBr, LiCl, LiSCN, LiNO$_3$, Li$_2$SO$_3$, Li$_2$SO$_4$, LiRSO$_4$ where R is an alkyl group, or any combination thereof. In certain of the foregoing embodiments, the active salt is (i) LiFSI, LiTFSI, or a combination thereof, or (ii) NaFSI, NaTFSI, or a combination thereof; the solvent comprises TMPa, TEPa, or a combination thereof; and the active salt has a molar concentration in the electrolyte within a range of from 0.75 M to 1.5 M.

In any or all of the above embodiments, the diluent may comprise a fluoroalkyl ether (also referred to as a hydrofluoroether (HFE)). In some embodiments, the diluent comprises 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), or any combination thereof. In any or all of the above embodiments, the solvent and the diluent may be miscible.

In some embodiments, a low flammability or nonflammable LSE includes an active salt; a solvent comprising a flame retardant compound, wherein the active salt is soluble in the solvent; a diluent, wherein the diluent is immiscible with the solvent and wherein the active salt has a solubility in the diluent at least 10 times less than a solubility of the active salt in the solvent; and a bridge solvent having a different composition than the solvent (i.e., the flame retardant and, if present, the cosolvent) and a different composition than the diluent, wherein the bridge solvent is miscible with the solvent and with the diluent. Exemplary bridge solvents include AN, DMC, DEC, PC, DMSO, EMS, TMS, DOL, DME, diglyme, triglyme (triethylene glycol dimethyl ether), tetraglyme (tetraethylene glycol dimethyl ether), or any combination thereof.

Some embodiments of a battery as disclosed herein include (i) an electrolyte comprising an active salt, a solvent comprising a flame retardant compound, wherein the active salt is soluble in the solvent, and a diluent, wherein the active salt has a solubility in the diluent at least 10 times less than a solubility of the active salt in the solvent, the active salt has a concentration in the electrolyte within a range of 0.75 to 2 M, and the electrolyte includes at least 5 wt % of the flame retardant compound; (ii) an anode; and (iii) a cathode, wherein the battery has a coulombic efficiency≥95%. Exemplary flame retardant compounds include TMPa, TEPa, tributyl phosphate, triphenyl phosphate, tris (2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

In one embodiment of the battery, (i) the anode is lithium metal; (ii) the active salt comprises LiFSI, LiTFSI, LiBETI, LiPF$_6$, LiAsF$_6$, LiBF$_4$, LiCF$_3$SO$_3$, LiClO$_4$, LiBOB, LiDFOB, LiI, LiBr, LiCl, LiSCN, LiNO$_3$, Li$_2$SO$_4$, or any combination thereof; (iii) the flame retardant compound comprises TMPa, TEPa, or a combination thereof; (iv) the diluent comprises TTE, BTFE, TFTFE, MOFB, EOFB, or any combination thereof; and (v) the cathode is Li$_{1+w}$Ni$_x$Mn$_y$Co$_z$O$_2$ (x+y+z+w=1, 0≤w≤0.25), LiNi$_x$Mn$_y$Co$_z$O$_2$ (x+y+z=1), LiCoO$_2$, LiNi$_{0.8}$Co$_{0.15}$Al$_{0.05}$O$_2$, LiNi$_{0.5}$Mn$_{1.5}$O$_4$ spinel, LiMn$_2$O$_4$, LiFePO$_4$, Li$_{4-x}$M$_x$Ti$_5$O$_{12}$ (M=Mg, Al, Ba, Sr, or Ta; 0≤x≤1), MnO$_2$, V$_2$O$_5$, V$_6$O$_{13}$, LiV$_3$O$_8$, LiM$^{C1}_x$M$^{C2}_{1-x}$PO$_4$ (M$^{C1}$ or M$^{C2}$=Fe, Mn, Ni, Co, Cr, or Ti; 0≤x≤1), Li$_3$V$_{2-x}$M$^1_x$(PO$_4$)$_3$ (M$^1$=Cr, Co, Fe, Mg, Y, Ti, Nb, or Ce; 0≤x≤1), LiVPO$_4$F, LiM$^{C1}_x$M$^{C2}_{1-x}$O$_2$ ((M$^{C1}$ and M$^{C2}$ independently are Fe, Mn, Ni, Co, Cr, Ti, Mg, or Al; 0≤x≤1), LiM$^{C1}_x$M$^{C2}_y$M$^{C3}_{1-x-y}$O$_2$ ((M$^{C1}$, M$^{C2}$, and M$^{C3}$ independently are Fe, Mn, Ni, Co, Cr, Ti, Mg, or Al; 0≤x≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y<0.5), xLi$_2$MnO$_3$.(1–x)LiM$^{C1}_x$M$^{C2}_z$M$^{C3}_{1-y-z}$O$_2$ (M$^{C1}$, M$^{C2}$, and M$^{C3}$ independently are Mn, Ni, Co, Cr, Fe, or mixture thereof; x=0.3-0.5; y≤0.5; z≤0.5), Li$_2$M$^2$SiO$_4$ (M$^2$=Mn, Fe, or Co), Li$_2$M$^2$SO$_4$ (M$^2$=Mn, Fe, or Co), LiM$^2$SO$_4$F (M$^2$=Fe, Mn, or Co), Li$_{2-x}$(Fe$_{1-y}$Mn$_y$)P$_2$O$_7$ (0≤y≤1), Cr$_3$O$_8$, Cr$_2$O$_5$, a carbon/sulfur composite, or an air electrode. In any of the foregoing embodiments, the solvent may further include a cosolvent comprising a carbonate solvent, an ether solvent, dimethyl sulfoxide, or a combination thereof.

In an independent embodiment of the battery, (i) the anode is sodium metal; (ii) the active salt comprises NaFSI, NaTFSI, or a combination thereof; (iii) the flame retardant compound comprises TMPa, TEPa, or a combination thereof; (iv) the diluent comprises BTFE, TTE, TFTFE, MOFB, EOFB, or any combination thereof; and (v) the cathode is NaFePO$_4$, Na$_2$FePO$_4$F, Na$_2$FeP$_2$O$_7$, Na$_3$V$_2$(PO$_4$)$_3$, Na$_3$V$_2$(PO$_4$)$_2$F$_3$, NaVPO$_4$F, NaVPOPOF, Na$_{1.5}$VOPO$_4$F$_{0.5}$, NaCo$_2$O$_4$, NaFeO$_2$, Na$_x$MO$_2$ where 0.4<x≤1, and M is a transition metal or a mixture of transition metals, Na$_{2/3}$Ni$_{1/3}$Mn$_{2/3}$O$_2$, Na$_{2/3}$Fe$_{1/2}$Mn$_{1/2}$O$_2$, Na$_{2/3}$Ni$_{1/6}$CoO$_{1/6}$Mn$_{2/3}$O$_2$, NaNi$_{1/3}$Fe$_{1/3}$Mn$_{1/3}$O$_2$, NaNi$_{1/3}$Fe$_{1/3}$Co$_{1/3}$O$_2$, NaNi$_{1/2}$Mn$_{1/2}$O$_2$, a Prussian white analogue cathode, or a Prussian blue analogue cathode. In any of the foregoing embodiments, the solvent may further include a cosolvent comprising a carbonate solvent, an ether solvent, dimethyl sulfoxide, or a combination thereof.

In some embodiments of the battery, the solvent and the diluent are immiscible, and the electrolyte further includes a bridge solvent having a different composition than the solvent and a different composition than the diluent, wherein the bridge solvent is miscible with the solvent and with the diluent. Exemplary bridge solvents comprise AN, DMC, DEC, PC, DMSO, EMS, TMS, DOL, DME, diglyme, triglyme, tetraglyme, or any combination thereof.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 17A and 17C are cross-sectional views; FIGS. 17B and 17D are top views.

FIGS. 18A-18D show the electrochemical behavior of Li∥NMC batteries with different electrolytes. FIG. 18A shows the cycling stability and coulombic efficiencies. FIGS. 18B-18D show typical voltage profiles in 1.0 M LiPF$_6$/EC-EMC (FIG. 18B), 5.5 M LiFSI/DMC (FIG. 18C), and 1.2 M LiFSI/DMC-BTFE (1:2) (FIG. 18D).

FIGS. 21A-21F are SEM images showing morphology of Li metal after plating on Cu substrates in different electrolytes. FIGS. 21A, 21C, and 21E are cross-section views; FIGS. 21B, 21D, and 21F are top views of Li metal after plating on Cu substrates. The electrolytes were 1.0 M LiPF$_6$/EC-EMC (FIGS. 21A, 21B), 5.5 M LiFSI/DMC (FIGS. 21C, 21D), and 1.2 M LiFSI/DMC-BTFE (1:2) (FIGS. 21E, 21F).

FIGS. 22A-22C are SEM images showing morphology of Li metal after plating on Cu substrates in 1.2 M LiFSI/DMC-BTFE (1:2) at current densities of 2 mA/cm$^2$ (FIG. 22A), 5 mA/cm$^2$ (FIG. 22B), and 10 mA/cm$^2$ (FIG. 22C).

FIG. 29A shows the initial Na plating/stripping profiles; FIG. 29B shows the cycling stability over 100 cycles; FIG. 29C shows the charge and discharge capacities of NaFSI/DME-BTFE (1:1:2 in mol) over 100 cycles.

FIG. 31A is the initial charge/discharge voltage profiles, FIG. 31B is the cycling performance, and FIG. 31C shows the CE of the Li—S cells as a function of cycle number evaluated at 0.1 C (168 mA g−1).

FIG. 35 shows optimized molecular structures of DMC and BTFE solvent molecules, LiFSI salt, and DMC+LiFSI and BTFE+LiFSI solvent-salt pairs. The Li, O, C, H, S, N, and F atoms are colored as magenta, red, gray, white, yellow, blue, and light blue, respectively.

FIGS. 36A-36F are molecular models showing adsorption of solvent molecules DMC (FIG. 36A) and BTFE (FIG. 36B), LiFSI salt (FIG. 36C), and DMC-LiFSI solvent-salt pairs (FIGS. 36D-36F) on the lithium (100) anode surface. The upper and lower images in each pair are the top and side view structures, respectively.

FIGS. 37A-37C are molecular models of electrolyte/salt mixtures from AIMD simulations at 303 K—LiFSI-DMC (1:1.1) (FIG. 37A); LiFSI-DMC-BTFE (0.94:1.1:0.55) (FIG. 37B); LiFSI-DMC-BTFE (0.51:1.1:2.2) (FIG. 37C); the ratios in the parentheses indicate the molar ratios of LiFSI:DMC:BTFE.

FIG. 39B is an enlarged view of FIG. 39A in the wavenumber range of 2000-200 cm$^{-1}$.

FIGS. 44B-44C are enlarged views of wavenumber ranges from the full spectra.

DETAILED DESCRIPTION

Figure 1:
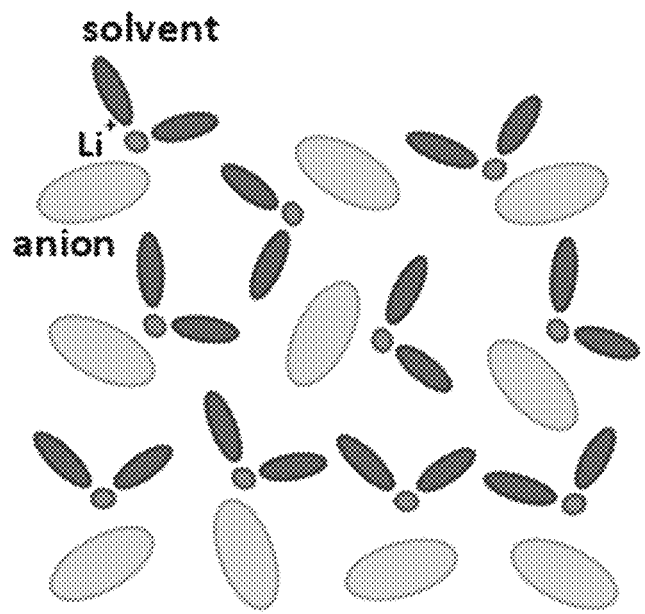
FIG. 1 is a schematic illustration of a superconcentrated electrolyte (SE) comprising a lithium salt and a solvent.

The safety of lithium-ion batteries has always been a great concern because they contain highly flammable organic electrolytes that can lead to fire or even battery explosion under conditions of overcharging, overheating, internal short-circuit, and/or mechanical damage.

The safety problem also applies to any electrochemical device including a flammable electrolyte.

Superconcentrated electrolytes (also referred to as high concentration electrolytes) including flammable solvents, e.g. concentrated LiFSI/DME or concentrated LiFSI/DMC, can enable high coulombic efficiency (CE) operation of lithium metal anodes and/or reversible insertion of Li-ions into the graphite anode, due to the reduced presence of free solvent molecules compared to more dilute electrolytes and/or the formation of stabilized SEI layer. As used herein, the term "superconcentrated" (or high concentration) means an active salt concentration of at least 3 M. Superconcentrated electrolytes including fire-retarded solvents may be an effective approach to stabilize these compounds at low potentials and enable the formation of a stable SEI layer on graphite anode. However, these superconcentrated electrolytes suffer from safety risks as described above, high cost, high viscosity, and/or poor wetting toward the separator and the thick cathode electrode, hindering their practical use applications. Many fire-retarded solvents that have been proposed to improve safety, however, are unstable at low potentials (e.g., they react with lithium metal) and/or are ineffective to form a stable solid electrolyte interphase (SEI) layer on anodes (e.g. they may break the laminar structure of graphite anodes), thereby hampering their practical use.

Embodiments of low flammability and nonflammable localized superconcentrated electrolytes (LSEs) are disclosed. Certain embodiments of the disclosed low flammability and nonflammable LSEs are stable in electrochemical cells with alkali metal, alkaline earth metal, or carbon-based (e.g., graphite) anodes and various cathode materials. The LSEs comprise an active salt, a solvent comprising a flame retardant compound, wherein the active salt is soluble in the solvent, and a diluent in which the active salt is insoluble or poorly soluble.

Advantageously, in some embodiments, the performance of an electrochemical device including a low flammability or nonflammable electrolyte as disclosed herein is comparable to an electrochemical device including a flammable electrolyte containing the same active salt. In some embodiments, the concentration of active salt is lowered by addition of the diluent without significant increase in flammability and/or reduction in the performance of electrochemical devices including the low flammability or nonflammable LSE. In certain embodiments, the performance of electrochemical devices including the low flammability or nonflammable LSE is enhanced compared to a similar LSE that does not include the flame retardant compound.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Active salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox active materials participating in redox reactions during battery cycling after initial charging.

AN: acetonitrile

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Associated: As used here, the term "associated" means coordinated to or solvated by. For example, a cation that is associated with a solvent molecule is coordinated to or solvated by the solvent molecule. Solvation is the attraction of solvent molecules with molecules or ions of a solute. The association may be due to electronic interactions (e.g., ion-dipole interactions and/or van der Waals forces) between the cation and the solvent molecule. Coordination refers to formation of one or more coordination bonds between a cation and electron lone-pairs of solvent atoms. Coordination bonds also may form between the cation and anion of the solute.

Bridge solvent: A solvent having amphiphilic molecules with a polar end or moiety and a nonpolar end or moiety.

BTFE: bis(2,2,2-trifluoroethyl) ether

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. Areal capacity or specific areal capacity is the capacity per unit area of the electrode (or active material) surface, and is typically expressed in united of mAh cm$^{-2}$.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Coin cell: A small, typically circular-shaped battery. Coin cells are characterized by their diameter and thickness.

Conversion compound: A compound comprising one or more cations, which are displaced by another metal when a battery is discharged. For example, when iron (II) selenide (FeSe) is used as a cathode material, Fe is replaced by Na during discharge of a Na battery:

$$2Na^+ + 2e^- + FeSe \leftrightarrow Na_2Se + Fe$$

Cosolvent: A solvent that, in conjunction with another solvent, dissolves a solute.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li‖Cu or Na‖Cu cells may be defined as the amount of charge flowing out of the battery during stripping process divided by the amount of charge entering the battery during plating process.

DEC: diethyl carbonate
DMC: dimethyl carbonate
DME: 1,2-dimethoxyethane
DMS: dimethyl sulfone
DMSO: dimethyl sulfoxide
DOL: 1,3-dioxolane Donor number: A quantitative measure of Lewis basicity, such as a solvent's ability to solvate cations. A donor number is defined as the negative enthalpy value for the 1:1 adduct formation between a Lewis base and SbCl$_5$ in dilute solution in 1,2-dichloroethane, which has a donor number of zero. The donor number is typically reported in units of kcal/mol. Acetonitrile, for example, has a donor number of 14.1 kcal/mol. As another example, dimethyl sulfoxide has a donor number of 29.8 kcal/mol.

EC: ethylene carbonate

Electrolyte: A substance containing free ions that behaves as an electrically conductive medium. Electrolytes generally comprise ions in a solution, but molten electrolytes and solid electrolytes also are known.

EMC: ethyl methyl carbonate
EMS: ethyl methyl sulfone
EOFB: ethoxynonafluorobutane
EVS: ethyl vinyl sulfone
FEC: fluoroethylene carbonate Flame retardant: As used herein, the term "flame retardant" refers to an agent incorporated into an electrolyte to reduce or eliminate its tendency to ignite during operation of an electrochemical device including the electrolyte.

Flammable: The term "flammable" refers to a material that will ignite easily and burn rapidly. As used herein, the term "nonflammable" means that an electrolyte, will not ignite or burn during operation of an electrochemical device including the electrolyte. As used herein, the terms "flame retarded" and "low flammability" are interchangeable and mean that a portion of the electrolyte may ignite under some conditions, but that any resulting ignition will not propagate throughout the electrolyte. Flammability can be measured by determining the self-extinguishing time (SET) of the electrolyte. The SET is determined by a modified Underwriters Laboratories test standard 94 HB. An electrolyte is immobilized on an inert ball wick, such as a ball wick having a diameter of ~0.3-0.5 cm, which is capable of absorbing 0.05-0.10 g electrolyte. The wick is then ignited, and the time for the flame to extinguish is recorded. The time is normalized against the sample weight. If the electrolyte does not catch flame, the SET is zero and the electrolyte is nonflammable. Electrolytes having an SET of <6 s/g (e.g., the flame extinguishes within ~0.5 s) are also considered nonflammable. If the SET is >20 s/g, the electrolyte is considered to be flammable. When the SET is between 6-20 s/g, the electrolyte is considered to be flame retarded or have low flammability.

Immiscible: This term describes two substances of the same state of matter that cannot be uniformly mixed or blended. Oil and water are a common example of two immiscible liquids.

Intercalation: A term referring to the insertion of a material (e.g., an ion or molecule) into the microstructure of another material. For example, lithium ions can insert, or intercalate, into graphite (C) to form lithiated graphite (LiC$_6$).

KFSI: potassium bis(fluorosulfonyl)imide
KTFSI: potassium bis(trifluoromethanesulfonyl)imide
LiBETI: lithium bis(pentafluoroethanesulfonyl)imide
LiFSI: lithium bis(fluorosulfonyl)imide
LiTFSI: lithium bis(trifluoromethanesulfonyl)imide
LiBOB: lithium bis(oxalato)borate
LiDFOB: lithium difluoro oxalato borate anion
LSE: localized superconcentrated electrolyte
MEC: methylene ethylene carbonate
MOFB: methoxynonafluorobutane
NaFSI: sodium bis(fluorosulfonyl)imide
NaTFSI: sodium bis(trifluoromethylsulfonyl)imide
NaBOB: sodium bis(oxalato)borate Organophosphorus compound: An organic compound that contains phosphorus.

PC: propylene carbonate

Phosphate: As used herein, phosphate refers to an organophosphate having a general formula P(=O)(OR)$_3$ where each R independently is alkyl (e.g., C$_1$-C$_{10}$ alkyl) or aryl. Each alkyl or aryl group may be substituted or unsubstituted.

Phosphite: As used herein, phosphite refers to an organophosphite having a general formula $P(OR)_3$ or $HP(O)(OR)_2$ where each R independently is alkyl (e.g., $C_1$-$C_{10}$ alkyl) or aryl. Each alkyl or aryl group may be substituted or unsubstituted.

Phosphonate: A compound having a general formula $P(=O)(OR)_2(R')$ wherein each R and R' independently is alkyl (e.g., $C_1$-$C_{10}$ alkyl), or aryl. Each alkyl or aryl group may be substituted or unsubstituted.

Phosphoramide: A compound having a general formula $P(=O)(NR_2)_3$ wherein each R independently is hydrogen, alkyl (e.g., $C_1$-$C_{10}$ alkyl), or alkoxy (e.g., $C_1$-$C_{10}$ alkoxy). At least one R is not hydrogen. Each alkyl or aryl group may be substituted or unsubstituted.

Phosphazene: A compound in which a phosphorus atom is covalently linked to a nitrogen atom or nitrogen-containing group by a double bond and to three other atoms or radicals by single bonds.

SEI: solid electrolyte interphase

Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that an active salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

Superconcentrated: As used herein, the term "superconcentrated electrolyte" refers to an electrolyte having a salt concentration of at least 3 M.

TEPa: triethyl phosphate

TFTFE: 1,1,2,2,-tetrafluoroethyl-2,2,2-trifluoroethyl ether

TMPa: trimethyl phosphate

TMS: tetramethylene sulfone or sulfolane

TTE: 1,1,2,2-tetrafluoroethyl-2,2,3,3-tetrafluoropropyl ether

VC: vinylene carbonate

VEC: 4-vinyl-1,3-dioxolan-2-one or vinyl ethylene carbonate

II. Low Flammability or Nonflammable Localized Superconcentrated Electrolytes

A conventional superconcentrated electrolyte comprises a solvent and a salt with a salt concentration of at least 3 M. Some superconcentrated electrolytes have a salt concentration of at least 4 M or at least 5 M. In certain instances, the salt molality may be up to 20 m or more, e.g., aqueous LiTFSI. FIG. 1 is a schematic illustration of a conventional superconcentrated electrolyte comprising a solvent and a lithium salt. Desirably, all or a large majority of the solvent molecules are associated with a lithium cation in the superconcentrated electrolyte. A reduced presence of free, unassociated solvent molecules increases coulombic efficiency (CE) of a lithium metal anode, facilitates formation of a stabilized SEI layer, and/or increases cycling stability of a battery including the electrolyte. However, most organic based superconcentrated electrolytes have disadvantages, such as flammability, high material cost, high viscosity, and/or poor wetting of battery separators and/or cathodes. While dilution with additional solvent can resolve one or more of the disadvantages, dilution results in free solvent molecules and often decreases CE, hinders formation of the stabilized SEI layer, and/or decreases cycling stability of a battery.

Figure 2:
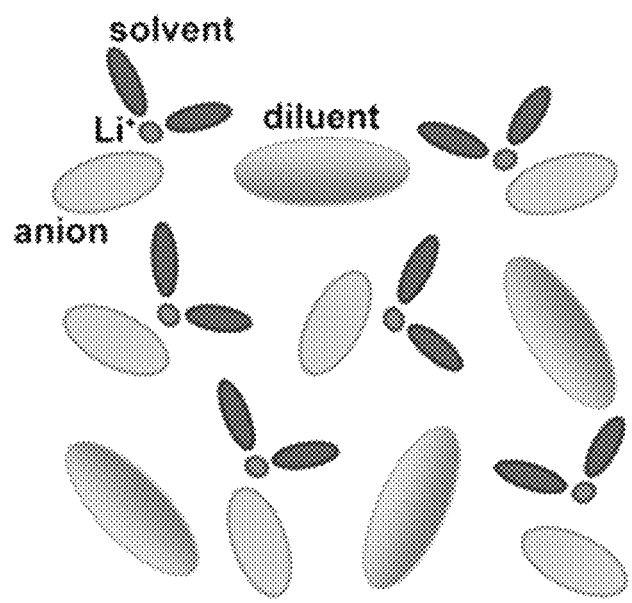
FIG. 2 is a schematic illustration of an exemplary localized superconcentrated electrolyte (LSE) comprising a lithium salt, a solvent in which the lithium salt is soluble, and a diluent, i.e., a component in which the lithium salt is insoluble or poorly soluble compared to the solvent.

Certain embodiments of the disclosed low flammability and nonflammable "localized superconcentrated electrolytes" (LSEs) comprising a salt, a solvent comprising a flame retardant compound, wherein the salt is soluble in the solvent, and a diluent in which the salt is insoluble or poorly soluble can resolve some or all of the problems discussed above. FIG. 2 is a schematic illustration of an exemplary LSE including a lithium salt, a solvent in which the lithium salt is soluble, and a diluent in which the lithium salt is insoluble or poorly soluble. As shown in FIG. 2, the lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. Evidence of this electrolyte structure with regions of locally concentrated salt/solvent and free diluent molecules is seen by Raman spectroscopy (see, e.g., Example 10, FIGS. 39A-B, 40A-B), NMR characterization, and molecular dynamics (MD) simulations. Thus, although the solution as a whole is less concentrated than the solution of FIG. 1, there are localized regions of high concentration where the lithium cations are associated with the solvent molecules. There are few to no free solvent molecules in the diluted electrolyte, thereby providing the benefits of a superconcentrated electrolyte without the associated disadvantages.

Embodiments of the disclosed low flammability and nonflammable localized superconcentrated electrolytes (LSEs) comprise, consist essentially of or consist of an active salt, a solvent A comprising a flame retardant compound, wherein the active salt is soluble in the solvent A, and a diluent, wherein the active salt is insoluble or poorly soluble in the diluent. The diluent has a different chemical composition than the solvent. As used herein, "poorly soluble" means that the active salt has a solubility in the diluent at least 10× less than a solubility of the active salt in the solvent A. As used herein, "consist essentially of" means that the electrolyte does not include any component that materially affects the properties of the electrolyte. For example, the LSE does not include any electrochemically active component (i.e., a component (an element, an ion, or a compound) that is capable of forming redox pairs having different oxidation and reduction states, e.g., ionic species with differing oxidation states or a metal cation and its corresponding neutral metal atom) other than the active salt in an amount sufficient to affect performance of the electrolyte and does not include a diluent in which the active salt is soluble.

In some embodiments, solvent A further comprises a cosolvent, such as a flammable or nonflammable organic solvent, wherein the cosolvent has a different composition than the flame retardant compound. The amount of flame retardant compound in solvent A is sufficient to render the electrolyte flame-retarded (low flammability) or nonflammable. In any or all of the above embodiments, the low flammability or nonflammable LSE may include at least 5 wt % of the flame retardant compound.

The solubility of the active salt in the solvent A (in the absence of diluent) may be greater than 3 M, such as at least 4 M or at least 5 M. In some embodiments, the solubility and/or concentration of the active salt in the solvent A is within a range of from 3 M to 10 M, such as from 3 M to 8 M, from 4 M to 8 M, or from 5 M to 8 M. In certain embodiments, the concentration may be expressed in terms of molality and the concentration of the active salt in the solvent A (in the absence of diluent) may be within a range of from 3 m to 25 m, such as from 5 m to 21 m, or 10 m to 21 m. In contrast, the molar or molal concentration of the active salt in the low flammability or nonflammable electrolyte as a whole (salt, solvent A, and diluent) may be at least 20% less than the molar or molal concentration of the active salt in the solvent A, such as at least 30% less, at least 40% less, at least 50% less, at least 60% less, or even at least 70% less than the molar or molal concentration of the active salt in the solvent A. For example, the molar or molal concentration of the active salt in the electrolyte may be 20-80% less, 20-70% less, 30-70% less, or 30-50% less than the molar or molal concentration of the active salt in the solvent A. In some embodiments, the molar concentration of the active salt in the electrolyte is within a range of 0.5 M to 3 M, 0.5 M to 2 M, 0.75 M to 2 M, or 0.75 M to 1.5 M.

The active salt is a salt, or combination of salts, that participates in the charge and discharge processes of a cell including the low flammability or nonflammable electrolyte. The active salt comprises a cation that is capable of forming redox pairs having different oxidation and reduction states, such as ionic species with differing oxidation states or a metal cation and its corresponding neutral metal atom. In some embodiments, the active salt is an alkali metal salt, an alkaline earth metal salt, or any combination thereof. The active salt may be, for example, a lithium salt, a sodium salt, a potassium salt, a magnesium salt, a mixture of lithium salts, a mixture of sodium salts, a mixture of potassium salts, or a mixture of magnesium salts. Advantageously, the active salt is stable towards an alkali metal or alkaline earth metal anode. Exemplary salts include, but are not limited to, LiFSI, LiTFSI, LiBETI, NaFSI, NaTFSI, LiBOB, sodium bis(oxalato)borate (NaBOB), $LiPF_6$, $LiAsF_6$, $LiBF_4$, $LiCF_3SO_3$, $LiClO_4$, LiDFOB, LiI, LiBr, LiCl, LiSCN, $LiNO_3$, $Li_2SO_4$, and combinations thereof. In some embodiments, the salt is LiFSI, LiTFSI, LiBETI, NaFSI, NaTFSI, or any combination thereof.

Low flammability or nonflammable solvent A comprises, consists essentially of or consists of a flame retardant compound. In some embodiments, the flame retardant compound is a liquid at ambient temperature (e.g., 20-25° C.). Suitable flame retardant compounds include, but are not limited to, phosphorus containing compounds. In some embodiments, the flame retardant compound comprises one or more organophosphorus compounds (e.g., organic phosphates, phosphites, phosphonates, phosphoramides), phosphazenes, or any combination thereof. Organic phosphates, phosphites, phosphonates, phosphoramides include substituted and unsubstituted aliphatic and aryl phosphates, phosphites, phosphonates, and phosphoramides. The phosphazenes may be organic or inorganic. Exemplary flame retardant compounds include, e.g., TMPa, TEPa, tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), and combinations thereof. In one embodiment, the flame retardant compound comprises trimethyl phosphate, triethyl phosphate, or a combination thereof. In an independent embodiment, the flame retardant compound comprises tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene, hexafluorophosphazene, or any combination thereof.

In any or all of the above embodiments, solvent A may further comprise a cosolvent. Advantageously, the cosolvent is miscible with the flame retardant compound and/or the active salt is soluble in both the flame retardant compound and the cosolvent. Suitable cosolvents include, but are not limited to, certain carbonate solvents, ether solvents, dimethyl sulfoxide, water, and mixtures thereof. Exemplary cosolvents include DME, DOL, allyl ether, DMC, EMC, DEC, EC, PC, VC, FEC, VEC, MEC, DMSO, DMS, EMS, EVS, TMS (also called sulfolane), methyl butyrate, ethyl propionate, gamma-butyrolactone, acetonitrile, triallyl amine, triallyl cyanurate, triallyl isocyanurate, water, and combinations thereof. In some embodiments, the cosolvent is nonaqueous. In certain embodiments, the cosolvent comprises DME, DOL, DMC, EMC, or a combination thereof. In one embodiment, the cosolvent is DMC, DME, DOL, or a combination thereof. In an independent embodiment, the cosolvent is DMC. In another independent embodiment, the cosolvent is DME. In yet another independent embodiment, the cosolvent is a combination of DME and DOL. In still another embodiment, the cosolvent is EMC. When solvent A further comprises a flammable cosolvent, the amount of flame retardant in solvent A is sufficient to maintain low flammability or nonflammability of the solvent. Such amounts can be determined by those of ordinary skill in the art having had the benefit of reading this disclosure, and depends on the cosolvent chosen as well as the amount.

In some embodiments, the solvent A comprises, consists essentially of, or consists of a flame retardant compound. In an independent embodiment, the solvent A comprises, consists essentially of, or consists of a flame retardant compound and a cosolvent. As used herein, "consists essentially of" means that solvent A does not include any electrochemically active component in an amount sufficient to affect performance of an electrolyte including the solvent A.

The solvent A associates with (e.g., solvates or coordinates) cations of the active salt or salt mixture. When prepared as a superconcentrated electrolyte comprising the active salt and the solvent A, solvent-cation-anion aggregates form. In contrast to conventional electrolytes comprising a flame retardant compound, some embodiments of the disclosed low flammability or nonflammable superconcentrated electrolytes are stable toward anodes (e.g., a metal or carbon-based anode or silicon-based anode), cathodes (including ion intercalation and conversion compounds), separators (e.g., polyolefin) and current collectors (e.g., Cu, Al) that may be unstable when lower concentration electrolytes are used and/or when other solvents are used. As used herein, "stable" means that the electrolyte component has negligible chemical and electrochemical reactions with the anode, cathode, separator and current collector. In some embodiments, the stability enables high Columbic efficiency, e.g., >98% of battery operation. Additionally, in contrast to conventional low flammability or nonflammable electrolytes, some embodiments of the disclosed LSEs do not suffer from significant decomposition of the flame retardant compound during operation of an electrochemical device including the low flammability or nonflammable LSE. As used herein significant decomposition of the flame retardant compound means that the flame retardant decomposes at the anode or cathode during operation of an electrochemical device including the LSE, thereby measurably reducing performance of the electrolyte over repeated cycling and/or resulting in failure of an electrochemical device including the electrolyte. For example, it has been found that in some electrolytes, e.g., 1 M LiPF$_6$ in EC/EMC, even inclusion of small amounts (5 wt %) of TMPa results in reductive decomposition of the TMPa at a graphitic anode surface and intercalation of the TMPa into a graphitic anode resulting in capacity fade and/or failure of the electrochemical device.

As discussed previously, in a superconcentrated electrolyte it is advantageous to have few, substantially no, or no free solvent molecules, i.e., solvent molecules that are not associated with cations of the active salt or salt mixture. The concentration of the active salt may be selected to minimize the number of free solvent A molecules in the electrolyte. Because more than one molecule of solvent A may be associated with each cation of the active salt and/or because more than cation of the active salt may be associated with each molecule of solvent A, the molar ratio of active salt to solvent A may not be 1:1. In some embodiments, a molar ratio of the active salt to the solvent A (moles salt/moles solvent A) is within a range of from 0.33 to 1.5, such as within a range of from 0.5 to 1.5, 0.67 to 1.5, 0.8 to 1.2, or 0.9 to 1.1.

The diluent is a component in which the active salt is insoluble or has poor solubility, i.e., a solubility at least 1 OX less than the active salt's solubility in the solvent A. For instance, if the salt has a solubility of 5 M in the solvent A, the diluent is selected such that the salt has a solubility of less than 0.5 M in the diluent. In some embodiments, the active salt has a solubility in the solvent A that is at least 10 times, at least 15 times, at least 20 times, at least 25 times, at least 30 times, at least 40 times, or at least 50 times greater than the active salt's solubility in the diluent. The diluent is selected to be stable with the anode, cathode, and current collectors at low active salt concentrations (e.g., ≤3 M) or even without the active salt. In some embodiments, the diluent is selected to have a low dielectric constant (e.g., a relative dielectric constant≤7) and/or low donor number (e.g., a donor number≤10). Advantageously, the diluent does not disrupt the solvation structure of solvent A-cation-anion aggregates and is considered inert because it is not interacting with the active salt. In other words, there is no significant coordination or association between the diluent molecules and the active salt cations. The active salt cations remain associated with solvent A molecules. Thus, although the electrolyte is diluted, there are few or no free solvent A molecules in the electrolyte.

In some embodiments, the diluent comprises an aprotic organic solvent. In certain embodiments, the diluent is a fluorinated solvent having a wide electrochemical stability window (e.g., >4.5 V), such as a hydrofluoroether (HFE) (also referred to as a fluoroalkyl ether). HFEs advantageously have low dielectric constants, low donor numbers, reductive stability with the metal of the active salt (e.g., lithium, sodium, and/or magnesium), and/or high stability against oxidation due to the electron-withdrawing fluorine atoms. Exemplary fluorinated solvents include, but are not limited to, 1,1,2,2-tetrafluoroethyl-2,2,3,3-tetrafluoropropyl ether (TTE), bis(2,2,2-trifluoroethyl) ether (BTFE), 1,1,2, 2,-tetrafluoroethyl-2,2,2-trifluoroethyl ether (TFTFE), methoxynonafluorobutane (MOFB), ethoxynonafluorobutane (EOFB), and combinations thereof.

Flammable:

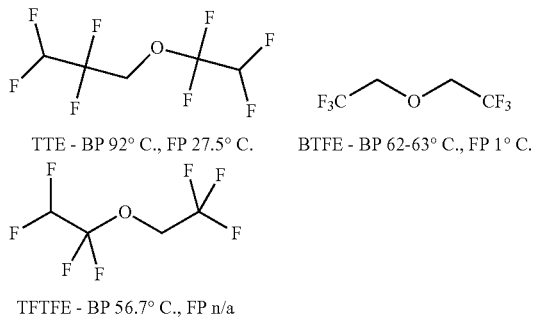

TTE - BP 92° C., FP 27.5° C.    BTFE - BP 62-63° C., FP 1° C.

TFTFE - BP 56.7° C., FP n/a

Nonflammable:

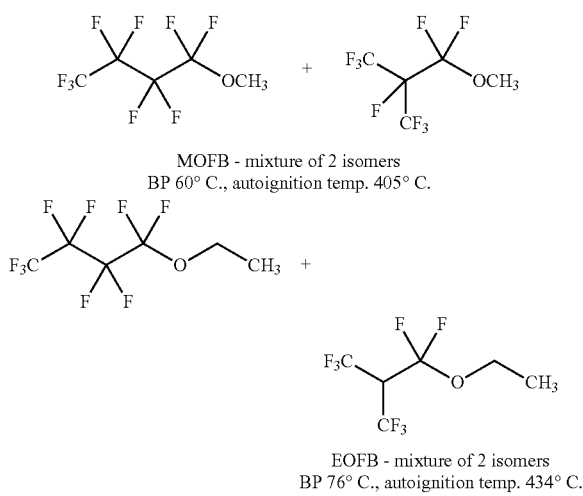

MOFB - mixture of 2 isomers
BP 60° C., autoignition temp. 405° C.

EOFB - mixture of 2 isomers
BP 76° C., autoignition temp. 434° C.

The diluent may be flammable or nonflammable. The electrolyte, however, comprises a sufficient amount of a flame retardant compound, e.g., at least 5 wt % based on a total mass of the electrolyte, to render the electrolyte—active salt, solvent A (flame retardant and, optionally, a cosolvent) and diluent—flame retarded or nonflammable.

In some embodiments of the disclosed low flammability and nonflammable LSEs, at least 90%, at least 95%, at least 96%, at least 97%, at least 98%, or at least 99% of the molecules of solvent A are associated (e.g., solvated or coordinated) with cations of the active salt. In certain embodiments, fewer than 10%, such as fewer than 5%, fewer than 4%, fewer than 3%, or fewer than 2% of the diluent molecules are associated with cations of the active salt. The degree of association can be quantified by any suitable means, such as by calculating the peak intensity ratio of solvent molecules associated with cations and free solvent in Raman spectra or by using NMR spectra.

The relative amounts of the solvent A (flame retardant compound and, optionally, a cosolvent) and diluent are selected to reduce the flammability of the electrolyte, reduce the cost of materials for the electrolyte, reduce viscosity of the electrolyte, maintain stability of the electrolyte against oxidation at high-voltage cathodes, improve ionic conductivity of the electrolyte, improve wetting ability of the electrolyte, facilitate formation of a stable SEI layer, or any combination thereof. In one embodiment, a molar ratio of the solvent A to the diluent (moles solvent A/moles diluent)

in the low flammability or nonflammable electrolyte is within a range of from 0.2 to 5, such as within a range of from 0.2 to 4, 0.2 to 3, or 0.2 to 2. In an independent embodiment, a volumetric ratio of the solvent A to the diluent (L solvent/L diluent) in the low flammability or nonflammable electrolyte is within a range of from 0.2 to 5, such as within a range of from 0.25 to 4 or 0.33 to 3. In another independent embodiment, a mass ratio of the solvent A to the diluent (g solvent/g diluent) in the low flammability or nonflammable electrolyte is within a range of from 0.2 to 5, such as within a range of from 0.25 to 4 or 0.33 to 3.

In some embodiments, a low flammability or nonflammable LSE comprises at least 5 wt % or at least 10 wt % of the flame retardant compound. In certain embodiments, the low flammability or nonflammable LSE comprises 5-75 wt % of the flame retardant compound, such as 5-60 wt %, 5-50 wt %, 5-40 wt % or 5-30 wt %, 10-60 wt %, 10-50 wt %, 10-40 wt %, or 10-30 wt % of the flame retardant compound.

Advantageously, certain embodiments of the disclosed low flammability or nonflammable LSEs allow significant dilution of the active salt without sacrificing performance of the electrolyte. In some examples, the electrolyte performance is enhanced compared to a comparable low flammability or nonflammable superconcentrated electrolyte that does not include the diluent. Due to the interactions between cations of the active salt and molecules of solvent A, the behavior of the electrolyte corresponds more closely to the concentration of the active salt in the solvent A. Because the diluent is present, however, the active salt may have a molar concentration in the electrolyte that is at least 20% less than the molar concentration of the active salt in the solvent A. In certain embodiments, the molar concentration of the active salt in the electrolyte is at least 25% less, at least 30% less, at least 40% less, at least 50% less, at least 60% less, at least 70% less, or even at least 80% less than the molar concentration of the active salt in the solvent A.

In some embodiments, the formation of cation-anion-solvent aggregates also reduces the lowest unoccupied molecular orbital (LUMO) energy of the anions so they can form a stable SEI. As described in Example 10, when the LUMOs of the conduction bands are located at the solvent molecules, the solvent molecules are reductively decomposed at the anode, leading to corrosion of the anode and fast capacity degradation upon cycling. In contrast, the lowest energy level of conduction bands of the anions in certain embodiments of the disclosed LSEs is lower than those of the solvent, indicating that the anions instead of the solvent molecules will be decomposed, forming a stable SEI.

In some embodiments, the diluent is miscible with solvent A. In other embodiments, the diluent is immiscible with solvent A, i.e., the flame retardant compound and/or the co-solvent (if present). When the solvent A and the diluent are immiscible, the electrolyte may not be effectively diluted with the diluent.

Figure 3:
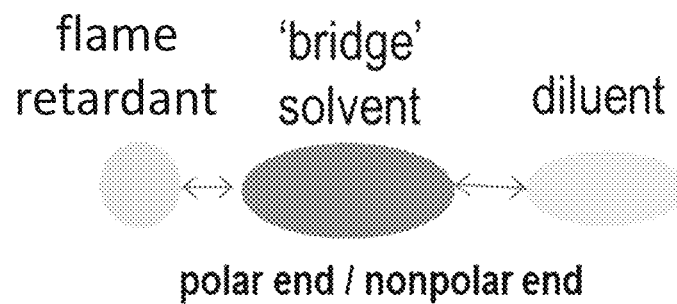
FIG. 3 is a schematic illustration of an exemplary "bridge" solvent molecule between a flame retardant solvent molecule and a diluent molecule.

Accordingly, in some embodiments, when the diluent is immiscible with solvent A, the low flammability or nonflammable electrolyte further comprises a bridge solvent. The bridge solvent has a different chemical composition than either the solvent A or the diluent. The bridge solvent is selected to be miscible with solvent A (flame retardant compound and optional cosolvent) and the diluent, thereby "bridging" the immiscibility of the solvent A with the diluent and enhancing the practical miscibility of solvent A, and the diluent. In some embodiments, molecules of the bridge solvent are amphiphilic, including both a polar end or moiety, and a non-polar end or moiety, such that molecules of the bridge solvent will associate both with molecules of solvent A and molecules of the diluent as shown in FIG. 3, thereby improving the miscibility between solvent A, and the diluent. Exemplary bridge solvents include, but are not limited to, acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), and combinations thereof.

Exemplary solvent, diluent, and, in some instances, bridge solvent combinations include TEPa-BTFE, TEPa-TTE, TMPa-BTFE, TMPa-TTE, TEPa-DMC-BTFE, TEPa-DMC-TTE, TMPa-DMC-BTFE, TMPa-DMC-TTE, EMC-BTFE, EMC-TTE, DMC-BTFE, DME-BTFE, DME-TTE, DOL-DME-TTE, DMSO-TTE, $H_2O$-DMC-TTE, $H_2O$—PC-TTE, $H_2O$-AN-TTE, and $H_2O$-DMSO-TTE. In some embodiments, the active salt is LiFSI, LiTFSI, NaFSI, or NaTFSI.

In some examples, the active salt is LiFSI or NaFSI, the solvent is DMC, DME, or EMC, and the diluent is TTE or BTFE. In certain examples, the salt is LiTFSI or NaTFSI, the solvent is DMSO or a mixture of DME and DOL, and the diluent is TTE. In another independent embodiment, the salt is LiTFSI or NaTFSI, the solvent is $H_2O$, the diluent is TTE, and the bridge solvent is DMC, propylene carbonate (PC), acetonitrile (AN), or DMSO.

Exemplary electrolytes include, but are not limited to, LiFSI/TEPa-BTFE, LiFSI/TEPa-TTE, LiFSI/TMPa-BTFE, LiFSI/TMPa-TTE, LiFSI/TEPa-DMC-BTFE, LiFSI/TEPa-DMC-TTE, LiFSI/TMPa-DMC-BTFE, LiFSI/TMPa-DMC-TTE, LiFSI/DMC-BTFE, LiFSI/DME-BTFE, LiFSI/DME-TTE, LiFSI/EMC-BTFE, LiFSI/EMC-TTE, NaFSI/TEPa-BTFE, NaFSI/TEPa-TTE, NaFSI/TMPa-BTFE, NaFSI/TMPa-TTE, NaFSI/TEPa-DMC-BTFE, NaFSI/TEPa-DMC-TTE, NaFSI/TMPa-DMC-BTFE, NaFSI/TMPa-DMC-TTE, NaFSI/DME-TTE, NaFSI/DME-BTFE, NaFSI/DMC-BTFE, NaFSI/EMC-BTFE, NaFSI/EMC-TTE, LiTFSI/DMSO-TTE, LiTFSI/DME-DOL-TTE, NaTFSI/DMSO-TTE, NaTFSI/DME-DOL-TTE, LiTFSI/$H_2O$-DMC-TTE, LiTFSI/$H_2O$-PC-TTE, LiTFSI/$H_2O$-AN-TTE, LiTFSI/$H_2O$-DMSO-TTE, NaTFSI/$H_2O$-DMC-TTE, NaTFSI/$H_2O$-PC-TTE, NaTFSI/$H_2O$-AN-TTE, NaTFSI/$H_2O$-DMSO-TTE. In some embodiments, the electrolyte is LiFSI/TEPa-BTFE, LiFSI/TEPa-TTE, LiFSI/TMPa-BTFE, LiFSI/TMPa-TTE, LiFSI/TEPa-DMC-BTFE, LiFSI/TEPa-DMC-TTE, LiFSI/TMPa-DMC-BTFE, LiFSI/TMPa-DMC-TTE, NaFSI/TEPa-BTFE, NaFSI/TEPa-TTE, NaFSI/TMPa-BTFE, NaFSI/TMPa-TTE, NaFSI/TEPa-DMC-BTFE, NaFSI/TEPa-DMC-TTE, NaFSI/TMPa-DMC-BTFE, or NaFSI/TMPa-DMC-TTE.

III. Batteries

Embodiments of the disclosed low flammability or nonflammable LSEs are useful in batteries (e.g., rechargeable batteries), sensors, and supercapacitors. Suitable batteries include, but are not limited to, lithium metal batteries, lithium ion batteries, lithium-sulfur batteries, lithium-oxygen batteries, lithium-air batteries, sodium metal batteries, sodium ion batteries, sodium-sulfur batteries, sodium-oxygen batteries, sodium-air batteries, potassium metal batteries, potassium ion batteries, and magnesium ion batteries.

Figure 4:
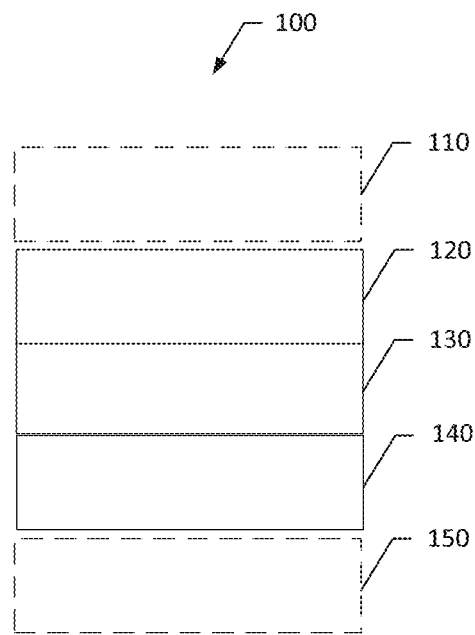
FIG. 4 is a schematic diagram of a battery.

In some embodiments, a rechargeable battery comprises a low flammability or nonflammable LSE as disclosed herein, a cathode, an anode, and optionally a separator. FIG. 4 is a schematic diagram of one exemplary embodiment of a rechargeable battery 100 including a cathode 120, a separator 130 which is infused with an electrolyte (i.e., a low flammability or nonflammable LSE), and an anode 140. In some embodiments, the battery 100 also includes a cathode current collector 110 and/or an anode current collector 150.

The current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. By "free-standing" is meant that the film itself has sufficient structural integrity that the film can be positioned in the battery without a support material.

In some embodiments, the anode is a metal (e.g., lithium, sodium), an intercalation material, or a conversion compound. The intercalation material or conversion compound may be deposited onto a substrate (e.g., a current collector) or provided as a free-standing film, typically, including one or more binders and/or conductive additives. Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). Exemplary anodes for lithium batteries include, but are not limited to, $Mo_6S_8$, $TiO_2$, $V_2O_5$, $Li_4Mn_5O_{12}$, $Li_4Ti_5O_{12}$, C/S composites, and polyacrylonitrile (PAN)-sulfur composites. Exemplary anodes for sodium batteries include, but are not limited to $NaTi_2(PO_4)_3$; $TiS_2$, CuS, $FeS_2$, $NiCo_2O_4$, $Cu_2Se$, and $Li_{0.5}Na_{0.5}Ti_2(PO_4)_3$.

Exemplary cathodes for lithium batteries include, but are not limited to, Li-rich $Li_{1+w}Ni_xMn_yCo_zO_2$ (x+y+z+w=1, 0≤w≤0.25), $LiNi_xMn_yCo_zO_2$ (NMC, x+y+z=1), $LiCoO_2$, $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤y≤1), $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In an independent embodiment, the cathode may be a lithium conversion compound, such as $Li_2O_2$, $Li_2S$, or LiF.

Exemplary cathodes for sodium batteries include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}VOPO_4F_{0.5}$, $NaCo_2O_4$, $Na_2Ti_3O_7$, and $Na_xMO_2$ where 0.4<x≤1, and M is a transition metal or a mixture of transition metals (e.g., $NaCrO_2$, $NaCoO_2$, $NaxCoO_2$ (0.4≤x≤0.9), $Na_{2/3}Ni_{1/3}Mn_{2/3}O_2$, $Na_{2/3}Fe_{1/2}Mn_{1/2}O_2$, $Na_{2/3}Ni_{1/6}Co_{1/6}Mn_{2/3}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$, Prussian white analogue cathodes (e.g., $Na_2MnFe(CN)_6$ and $Na_2Fe_2(CN)_6$), Prussian blue analogue (PBA) cathodes $(Na_{2-x}M_a[M_b(CN)_6]_{1-y} \cdot nH_2O$, wherein Ma and Mb independently are Fe, Co, Ni, or Cu, x=0 to 0.2, y=0 to 0.2, n=1 to 10). Other sodium intercalation materials include $Na_4Ti_5O_{12}$, $Fe_3O_4$, $TiO_2$, $Sb_2O_4$, Sb/C composite, SnSb/C composite, BiSb/C composite, and amorphous P/C composite. In an independent embodiment, the cathode is a sodium conversion compound in which sodium displaces another cation, such as FeSe, $CuWO_4$, CuS, CuO, CuCl, or $CuCl_2$.

Exemplary cathodes for magnesium batteries include, but are not limited to, zirconium disulfide, cobalt (II,III) oxide, tungsten selenide, $V_2O_5$, molybdenum-vanadium oxide, stainless steel, $Mo_6S_8$, $Mg_2Mo_6S_8$, $MoS_2$, $Mo_6S_{8-y}Se_y$, where y=0, 1, or 2, $Mg_xS_3O_4$ where 0<x<1, $MgCoSiO_4$, $MgFeSiO_4$, $MgMnSiO_4$, $V_2O_5$, $WSe_2$, sulfur, poly(2,2,6,6-tetramethylpiperidinyloxy-4-yl methacrylate)/graphene, $MnO_2$/acetylene black, and carbyne polysulfide.

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with an electrolyte, as disclosed herein.

In some embodiments, a battery includes a lithium metal anode, a cathode suitable for a lithium battery as disclosed above, a separator, and a low flammability or nonflammable LSE comprising (i) an active salt selected from LiFSI, LiTFSI, or a combination thereof, (ii) a flame retardant compound selected from TMPa, TEPa, tributyl phosphate, triphenyl phosphate, tris(2,2,2-trifluoroethyl) phosphate, bis (2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof, and (iii) a diluent selected from TTE, BTFE, TFTFE, MOFB, EOFB, or any combination thereof. In certain embodiments, a battery includes a lithium metal anode, a cathode suitable for a lithium battery as disclosed above, a separator, and a low flammability or nonflammable LSE comprising (i) an active salt selected from LiFSI, LiTFSI, or a combination thereof, (ii) a flame retardant compound selected from trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2, 2,2-trifluoroethyl) phosphite; dimethyl methylphosphonate, diethyl ethylphosphonate, diethyl phenylphosphonate, bis(2, 2,2-trifluoroethyl) methylphosphonate; hexamethylphosphoramide; hexamethoxyphosphazene, hexafluorophosphazene, or any combination thereof, (iii) a cosolvent selected from DMC, DME, DOL, DEC, EMC, DMSO, EMS, TMS, or any combination thereof, and (iv) a diluent selected from TTE, BTFE, TFTFE, MOFB, EOFB, or any combination thereof. In certain embodiments, the flame retardant compound is trimethyl phosphate, triethyl phosphate, or combination thereof. In certain independent embodiments, the flame retardant compound is tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof. When the flame retardant compound (and/or optional cosolvent) and diluent are immiscible, the low flammability or nonflammable LSE may further comprise a bridge solvent having a different composition than the flame retardant compound and cosolvent, if present, and a different composition than the diluent, wherein the bridge solvent is miscible with the flame retardant compound, cosolvent (if present), and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. In certain embodiments, the cathode comprises $LiNi_xMn_yCo_zO_2$ (NMC), sulfur/carbon, or an air electrode.

In some embodiments, a battery includes a sodium metal anode, a cathode suitable for a sodium battery as disclosed above, a separator, and a low flammability or nonflammable LSE comprising (i) an active salt selected from NaFSI, NaTFSI, or a combination thereof, (ii) a flame retardant compound selected from TMPa, TEPa, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof, and (iii) a diluent selected from BTFE, TTE, TFTFE, MOFB, EOFB, or any combination thereof. In certain embodiments, a battery includes a sodium metal anode, a cathode suitable for a sodium battery as disclosed above, a separator, and a low flammability or nonflammable LSE comprising (i) an active salt selected from NaFSI, NaTFSI, or a combination thereof, (ii) a flame retardant compound selected from trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof, (iii) a cosolvent selected from DMC, DME, DOL, DEC, EMC, DMSO, EMS, TMS, or any combination thereof, and (iv) a diluent selected from TTE, BTFE, TFTFE, MOFB, EOFB, or any combination thereof. In certain embodiments, the flame retardant compound is trimethyl phosphate, triethyl phosphate, or combination thereof. In certain independent embodiments, the flame retardant compound is tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof. When the flame retardant compound (and/or optional cosolvent) and diluent are immiscible, the low flammability or nonflammable LSE may further comprise a bridge solvent having a different composition than the flame retardant compound and cosolvent, if present, and a different composition than the diluent, wherein the bridge solvent is miscible with the flame retardant compound, cosolvent (if present), and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. In one embodiment, the cathode is $Na_3V_2(PO_4)_3$.

In some embodiments, a battery including a low flammability or nonflammable LSE as disclosed herein has a performance equal to, or even better than, a comparable battery including a superconcentrated electrolyte comprising a flame retardant compound. For instance, the battery including the low flammability or nonflammable LSE may have a CE greater than or equal to a comparable battery including a low flammability or nonflammable concentrated electrolyte. In some embodiments, the battery has a CE≥95%, such as ≥96%, ≥97%, ≥98%, ≥99%, or even≥99.5%. The battery also may have a greater discharge capacity and/or cycling stability compared to a battery including a low flammability or nonflammable superconcentrated electrolyte. In some embodiments, the low flammability or nonflammable LSE provides dendrite-free plating on the anode at high current densities (e.g., 0.5-10 mA cm$^{-2}$) with CE greater than 99%. Embodiments of batteries including low flammability or nonflammable LSEs as disclosed herein demonstrate stable cycling performance (e.g., as evidenced by a stable CE and/or specific capacity) over a period of at least 10 cycles, at least 25 cycles, at least 50 cycles, at least 75 cycles, at least 100 cycles, at least 200 cycles, or at least 300 cycles. For example, the battery may demonstrate stable cycling performance for 10-500 cycles, such as 25-500 cycles, 50-500 cycles, 100-500 cycles, 200-500 cycles, or 300-500 cycles. In addition, synergistic effects arising from lower viscosity and higher conductivity of the disclosed low flammability and nonflammable LSEs also contribute to the superior electrochemical performances of electrochemical devices including certain embodiments of the disclosed low flammability and nonflammable LSEs.

Figure 45:
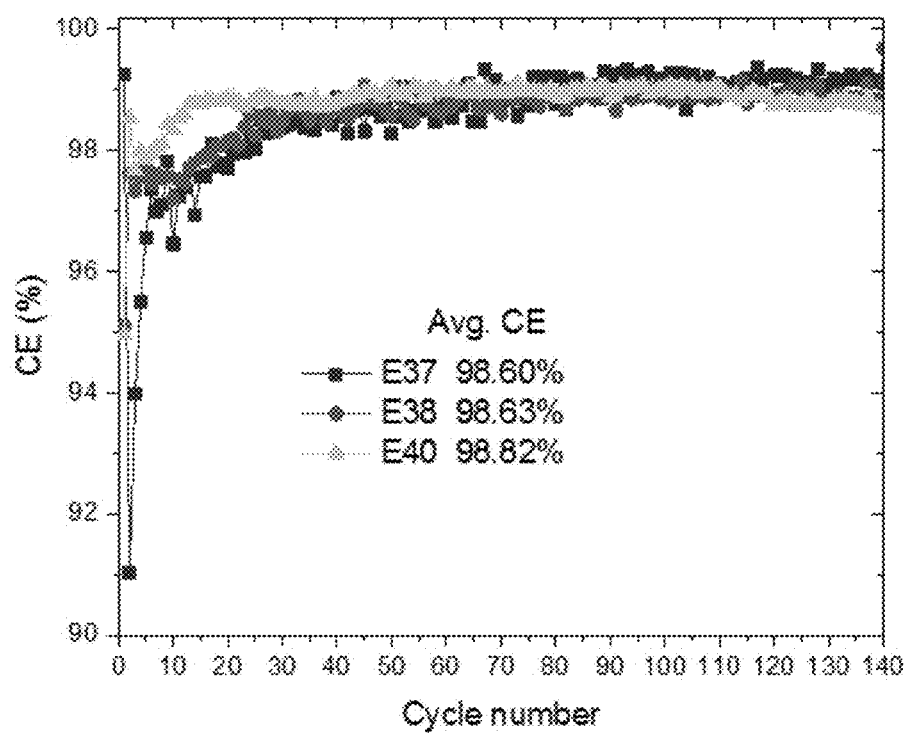
FIG. 45 is a graph of coulombic efficiency as a function of cycle number for 3.8 M LiFSI:TEPa, (E37), 1.5 M LiFSI:TEPa:BTFE (E39), and 1.2 M LiFSI:TEPa:BTFE (E40). Cycling was performed at 0.5 mA·cm$^{-2}$ with a Li deposition areal capacity of 1 mAh·cm$^{-2}$.

In one example, Li‖Cu cells including an electrolyte comprising 1.2-1.5 M LiFSI:TEPa:BTFE were demonstrated to have a comparable or superior coulombic efficiency to an electrolyte comprising 3.2 M LiFSI/TEPa (Example 11, FIG. 45). Li‖NMC cells using BTFE-diluted electrolytes exhibited higher discharge capacities and better cycling stability than the 3.2 M LiFSI/TEPa electrolyte (Example 11, FIG. 46). Similar results were found with LiFSI:TEPa:TTE electrolytes (Example 12, FIGS. 49, 50). LiFSI:TMPa:BTFE electrolytes provided greater coulombic efficiency (99.2%) than a 4.1 M LiFSI/TMPa electrolyte (98.5%) (Example 13, FIGS. 51A-51B), and exhibited high capacity, good cycling stability and high efficiency (Example 13, FIG. 52). Electrolytes comprising a cosolvent—i.e., LiFSI:TMPa:DMC:BTFE—provided coulombic efficiencies of >99.3% in Li‖Cu cells.

In summary, certain embodiments of the disclosed low flammability and nonflammable LSEs are safer than conventional, flammable electrolytes, are cost-effective, enable dendrite-free plating, provide high CE, and/or greatly enhance fast charging and/or stable cycling of batteries.

Without wishing to be bound by a particular theory of operation, the advantages of certain embodiments of the disclosed low flammability and nonflammable LSEs are due to the 'inert' nature of the hydrofluoroether diluent that does not break the localized salt/solvent high concentration solvation structures, but plays an important role in improving the interfacial stablity of the metal anode. This outstanding performance is even superior over than that achieved in low flammability or nonflammable superconcentrated electrolytes, e.g., 4.1 M LiFSI:TEPa or 4.1 M LiFSI:TMPa. Embodiments of the disclosed low flammability and nonflammable LSEs are useful with many battery types, such as lithium-lithium intercalation compounds or lithium intercalation compounds, lithium-sulfur batteries, lithium-oxygen batteries, lithium-air batteries, sodium metal batteries, sodium ion batteries, sodium-air batteries, sodium-sulfur batteries, sodium-oxygen batteries, and magnesium ion batteries.

IV. Examples

Materials

Lithium hexafluorophosphate ($LiPF_6$), dimethyl carbonate (DMC), ethylene carbonate (EC), and ethyl methyl carbonate (EMC) (all in battery-grade purity) were obtained from BASF Corporation (Florham Park, N.J.). Trimethyl phosphate (TMPa, ≥99%) and Triethyl phosphate (TEPa, ≥99%) from Sigma Aldrich, and bis(2,2,2-trifluoroethyl) ether (BTFE, 99%) and 1,1,2,2-tetrafluoroethyl-2,2,3,3-tetrafluoropropyl ether (TTE, 99%) from SynQuest Labs, were dried with molecular sieves prior to use. Lithium bis(fluorosulfonyl)imide (LiFSI) was obtained from Nippon Shokubai (Japan) and used after drying at 120° C. in vacuum for 24 h. The electrolytes were prepared by dissolving the desired amount of salt into the solvents. Li chips were purchased from MTI Corporation (Richmond, Calif.). Cu and Al foils were purchased from All Foils (Strongsville, Ohio). The NMC ($LiNi_{1/3}Mn_{1/3}Co_{1/3}O_2$ and $LiNi_{0.6}Mn_{0.2}Co_{0.2}O_2$) cathode electrode was prepared in the Advanced Battery Facility (ABF) located at Pacific Northwest National Laboratory by mixing NMC, super C carbon, polyvinylidene fluoride (PVDF) binder at a mass ratio of 96:2:2 in N-Methyl-2-pyrrolidone (NMP) and coating the slurry onto Al foil. The NCA ($LiNi_{0.85}Co_{0.1}Al_{0.05}O_2$) and LCO ($LiCoO_2$) cathode electrodes were obtained from Argonne National Laboratory. The electrode laminates were punched into discs (1.27 $cm^2$) after being pre-dried and further dried at ~75° C. under vacuum for 12 h. The materials were stored and handled in an MBraun LABmaster glove box (Stratham, N.H.) with an argon atmosphere ($O_2$<0.1 ppm and $H_2O$<0.1 ppm).

Material Characterizations

Morphology observations and EDS measurements of cycled electrodes were performed on a FEI Quanta or a Helios focused ion beam scanning electron microscope (SEM) (Hillsboro, OR)at 5.0 kV. For sample preparation, the cycled electrodes were soaked in pure DMC for 10 min and then rinsed with pure DMC at least 3 times to eliminate remaining electrolytes, and finally dried under vacuum. The cross-sections were obtained by using a razor blade to cut the electrodes. The XPS was performed with a Physical Electronics Quantera scanning X-ray microprobe (Chanhassen, Minn.), which was outfitted with a monochromatic Al Kα X-ray source (1,486.7 eV) for excitation. To avoid side reactions or electrode contamination with ambient oxygen and moisture, samples from cycled electrodes were transported from the glovebox to the SEM and XPS instruments in a hermetically sealed container protected by argon gas. Raman spectra were collected using a Raman spectrometer (Horiba LabRAM HR) with sub-1 $cm^{-1}$ spectral resolution, with all the samples sealed in a test glass tube. The viscosity (η) of the electrolytes was measured on a Brookfield DV-II+ Pro Viscometer (Middleboro, Mass.) at temperatures of 5° C. and 30° C.

The diffusion coefficients of $Li^+$ cation, $FSI^-$ anion and solvent molecules (DMC and BTFE) denoted to $D_{Li}$, $D_{FSI}$, $D_{DMC}$/$D_{BTFE}$ were measured by using the $^7Li$, $^{19}F$, and $^1H$ pulsed field gradient (PFG) NMR, respectively, in the temperature range of 0~50° C. on a 600 MHz NMR spectrometer (Agilent Tech, Santa Clara, Calif.) equipped with a 5 mm liquid NMR probe (Doty Scientific, Columbia, S.C.), with a maximum gradient strength of ~31 T $m^{-1}$. Bipolar pulsed gradients stimulated echo sequence (Dbppste in VNMRJ, vender supplied sequence) with a 90 degree pulse lengths of 5.5, 7 and 12 μs were employed at Larmor frequencies of 599.8, 564.3, and 233.1 MHz for $^1H$, $^{19}F$ and $^7Li$ PFG-NMR, respectively. The echo profile S(g) obtained as a function of gradient strength (g) were fit with the Stejskal-Tanner equation [1] (Stejskal et al., J. Chem. Phys. 1965, 42:288-292):

$$S(g)=S(0)\exp[-D(\gamma\delta g)^2(\Delta-\delta/3)] \quad [1]$$

where S(g) and S(0) are peak intensities at a gradient strength of g and 0, respectively, D is diffsuion coeffcient, γ is the gyromagnetic ratio of observing nuclei, δ and Δ are the gradient pulse length and the duration of the two gradient pulses, respectively. δ and Δ were fixed at 2 ms and 30 ms for all measurements and varied g values to obtain a sufficient decay in the echo profiles.

Electrochemical Measurements

Ionic conductivity was measured using BioLogic MCS 10 Fully Integrated Multichannel Conductivity Spectroscopy with a cell made of two parallel Pt electrodes over a temperature range of 5 to 30° C. The conductivity cell constants were pre-determined using conductivity standard solution from Okalon Inc.

Electrochemical cycling tests were carried out using CR2032-type coin cells of a two-electrode configuration with constant current mode on battery testers (Land BT2000 and Arbin BT-2000, Arbin Instruments, College Station, Tex.) at 30° C. in environmental chambers. Coin cells (Li||Cu, Li||Li,Li||NMC, Li||NCA, and Li||LCO) were assembled in the glove box with a Li chip as both the counter and reference electrode. Celgard® 2500 polypropylene membrane was used as the separators except for cells with concentrated LiFSI/DMCelectrolytes for which Celgard® 3501 surfactant-coated polypropylene membranes were used to ensure good wetting due to the wettability issue with Celgard® 2500 membrane. To standardize the testing, 200 μL of electrolyte (excess amount) was added in each coin cell despite some spilling during cell crimping process. For Li||Cu cells, the effective area of the Cu foil for Li deposition was 2.11 $cm^2$ (diameter 1.64 cm). During each cycle, a desired amount of Li metal was deposited on the Cu substrate at various current densities and then stripped until the potential reached 1.0 V vs $Li/Li^+$. Li|Li symmetric cells were assembled with Li metal used as the working and counter electrodes. All the Li||NMC, Li||NCA and Li||LCO batteries were assembled using Al-clad coin cell cans for the cathode part to element the corrosion of stainless steel can and the side effects at high voltage. The cells were tested between 2.7 and 4.3 V for Li||NMC333, 2.8-4.4 V for Li||NMC622 and Li||NCA, and 3.0-4.35 V for Li||LCO batteries. 1 C is equal to 160 mA $g^{-1}$ of active NMC333 and LCO, 180 mA $g^{-1}$ of NMC622, and 190 mA $g^{-1}$ of NCA materials.

Linear sweep voltammetry (LSV) studies of the electrolyte solutions were conducted in a coin cells using a 2.11 cm² Al foil disk as working electrode on a CHI660C workstation (CH Instruments, Inc., Austin, Tex.) with a scan rate of 0.2 mV/s from OCV (open circuit voltage) to 6 V.

Coulombic Efficiency (CE) Measurement

The following protocol was used to measure average CE of Li metal anode using a Li∥Cu coin cell: 1) one initial formation cycle with Li plating of 5 mAh/cm² on Cu and stripping to 1 V; 2) Plate at 5 mAh/cm² Li on Cu as Li reservoir; 3) repeatedly strip/plate Li with 1 mAh/cm² (or strip to 1 V if over-potential>1 V is needed to strip Li with 1 mAh/cm²) for 9 (n=9) cycles; 4) Strip all Li to 1 V. Current: 0.5 mA/cm². Avg. CE is calculated by dividing the total stripping capacity by the total plating capacity based on the following formula:

$$CE_{avg.} = \frac{nQ_{cycle,strip} + Q_{strip}}{nQ_{cycle,plate} + Q_{reservoir}} \times 100$$

where n is the cycle number at the charge capacity of $Q_{cycle,strip}$ and discharge capacity of $Q_{cycle,plate}$; $Q_{strip}$ is the charge capacity during the final stripping, and $Q_{reservoir}$ is the amount of deposition lithium during step 2.

MD Simulations

First-principles density functional theory (DFT) and ab initio molecular dynamics (AIMD) simulations were used to characterize the DMC-LiFSI solvation structure in localized superconcentrated electrolyte. All calculations were performed using the Vienna ab Initio Simulation Package (VASP) (Kresse et al., *Phys. Rev. B* 1996, 54:11169-11186; Kresse et al., *Phys. Rev. B* 1993, 47:558-563; Kresse et al., *Phys. Rev. B* 1994, 49:14251-14269).

Electron-ion interactions were described by the projector-augmented wave (PAW) pseudopotentials with the cutoff energy of 400 eV (Blochl, *Phys Rev B* 1994, 50:17953-17979; Kresse et al., *Phys Rev B* 1999, 59:1758-1775). The exchange-correlation functional was represented using the Perdew-Burke-Ernzerhof generalized gradient approximation (GGA-PBE) (Perdew et al., *Phys Rev Lett* 1996, 77:3865-3868). The exchange-correlation functional with a Gaussian smearing width term of 0.05 eV was used in the calculations of electrolytes and LiFSI salt interacting with Li metal anode surface systems. The Monkhorst-Pack k-point mesh grid scheme (4×4×1) was used to obtain the optimized Li anode surface and adsorption of electrolyte and salt molecules in the ground state. The convergence criteria for electronic self-consistent iteration and ionic relaxation were set to $1\times10^{-5}$ eV and $1\times10^{-4}$ eV, respectively. AIMD simulations of electrolyte-salt mixtures were performed in the canonical (NVT) ensemble at 303 K. The constant temperature of AIMD simulation systems was controlled using the Nose thermostat method with a Nose-mass parameter of 0.5. The time step of 0.5 fs was used in all AIMD simulations. A Monkhorst-Pack k-point mesh grid scheme (2×2×2) was used in AIMD simulations. The total AIMD simulation time for each electrolyte/salt system was 15 ps. The AIMD trajectory of final 5 ps was used to obtain radial distribution functions of Li—O pairs.

Example 1

Lithium Metal Batteries with LiFSI/EMC-BTFE and LiFSI/EMC-TTE Electrolytes

Figure 5A:
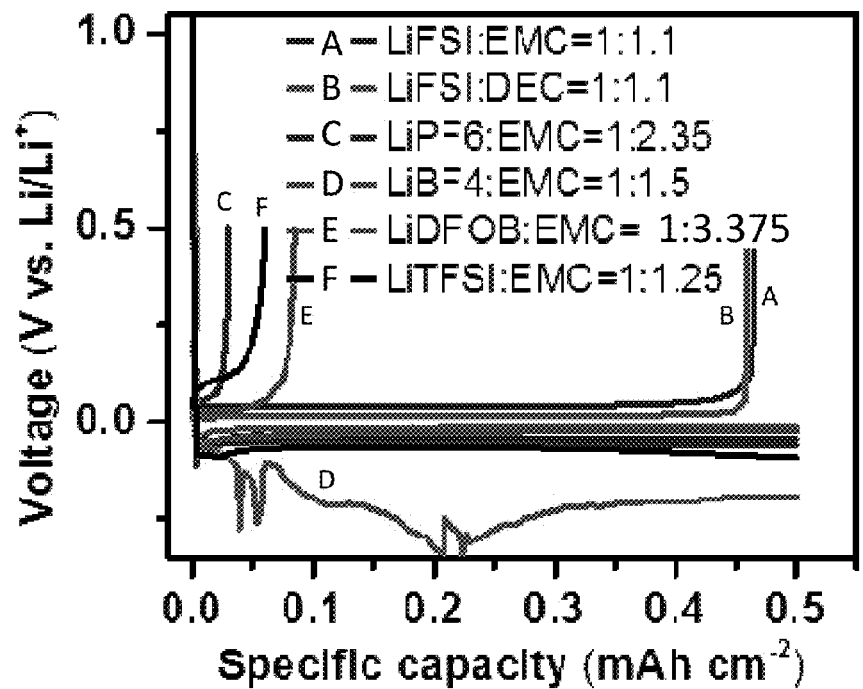
FIGS. 5A and 5B show initial lithium deposition/stripping voltage profiles (FIG. 5A) and coulombic efficiency as a function of cycle number (FIG. 5B) for Li∥Cu cells having a lithium areal deposition capacity of 0.5 mAh cm$^{-2}$, tested at 1 mA cm$^{-2}$ with various concentrated electrolytes comprising lithium salts in carbonate solvents.
Figure 5B:
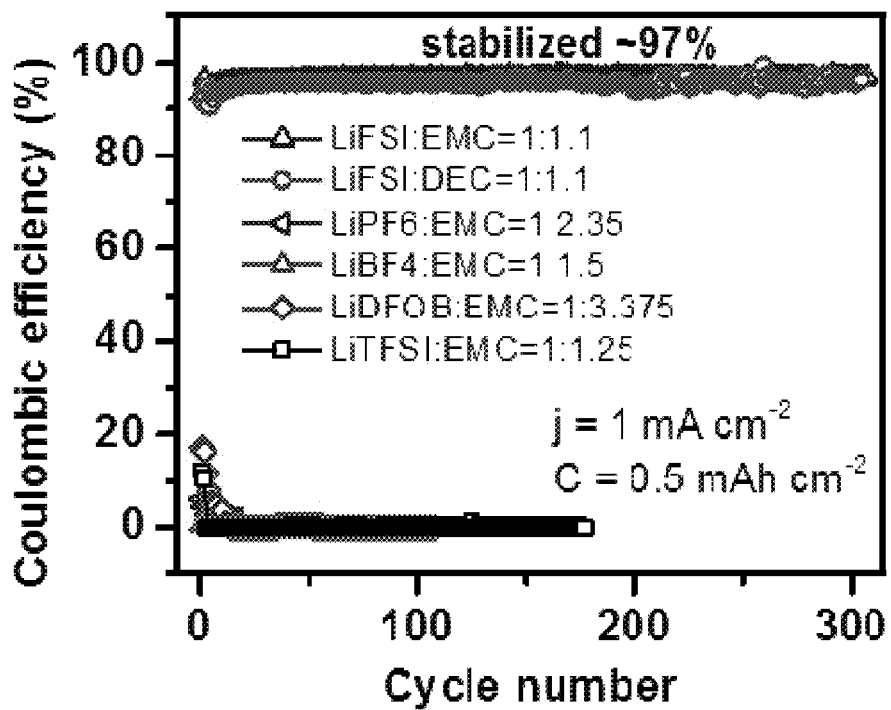

The coulombic efficiencies (CEs) of Li∥Cu cells using different superconcentrated Li salts in carbonate solvent were evaluated. The solubility of different salts in carbonate solvents, e.g. EMC, is different, as reflected by the Li salt:solvent molar ratios shown in FIG. 5A. For example, the $LiPF_6$:EMC ratio is ca. 1:2.35 in a saturated $LiPF_6$/EMC solution, while the LiFSI:EMC ratio could be as high as 1:1.1 in a saturated LiFSI/EMC solution. The Li∥Cu cells were cycled at 1 mA cm$^{-2}$, with lithium deposition/stripping areal capacity of 0.5 mAh cm$^{-2}$ in each cycle. The CE data in FIG. 5B shows that only the concentrated electrolytes based on LiFSI salt, for example LiFSI/EMC (molar ratio 1:1.1, 8.73 mol kg$^{-1}$), could enable the reversible Li deposition/stripping with a stabilized CE of ~97%.

Fluoroalkyl ethers were used to dilute the concentrated LiFSI/EMC (molar ratio 1:1.1, 8.73 mol kg$^{-1}$) electrolyte. The LiFSI salt was confirmed insoluble in the fluoroalkyl ethers, e.g., TTE. On the other hand, TTE is misable with EMC. Therefore, the fluoroalkyl ethers are considered an 'inert' diluent of the electrolyte without participating in the solvation of LiFSI. The electrolyte formulations and the corresponding mole numbers of these electrolytes are shown in Table 1.

TABLE 1

Electrolyte number and formulations

| Electrolyte number | Electrolyte formulation LiFSI:EMC:diluent molar ratio | M (mol L$^{-1}$) | m (mol kg$^{-1}$) |
|---|---|---|---|
| E1 | LiFSI:EMC = 1:1.1 | 4.9 | 8.73 mol kg$^{-1}$ |
| E2 | LiFSI:EMC:BTFE = 1:1.1:0.55 | 3.5 | 4.66 mol kg$^{-1}$ |
| E3 | LiFSI:EMC:TTE = 1:1.1:0.55 | | 4.13 mol kg$^{-1}$ |

Figure 6:
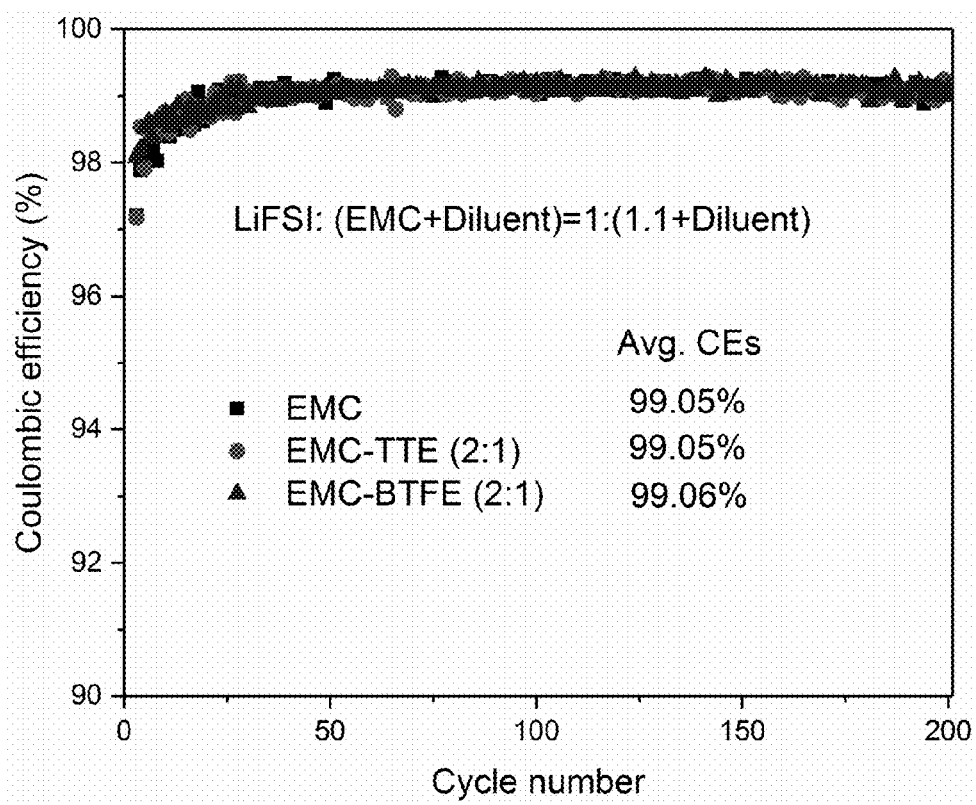
FIG. 6 is a graph of coulombic efficiency as a function of cycle number for Li∥Cu cells having a lithium areal deposition capacity of 1 mAh cm$^{-2}$, tested at 0.5 mA cm$^{-2}$ with electrolytes comprising concentrated LiFSI in ethyl methyl carbonate (EMC) with and without fluoroalkyl ether diluents.

In E2 and E3, the localized superconcentrated LiFSI/EMC (1:1.1) solvation cation-anion aggregates (AGGs) are well maintained, beneficial for achieving higher CE for reversible Li deposition/stripping. The formation of Li$^+$—FSI$^-$-solvent aggregates also reduces the lowest unoccupied molecular orbital (LUMO) energy of the FSI$^-$ anions so they can be decomposed first to form a stable SEI. With adding fluoroalkyl ethers to a EMC:fluoroalkyl ether ratio of 2:1, the concentration of LiFSI/EMC-fluoroalkyl ether is largely decreased, which is calculated to be 4.66 mol kg$^{-1}$ for LiFSI/EMC-BTFE (2:1) and 4.13 mol kg$^{-1}$ for LiFSI/EMC-TTE (2:1). As shown in FIG. 6, with the addition of fluoroalkyl ethers, i.e. TTE, BTFE as diluent, the average CEs of Li∥Cu cells from 3$^{rd}$ to 86$^{th}$ cycles are up to 98.95%, which is comparable to that of the parent superconcentrated LiFSI/EMC electrolyte (98.93%).

Figure 7:
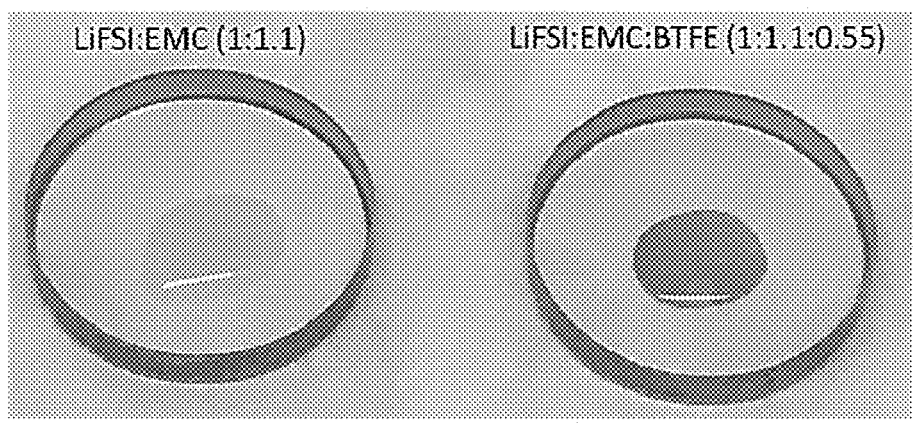
FIG. 7 shows digital photographs demonstrating that addition of bis(2,2,2-trifluoroethyl) ether (BTFE) to an LiFSI/EMC electrolyte improved wetting of a battery separator.
Figure 8A:
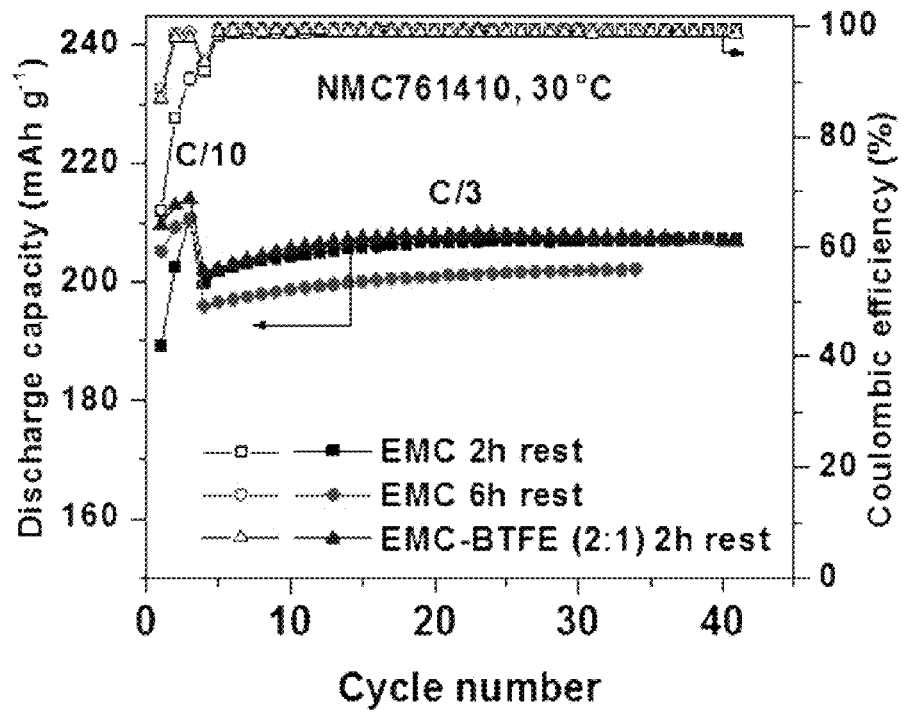
FIGS. 8A and 8B are graphs showing the cycling stability of Li∥NMC761410 (LiNi$_{0.76}$Mn$_{0.14}$Co$_{0.10}$O$_2$) cells containing concentrated LiFSI/EMC electrolyte without and with BTFE diluent at C/3 (FIG. 8A) and 1 C rates (FIG. 8B) (BTFE:bis(2,2,2-trifluoroethyl) ether).
Figure 8B:
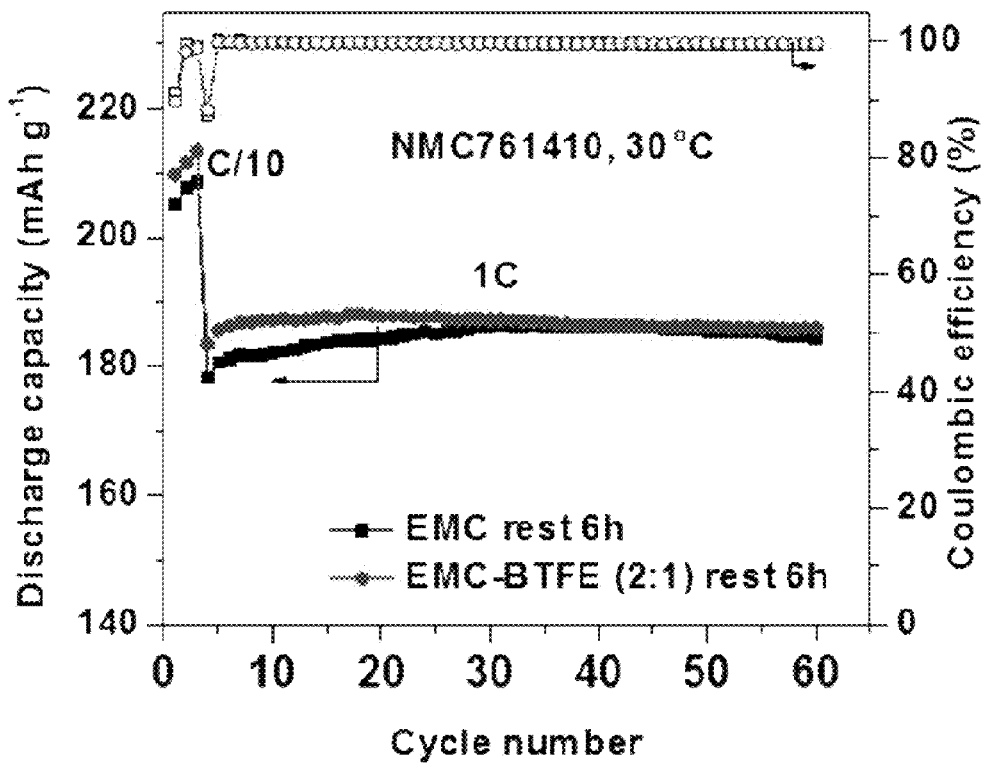

The cycling performance of Li∥NMC cells with concentrated LiFSI/EMC electrolyte without and with BTFE diluent was investigated. Improved wetting of the Celgard® 2500 separator could be visually observed after addition of BTFE, as presented in FIG. 7. The cells were cycled either at C/3 or 1 C with a charge cutoff voltage of 4.5 V. FIG. 8A shows that the addition of BTFE as diluent largely shortened the rest time required to wet the electrode/separator. Cycling performance result shows that the Li∥NMC cell using BTFE diluted LiFSI/EMC-BTFE (2:1) electrolyte exhibits comparable discharge capacity, cycling stability and CE during cycling at both C/3 and 1 C rates, as shown in FIGS. 8A and 8B, respectively. The result suggests that addition of BTFE or TTE as a diluent does not compromise the oxidative stability of the concentrated electrolyte.

Figure 9A:
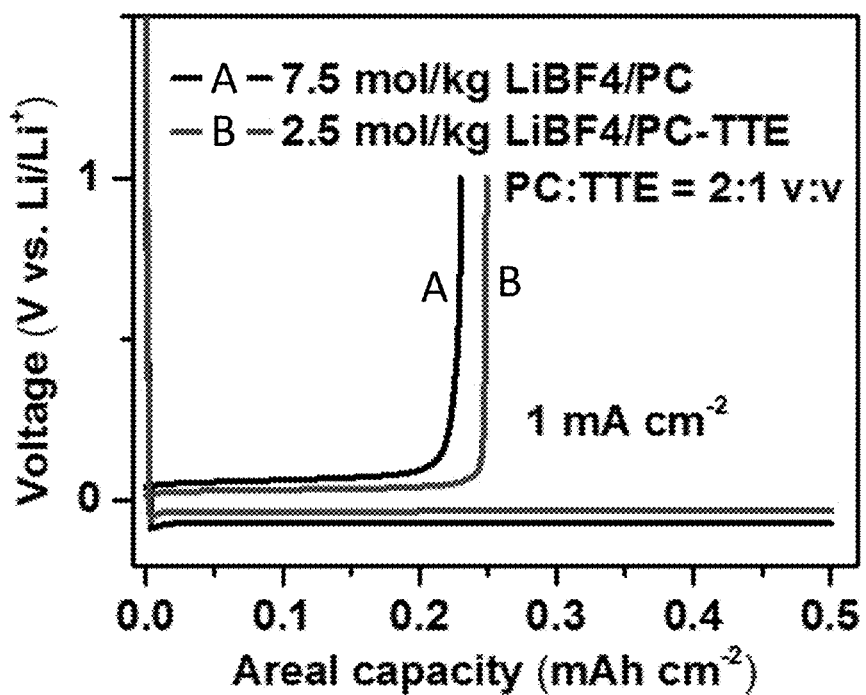
FIGS. 9A and 9B how initial lithium deposition/stripping voltage profiles (FIG. 9A) and coulombic efficiency as a function of cycle number (FIG. 9B) for Cu∥Li cells having a lithium areal deposition capacity of 0.5 mAh/cm$^2$ with electrolytes comprising 7.5 mol/kg LiBF$_4$/PC and 2.5 mol/kg LiBF$_4$/PC-TTE (PC:TTE=2:1 v:v) (TTE: 1,1,2,2-Tetrafluoroethyl 2,2,3,3-tetrafluoropropyl ether).
Figure 9B:
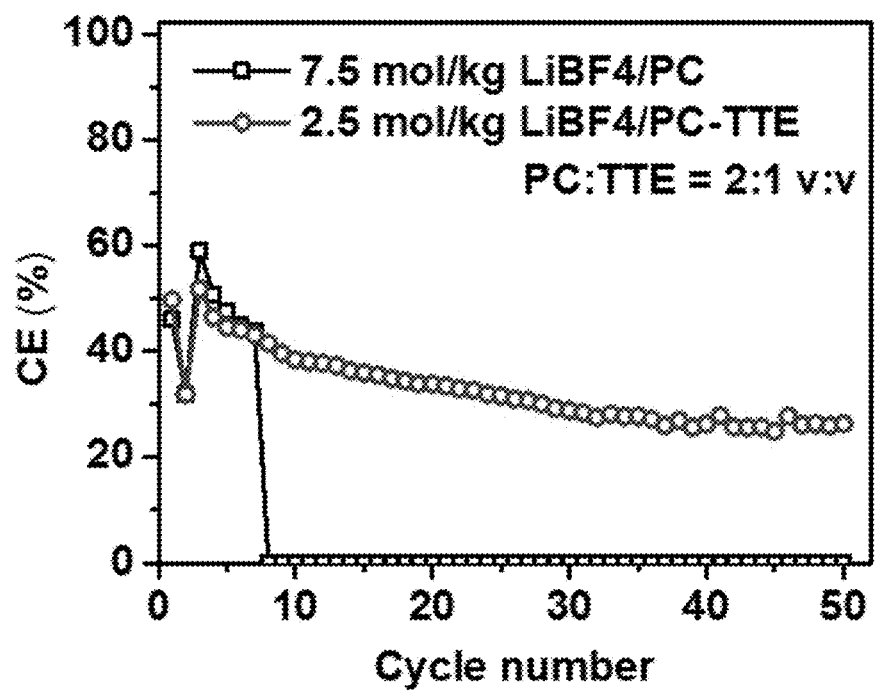
Figure 10A:
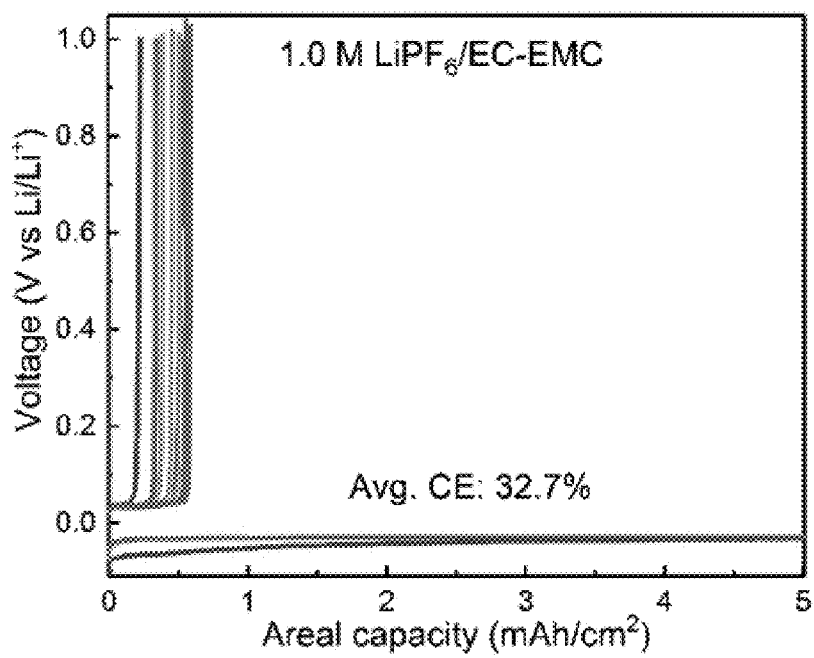
FIGS. 10A-10D are Li plating/stripping profiles of Li∥Cu cells using conventional electrolyte (1.0 M LiPF$_6$/EC-EMC (4:6, w)) (FIG. 10A), 1.2 M LiFSI/DMC (FIG. 10B), 3.7 M LiFSI/DMC (FIG. 10C), and 5.5 M LiFSI/DMC (FIG. 10D).
Figure 10B:
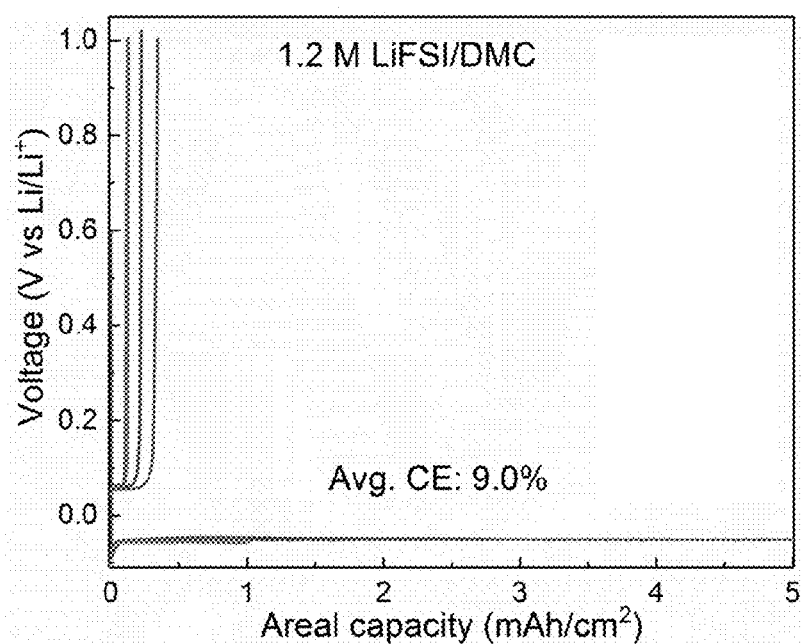
Figure 10C:
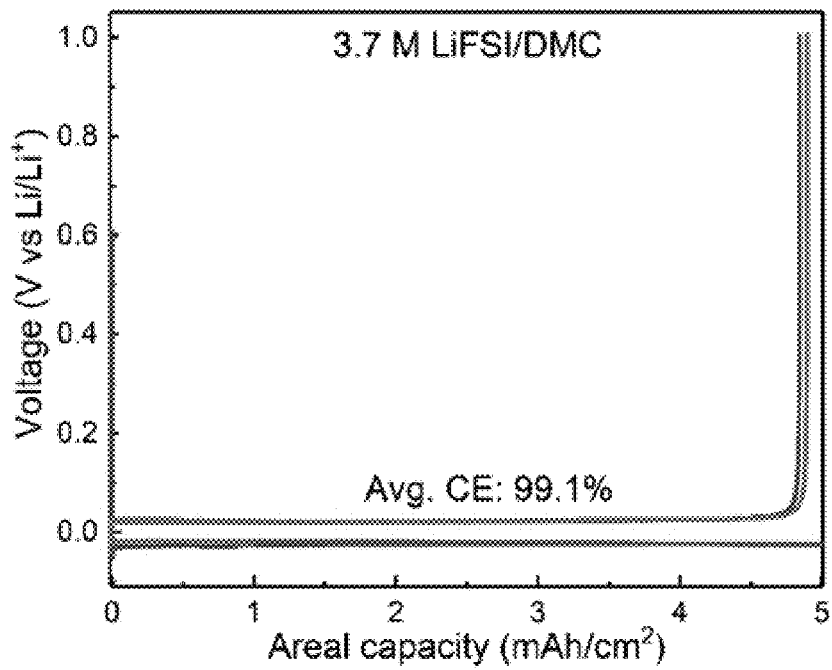
Figure 10D:
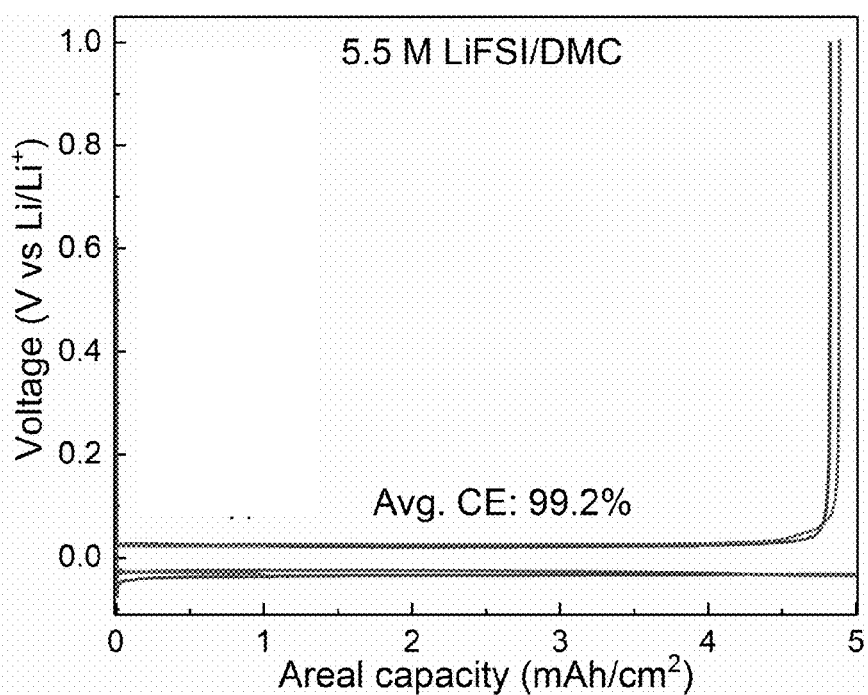
Figure 11A:
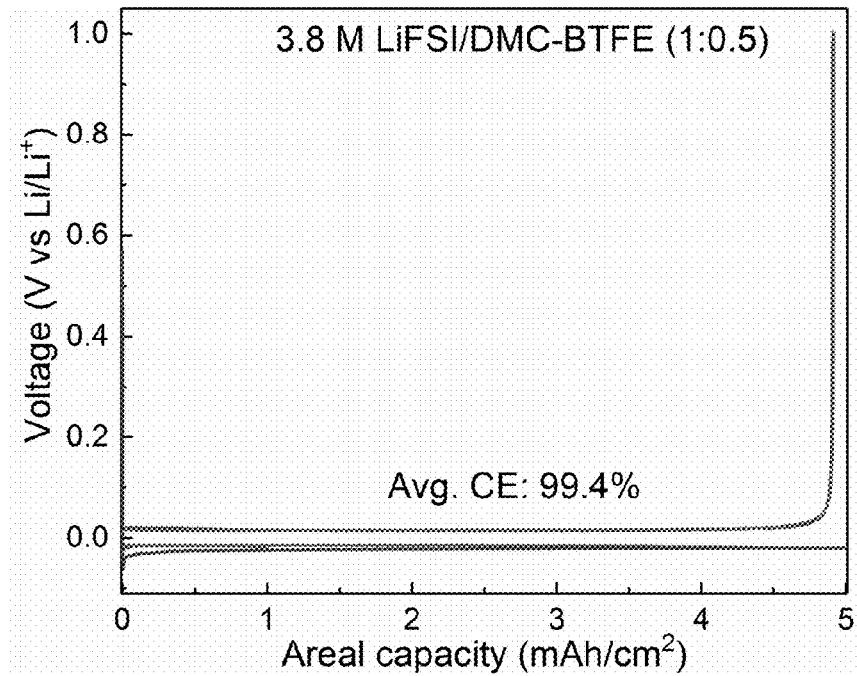
FIGS. 11A-11D are Li plating/stripping profiles of Li∥Cu cells using concentrated 3.8M LiFSI/DMC-BTFE (1:0.5) (FIG. 11A), 2.5M LiFSI/DMC-BTFE (1:1) (FIG. 11B), 1.8M LiFSI/DMC-BTFE (1:1.5) (FIG. 11C), and 1.2M LiFSI/DMC-BTFE (1:2) (FIG. 11D). The ratios in the parentheses indicate the molar ratios of DMC:BTFE.
Figure 11B:
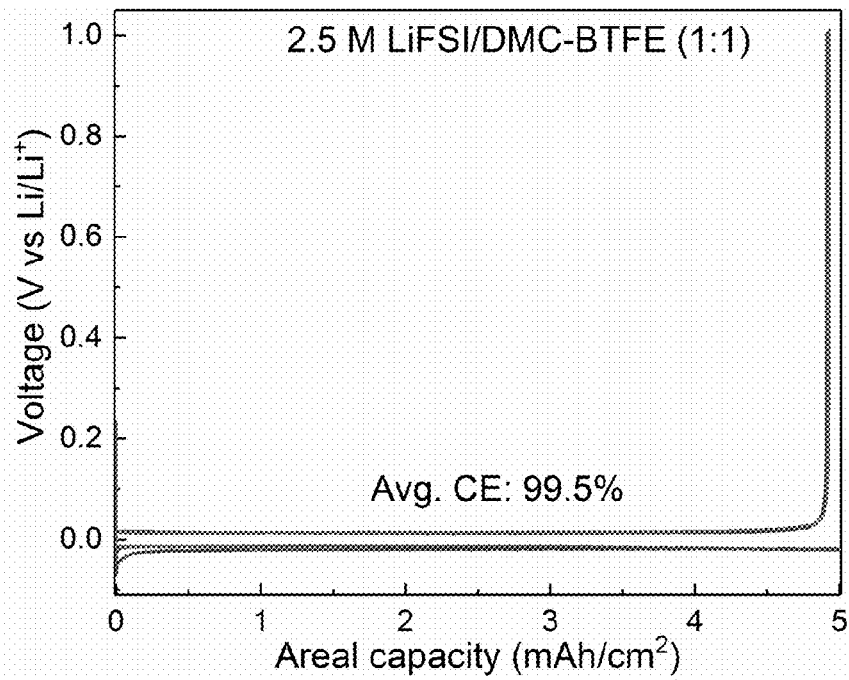
Figure 11C:
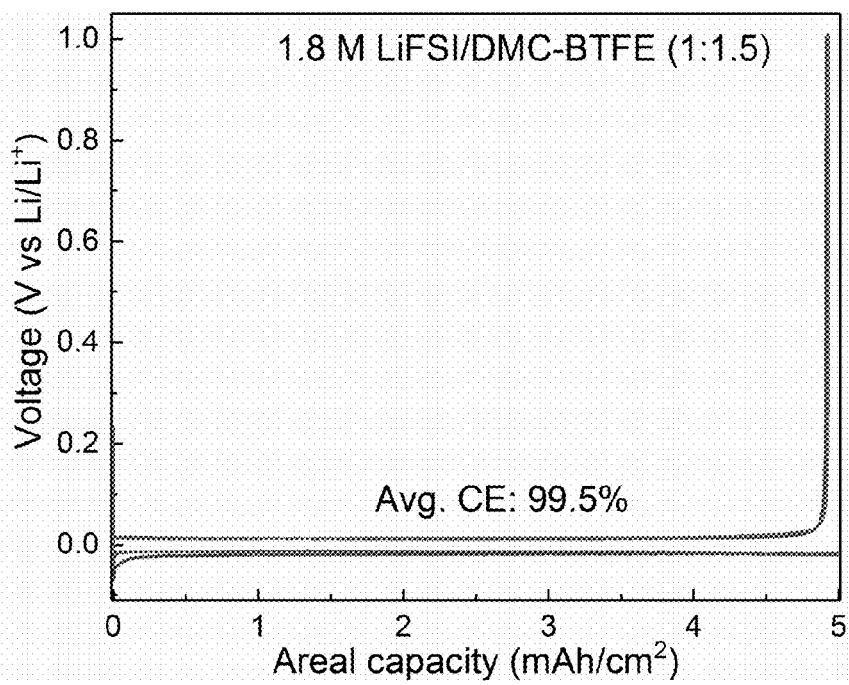
Figure 11D:
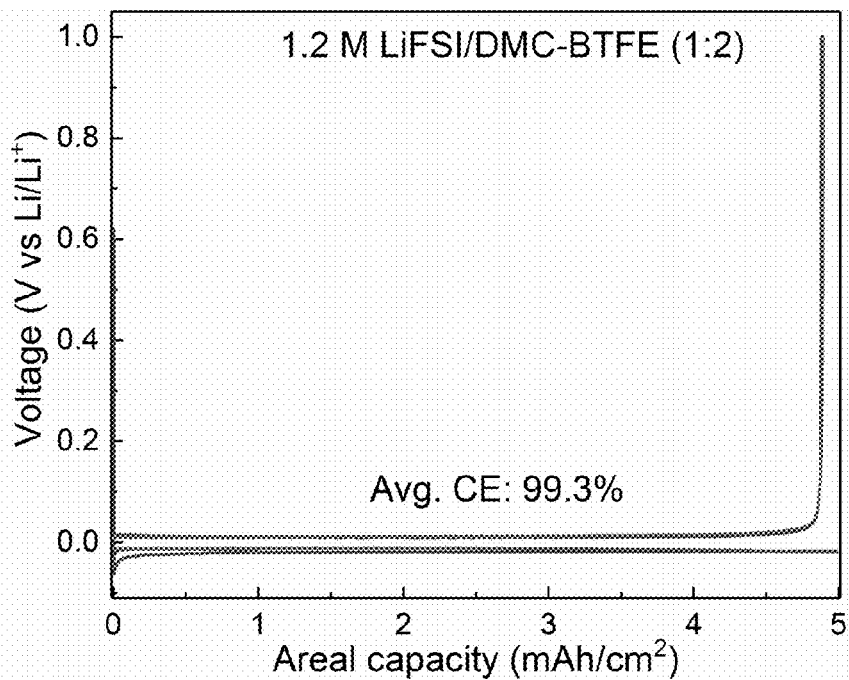
Figure 12C:
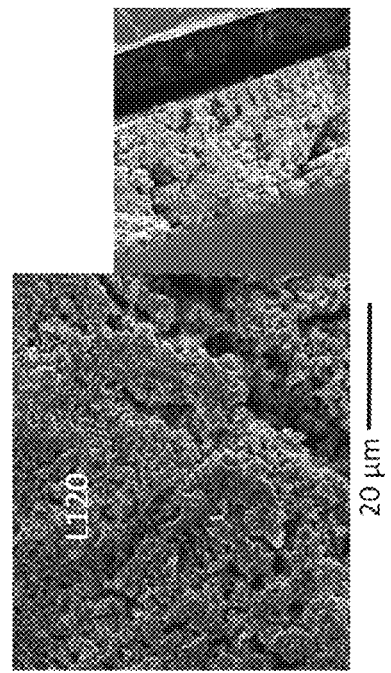
FIGS. 12A-12D are scanning electron microscopy images of lithium plated onto copper substrates after 100 cycles (1 mA/cm$^2$ to 0.5 mAh/cm$^2$) from 1.0 M LiPF$_6$/EC-EMC (FIG. 12A), 5.5 M LiFSI/DMC (FIG. 12B), 3.7 M LiFSI/DMC (FIG. 12C), and 1.2 M LiFSI/DMC-BTFE (1:2) (FIG. 12D) electrolytes.
Figure 12D:
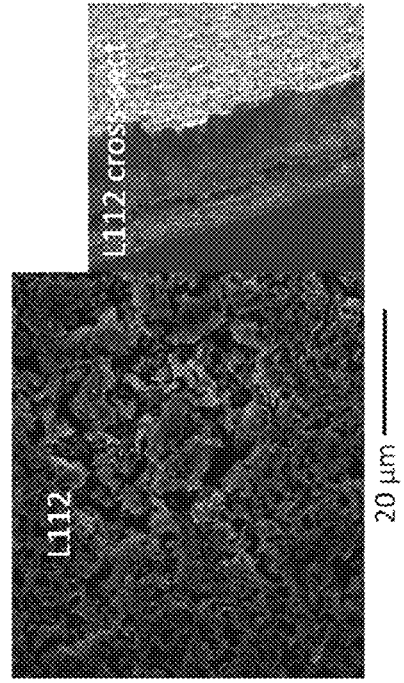
Figure 12A:
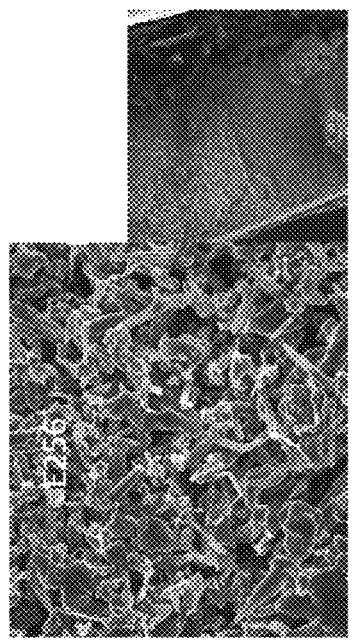
Figure 12B:
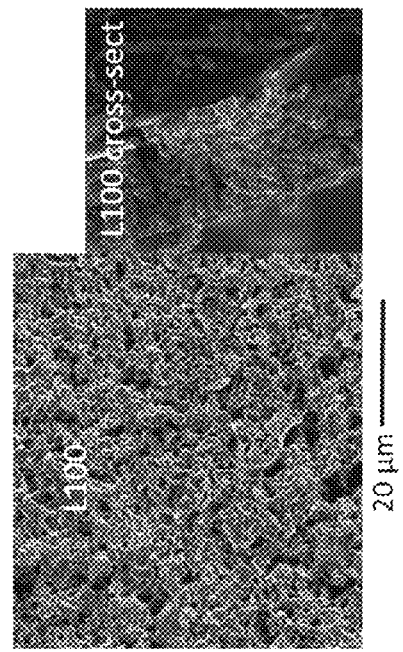

Not all salt/solvent combinations provide such excellent results. $LiBF_4$ was evaluated in propylene carbonate (PC). The cycling performances of 7.5 mol/kg $LiBF_4$ in PC and 2.5 mol/kg $LiBF_4$ in PC-TTE (2:1 v:v) were compared in Li∥Cu cells having a lithium areal deposition capacity of 0.5 mAh/cm$^2$. The initial two cycles were performed at 0.2 mA/cm$^2$ with further cycles at 1 mA/cm$^2$. The results are shown in FIGS. 9A and 9B. The LiBF$_4$/PC electrolyte had an initial CE of approximately 50%. When diluted with TTE, the electrolyte had an average CE over 50 cycles of less than 50%. This is in sharp contrast to the LiFSI/EMC, LiFSI/EMC-BTFE, and LiFSI-EMC-TTE electrolytes with CE values up to 98.95%. LiTFSI-tetraglyme also produces poor CE results.

Example 2

LiFSI/DMC-BTFE Electrolyte Performance in Lithium Metal Batteries

The concept of dilution and formation of the localized concentrated electrolyte solution structure was proven in DMC solvent-based electrolytes. The electrolyte formulations of various concentrations of LiFSI/DMC-BTFE solutions are listed in Table 2. With addition of BTFE, the concentration of 5.5 M LiFSI/DMC electrolyte was diluted to as low as 1.2 M.

Figure 13:
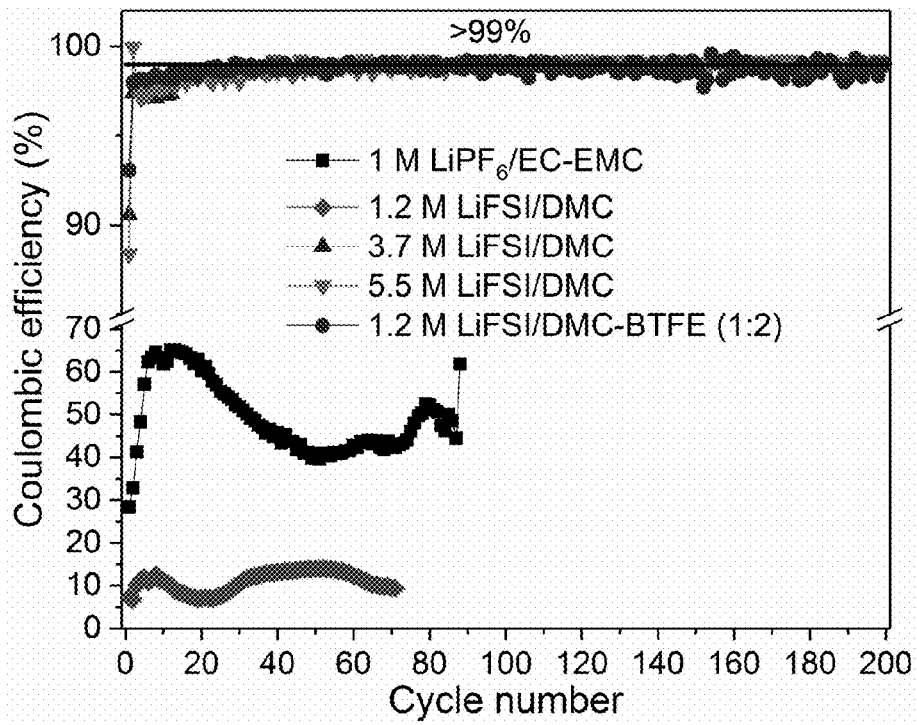
FIG. 13 is a graph of coulombic efficiency vs. cycle number for conventional electrolyte, dilute LiFSI/DMC electrolytes, superconcentrated LiFSI/DMC electrolyte, and LSE of 1.2 M LiFSI/DMC-BTFE (1:2).
Figure 14:
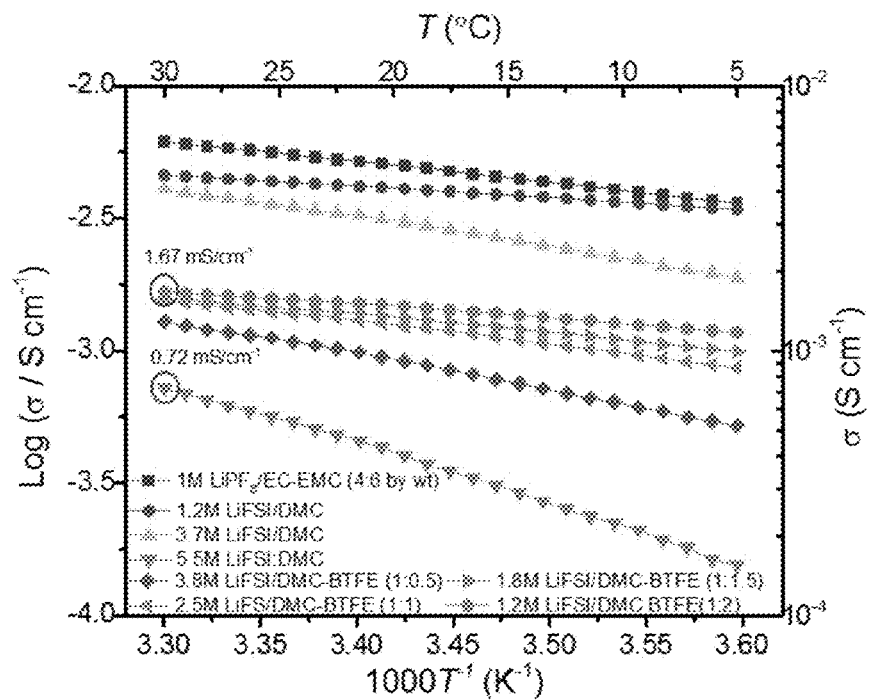
FIG. 14 is a graph of conductivity vs. temperature for conventional electrolyte, dilute LiFSI/DMC electrolytes, superconcentrated LiFSI/DMC electrolyte, and certain LSEs as disclosed herein.
Figure 15A:
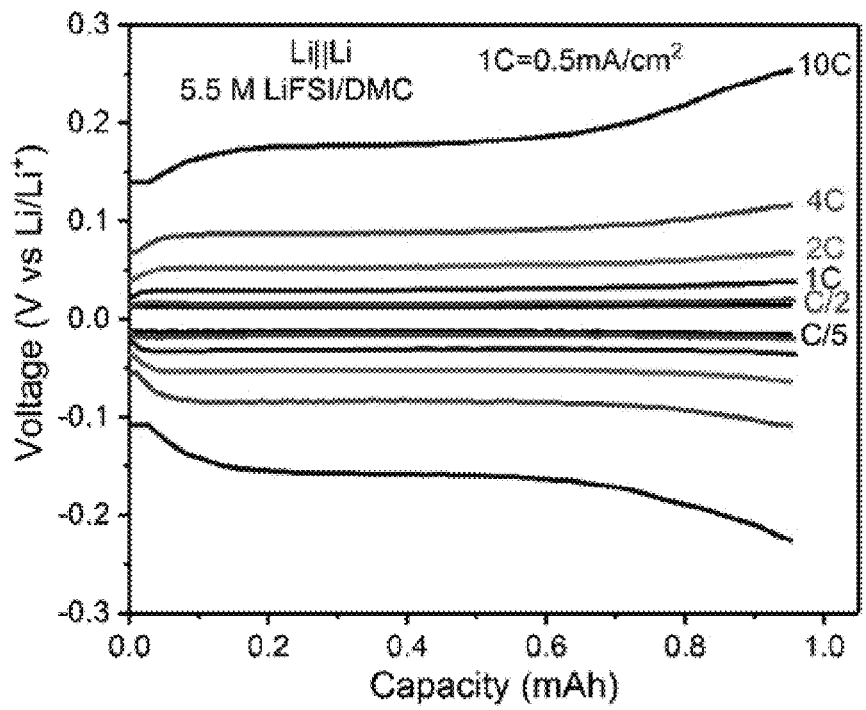
FIGS. 15A and 15B are graphs demonstrating the performance (voltage vs. capacity) of Li∥Li symmetric cells in SE of 5.5 M LiFSI/DMC (FIG. 15A) and LSE of 1.2 M LiFSI/DMC-BTFE (1:2) (FIG. 15B) at varying current densities.
Figure 15B:
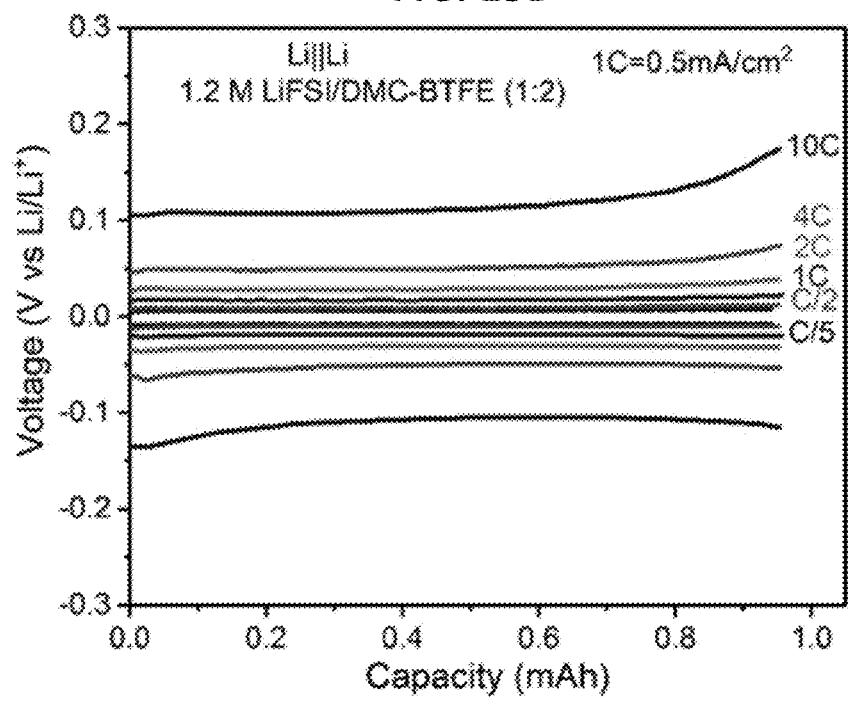

The evolution of Li plating/stripping profiles and CE during long-term cycling in different electrolytes was also examined by repeated plating/stripping cycles in Li||Cu cells. The cells were cycled at a current density of 0.5 mA·cm$^2$; the working area of the Cu electrode was 2.11 cm$^2$. FIGS. 12A-12D are scanning electron microscopy images of lithium plated onto copper substrates at the 100th cycle (1 mA/cm$^2$ to 0.5 mAh/cm$^2$) from 1.0 M LiPF$_6$/EC-EMC (4:6, w) (FIG. 12A), 5.5 M LiFSI:DMC (1:1) (FIG. 12B), 3.7 M LiFSI/DMC (1:2) (FIG. 12C), and 1.2 M LiFSI/DMC-BTFE (0.51:1.1:2.2) (FIG. 12D) electrolytes. Cells with the highly concentrated 5.5 M LiFSI/DMC and highly diluted 1.2 M LiFSI/DMC-BTFE (1:2) electrolytes were stably cycled for >200 cycles (FIG. 13) with average CE of 99%. Due to better conductivity and lower viscosity (FIG. 14, Table 2), the cell polarization during charge-discharge in the diluted electrolyte was much smaller than that in the highly concentrated electrolyte, and this difference became more obvious with increasing current densities (FIGS. 15A, 15B).

TABLE 2

Electrolyte number, formulations and viscosity.

| Electrolyte | | Molar Ratio | Mass Ratio | Density g cm$^{-3}$ | Molarity mol L$^{-1}$ | Molality mol kg$^{-1}$ | Viscosity mPa s 30° C. | 5° C. |
|---|---|---|---|---|---|---|---|---|
| LiFSI/DMC-BTFE | E11 | 0.51:1.1:2.2 | 0.95:0.99:4.0 | 1.38 | 1.18 | 1.02 | 2.7 | 4.8 |
| | E10 | 0.64:1.1:1.65 | 1.20:0.99:3.0 | 1.44 | 1.77 | 1.60 | 3.9 | 9.1 |
| | E9 | 0.75:1.1:1.1 | 1.40:0.99:2.0 | 1.48 | 2.52 | 2.51 | 10.2 | 31.9 |
| | E8 | 0.94:1.1:0.55 | 1.76:0.99:1.0 | 1.53 | 3.83 | 4.72 | 45.9 | 206.4 |
| LiFSI/DMC | E7 | 1.0:1.1 | 1.87:0.99 | 1.57 | 5.49 | 10.09 | 180.0 | >1200 |
| | E6 | 1.0:2.0 | 1.87:1.80 | 1.37 | 3.74 | 5.55 | 13.6 | 52.8 |
| | E5 | 1.0:9.0 | 1.87:8.11 | 1.21 | 1.21 | 1.23 | 1.3 | 2.6 |
| LiPF$_6$/EC-EMC | E4 | 2.19:1.0:1.27 | 1.42:4.0:6.0 | 1.22 | 1.0 | 0.93 | 3.5 | 7.0 |

Li plating/stripping profiles of Li||Cu cells using 1.0 M LiPF$_6$/EC-EMC (E4), 1.2 M LiFSI/DMC (E5), 3.7 M LiFSI/DMC (E6), and 5.5 M LiFSI/DMC (E7) are presented in FIGS. 10A-10D, respectively. The profiles were obtained using the following protocol: 1) one initial formation cycle with Li plating of 5 mAh cm$^{-2}$ on Cu at 0.5 mA cm$^{-2}$; and then Li stripping at 0.5 mA cm$^{-2}$ to 1 V; 2) plate 5 mAh cm$^{-2}$ Li on Cu at 0.5 mA cm$^{-2}$ as Li reservoir; 3) strip/plate Li with 1 mAh cm$^{-2}$ with 20% depth for 9 cycles; 4) strip all Li at 0.5 mA cm$^{-2}$ to 1 V. The average CE is calculated by dividing the total Li stripping capacity by the total Li plating capacity. With 1.0 M LiPF$_6$/EC-EMC electrolyte, as well as the 1.2 M LiFSI/DMC electrolyte, the Li metal cycling efficiency is so low (<50%) that significant overpotential arises for stripping within only couples of cycles. The CEs can reach>99.0% for 3.7 M and 5.5 M LiFSI/DMC.

The average CEs of diluted LiFSI/DMC-BTFE electrolytes were also measured using the same protocol as shown in FIGS. 11A-11D. The BTFE-diluted LSEs exhibited CEs that were even higher than the superconcentrated 5.5 M LiFSI/DMC (CE 99.2%) with CEs ranging from 99.3 to 99.5%. The results illustrate that the dilution with BTFE does not alter the localized superconcentrated structures and minimizes the presence of free DMC solvent molecules, therefore maintaining the high stability of the electrolyte toward Li metal anode during repeated plating/stripping processes.

Example 3

Lithium Ion Batteries with LiFSI/DMC-BTFE Electrolytes

Figure 16:
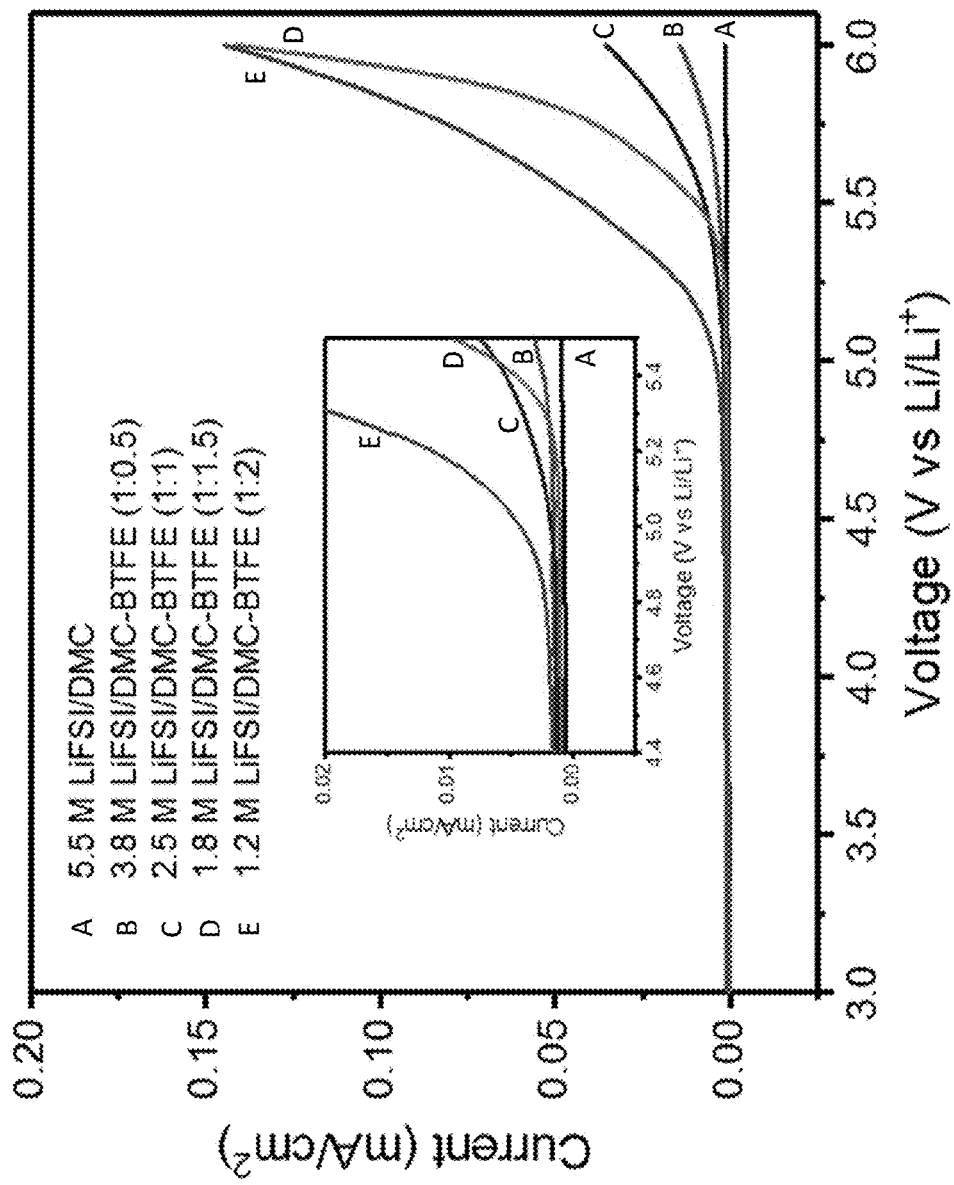
FIG. 16 is a graph of current vs. voltage illustrating the anodic stability of SE of 5.5 M LiFSI/DMC and certain LSEs as disclosed herein.
Figure 17A:
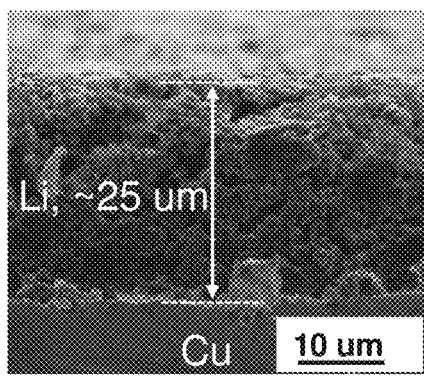
FIGS. 17A-17D are SEM images showing lithium plated onto copper substrates from 1.2 M LiFSI/DMC (FIGS. 17A, 17B) and 3.7 M LiFSI/DMC (FIGS. 17C, 17D)
Figure 17C:
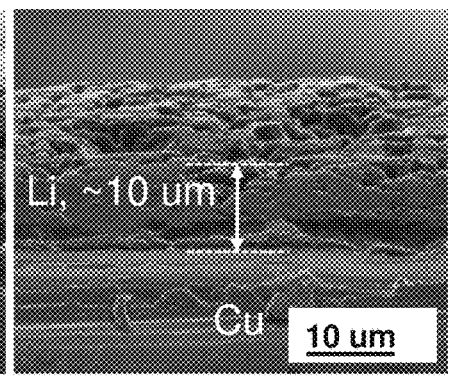
Figure 17B:
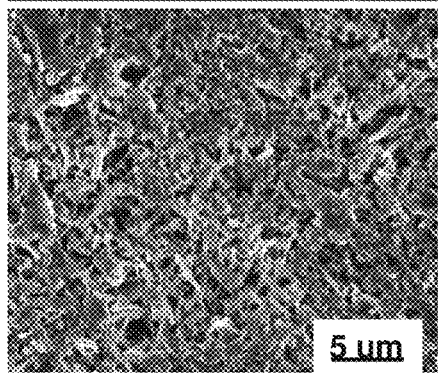
Figure 17D:
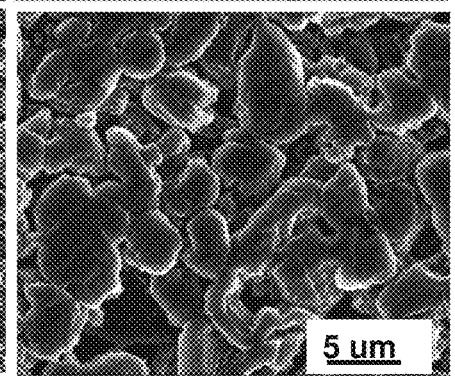

The stability of the concentrated and BTFE diluted electrolytes at high voltages was first studied in cells with Al as working electrodes via linear sweep voltammetry (LSV) at a scan rate of 0.2 mV/s. The results show that, although there was less stability at high voltage with increasing BTFE concentrations, the BTFE-diluted electrolytes all exhibited an anodic stability to 4.5 V or higher (FIG. 16). FIGS. 17A-17D are photomicrographs showing the morphology of lithium metal after plating on Cu substrates in low and moderate concentration electrolytes of LiFSI in DMC—1.2 M LiFSI/DMC (FIGS. 17A, 17B) and 3.7 M LiFSI/DMC (FIGS. 17C, 17D).

Next, Li||NMC cells were assembled to evaluate the performance of a dilute 1.2 M LiFSI/DMC-BTFE electrolyte, by using NMC electrodes of high areal capacity of ~2.0 mAh/cm$^2$. Li||NMC cells with concentrated 5.5 M LiFSI/DMC and conventional 1.0 M LiPF$_6$/EC-EMC were also assembled and tested for comparison. FIGS. 18A-18D show the long-term cycling performance and corresponding voltage profile evolution of the Li||NMC cells. After 3 formation cycles at 0.67 mA/cm$^2$ (⅓ hour rate), all the cells were subjected to cycling at a high current density of 2.0 mA/cm² (1 hour rate), in order to reveal the stability of these electrolytes with Li metal anodes at this harsh condition. During the formation cycles, the Li∥NMC cells delivered similar specific discharge capacities of ca. 160 mAh g$^{-1}$ of NMC, corresponding to a norminal areal capacity of 2.0 mAh/cm². When cycled at 2.0 mA/cm², the Li∥NMC cell with the 1.0 M LiPF$_6$/EC-EMC electrolyte showed a drastic increase of electrode polarization and fast capacity degradation with <30% retention after 100 cycles (FIGS. 18A, 18B), which is attributed to the severe corrosion reactions between Li metal and the electrolyte. When using the concentrated 5.5 M LiFSI/DMC, the stability with Li metal was greatly improved, as reflected by the much higher CE of Li metal itself. However, the Li∥NMC cell with concentrated 5.5 M LiFSI/DMC still showed continuous capacity fading and increase of electrode polarization, retaining 70% of its capacity after 100 cycles (FIG. 18C). The unsatisfactory cycling performance of concentrated 5.5 M LiFSI/DMC is attributed to the sluggish electrode reaction kinetics resulted from the high viscosity, low conductivity and poor wetting ability of the superconcentrated electrolyte. In sharp contrast, with the BTFE-diluted 1.2 M LiFSI/DMC-BTFE electrolyte, the significantly improved long-term cycling stability and limited increase of electrode polarization could be achieved (FIG. 18D). The cell shows a high capacity retention of >95% after 300 cycles at high current density of 2.0 mA/cm², which is among the best performances ever reported for Li metal batteries. This finding indicates that the LSE with a low Li salt concentration could enable the fast charging and stable cycling of Li metal batteries (LMBs).

Figure 19:
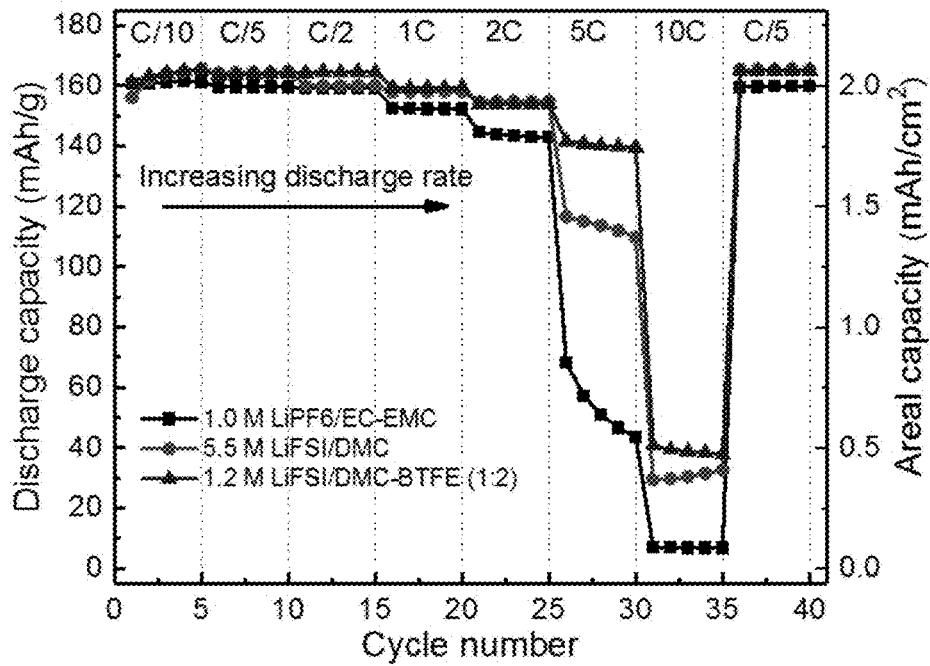
FIG. 19 shows the rate performance of Li∥NMC batteries using different electrolytes; the batteries were charged at a constant C/5 rate but discharged at an increasing C rate; 1 C=2.0 mA/cm$^2$.
Figure 20:
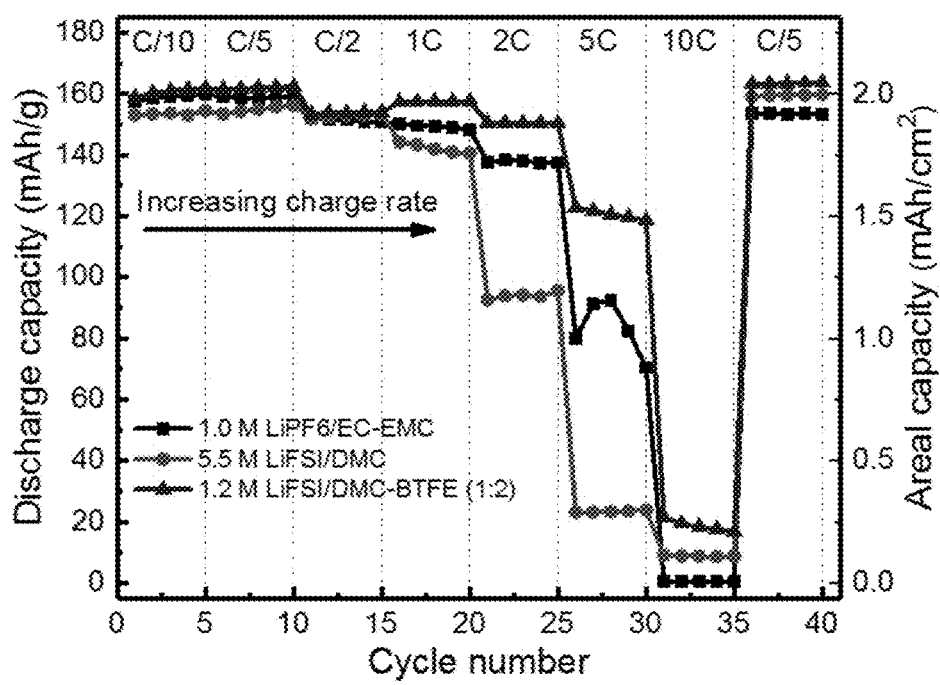
FIG. 20 shows the rate performance of Li∥NMC batteries using different electrolytes; the batteries were discharged at a constant C/5 rate but charged at an increasing C rate; 1 C=2.0 mA/cm$^2$.

The rate performances of Li∥NMC cells were evaluated to determine the electrochemical reaction kinetics of the BTFE diluted electrolyte. The rate capability was tested using two charge/discharge protocols, i.e., (i) charge at same C/5 and discharge at increasing rate; (ii) charge at increasing rate and discharge at same C/5. As shown in FIGS. 19 and 20, the Li∥NMC cell with BTFE-diluted electrolyte (1.2 M LiFSI/DMC-BTFE) showed superior charging and discharging capability as compared to the concentrated 5.5 M LiFSI/DMC electrolyte and the baseline 1 M LiPF$_6$ dilute electrolyte. In particular, with protocol (i), when discharging at 5 C (i.e. 10 mA/cm²), the cell using 1.2 M LiFSI/DMC-BTFE electrolyte delivered a high discharge capacity of 141 mAh/g, significantly higher than 116 mAh/g for the concentrated 5.5 M LiFSI/DMC electrolyte and 68 mAh/g for the 1 M LiPF$_6$ dilute electrolyte. The enhanced rate capability of 1.2 M LiFSI/DMC-BTFE electrolyte as compared to concentrated 5.5 M LiFSI/DMC electrolyte is ascribed to the reduced viscosity, increased conductivity, improved electrode/separator wetting, as well as the improved interfacial reaction kinetics.

Example 4

Dendrite-Free Deposition on Li Metal Anode

To gain insight into the superior electrochemical properties of LSE (1.2 M LiFSI/DMC-BTFE), the morphology features of Li deposited in different electrolytes were evaluated. The current density was 1.0 mA/cm² and the deposition capacity was 1.5 mAh/cm². FIGS. 21A-21F show the cross-section and surface morphologies of Li films deposited on Cu substrates in different electrolytes at a current desity of 1 mA/cm². The electrolytes were as follows: 1.0 M LiPF$_6$/EC-EMC (FIGS. 21A, 21B), 5.5 M LiFSI/DMC (FIGS. 21C, 21D), and 1.2 M LiFSI/DMC-BTFE (1:2) (FIGS. 21E, 21F). The plating of Li metal from the LiPF$_6$ electrolyte resulted in a highly porous/loose structure with extensive dendritic Li (FIGS. 21A, 21B). Dendritic Li deposition were also observed in both low (1.2 M) and moderate (3.7 M) concentrated LiFSI/DMC electrolytes as previously shown in FIGS. 17A-17D. In contrast, nodule-like Li deposits without dendrite formation were obtained in both highly concentrated 5.5 M LiFSI/DMC and diluted low concentration 1.2 M LiFSI/DMC-BTFE electrolytes (FIGS. 21C-21F). Compared to that in the concentrated electrolyte, larger primary Li particles (avg. ~5 μm) and a denser deposit layer (~10 μm, close to the theoretical thickness of 1.5 mAh cm$^{-2}$ (~7.2 μm) of bulk Li) were found in the LSE electrolyte (1.2 M LiFSI/DMC-BTFE). Moreover, with increasing current densities (2, 5, and 10 mA/cm²), the Li deposits maintained a nodule-like nature in the 1.2 M LiFSI/DMC-BTFE electrolyte despite a slight decrease in particle size (FIGS. 22A-22C). Formation of nodule-like Li deposits of large particle size can significantly mitigate the interfacial reactions with the electrolyte, and reduce the risk of Li penetration through the separator, hence improving the cycle life and safety of LMBs using LSE (dilute 1.2 M LiFSI/DMC-BTFE). The dilute electrolyte also produced a more stable SEI layer than the highly concentrated 5.5 M LiFSI/DMC. In addition, deposition of high density Li is beneficial for reducing the volume variation of the LMBs during charge/discharge processes, and is highly desirable for the development of LMBs.

Example 5

Lithium Metal Batteries with LiFSI/DME-BTFE and LiFSI/DME-TTE Electrolytes

Dilution of concentrated electrolytes also works well with ether-based electrolytes, such as DME. Exemplary electrolyte formulations are shown in Table 3. With addition of BTFE or TTE, the concentration of 4 M LiFSI/DME electrolyte was diluted to 2 M or 1 M.

TABLE 3

Electrolyte number and formulations

| Electrolyte number | Electrolyte formulation | Concentration |
|---|---|---|
| E12 | 4M LiFSI/DME (LiFSI:DME 1:1.4) | 4 mol L$^{-1}$ |
| E13 | LiFSI/DME + BTFE (DME:BTFE = 3:5, v:v) | 2 mol L$^{-1}$ |
| E14 | LiFSI/DME + TTE (DME:TTE = 3:5, v:v) | 2 mol L$^{-1}$ |
| E15 | LiFSI/DME + BTFE (DME:BTFE = 3:8, v:v) | 1 mol L$^{-1}$ |
| E16 | LiFSI/DME + TTE (DME:TTE = 3:8, v:v) | 1 mol L$^{-1}$ |

Figure 23:
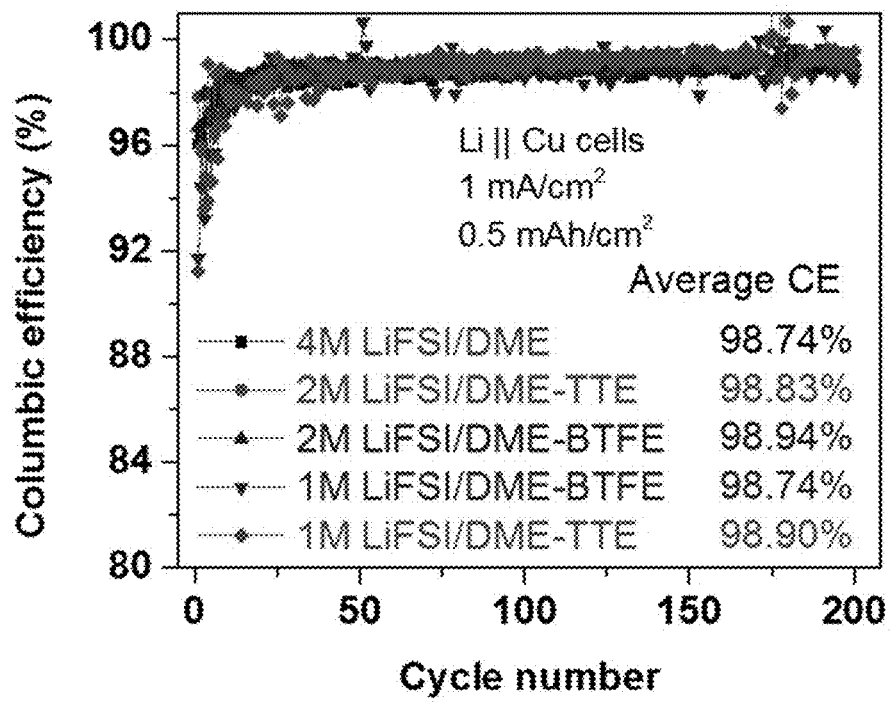
FIG. 23 shows the coulombic efficiency (CE) of Li∥Cu cells using concentrated LiFSI/DME electrolyte and those with TTE or BTFE diluent as a function of cycle number tested at 0.5 mA cm$^{-2}$ with Li deposition areal capacity of 1 mAh cm$^{-2}$.

FIG. 23 shows the CE of Li∥Cu cells using concentrated LiFSI/DME electrolyte and those with TTE or BTFE diluent. All cells demonstrated very similar CE in the first cycle and during the long-term cycling. When the concentration of LiFSI/(DME+BTFE) and LiFSI/(DME+TTE) was diluted to 2M with the addition of fluoroalkyl ethers, i.e. TTE, BTFE as diluent, the average CEs of Li∥Cu cells were 98.83% and 98.94% for TTE and BTFE diluted electrolyte, which is comparable to or even superior over that of the parent concentrated LiFSI/DME (98.74%). Even when the concentration of LiFSI/(DME+BTFE) and LiFSI/(DME+TTE) was diluted to 1M with the addition of TTE, BTFE as diluent, the average CEs of Li∥Cu cells were 98.90% and 98.94 and 98.74 for TTE and BTFE diluted electrolyte, which is very comparable to or even superior over that of the parent concentrated LiFSI/DME (98.74%).

Figure 24:
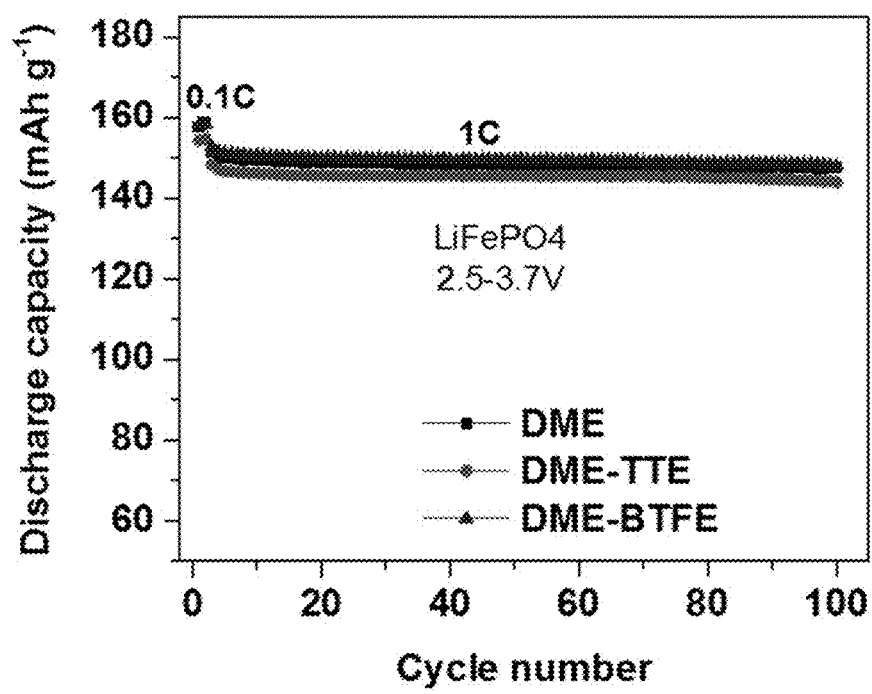
FIG. 24 shows the cycling stability of Li∥LiFePO$_4$ (LFP) cells containing concentrated 4 M LiFSI/DME electrolyte without and with TTE or BTFE diluent at 1 C rate after 3 formation cycles at C/10, in the voltage range of 2.5~3.7 V.

The cycling performance for Li∥LFP cells containing concentrated 4 M LiFSI/DME electrolyte without and with TTE or BTFE diluent is shown in FIG. 24. The Li∥LFP coin cells were assembled using LFP cathode (Hydro-Québec, 1 mAh cm$^{-2}$), lithium metal anode, one piece of polyethylene (PE) separator, and the concentrated ether based electrolyte before and after dilution. Diluting the concentrated LiFSI/DME electrolyte from 4 M to 2 M, the Li∥LFP cells using 2 M LiFSI/(DME+BTFE) electrolyte and 2 M LiFSI/(DME+TTE) electrolyte show similar long-term cycling stability as compared to the cell using parent concentrated 4 M LiFSI/DME electrolyte. Results were obtained at a 1 C rate after 3 formation cycles at C/10, in the voltage range of 2.5~3.7 V.

Example 6

Sodium Metal Batteries with NaFSI/DME-TTE and NaFSI-DME-BTFE Electrolytes

The concept of localized superconcentrated electrolytes also works well in sodium metal batteries. The evaluated electrolyte formulations are shown in Table 4. With addition of TTE, the concentration of the 5.2 M NaFSI/DME electrolyte was diluted to 1.5 M.

TABLE 4

Electrolyte number and formulations used this example

| Electrolyte number | Electrolyte formulation | Concentration |
| --- | --- | --- |
| E17 | NaFSI/DME (NaFSI:DME, 1:1, molar ratio) | 5.2 mol L$^{-1}$ |
| E18 | NaFSI/DME + TTE (DME:TTE = 1:0.5, molar ratio) | 3.0 mol L$^{-1}$ |
| E19 | NaFSI/DME + TTE (DME:TTE = 1:1, molar ratio) | 2.3 mol L$^{-1}$ |
| E20 | NaFSI/DME + TTE (DME:TTE = 1:2, molar ratio) | 1.5 mol L$^{-1}$ |

For charge/discharge performance testing, Na∥Na$_3$V$_2$(PO$_4$)$_3$ coin cells were constructed in an argon-filled glove box (MBraun, Inc.) using a Na$_3$V$_2$(PO$_4$)$_3$ cathode, Na metal as the anode, glass fiber as the separator, and NaFSI/DME electrolyte with and without TTE diluent. The Na$_3$V$_2$(PO$_4$)$_3$ cathode contains 80% Na$_3$V$_2$(PO$_4$)$_3$, 10% Super P® carbon black (available, e.g., from Fisher Scientific), and 10% PVDF (polyvinylidene fluoride).

Figure 25A:
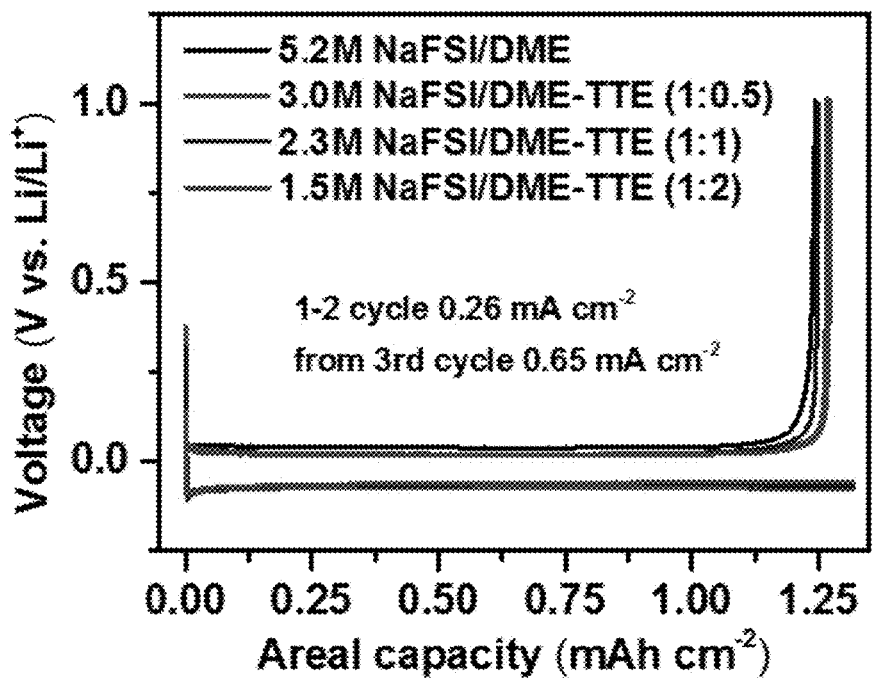
FIGS. 25A and 25B show initial Na deposition/stripping voltage profiles (FIG. 25A) and CE of Na∥Cu cells as a function of cycle number tested at 0.65 mA cm$^{-2}$ after 2 formation cycles at 0.26 mA cm$^{-2}$, with Na deposition areal capacity of 1.3 mAh cm$^{-2}$ (FIG. 25B).
Figure 25B:
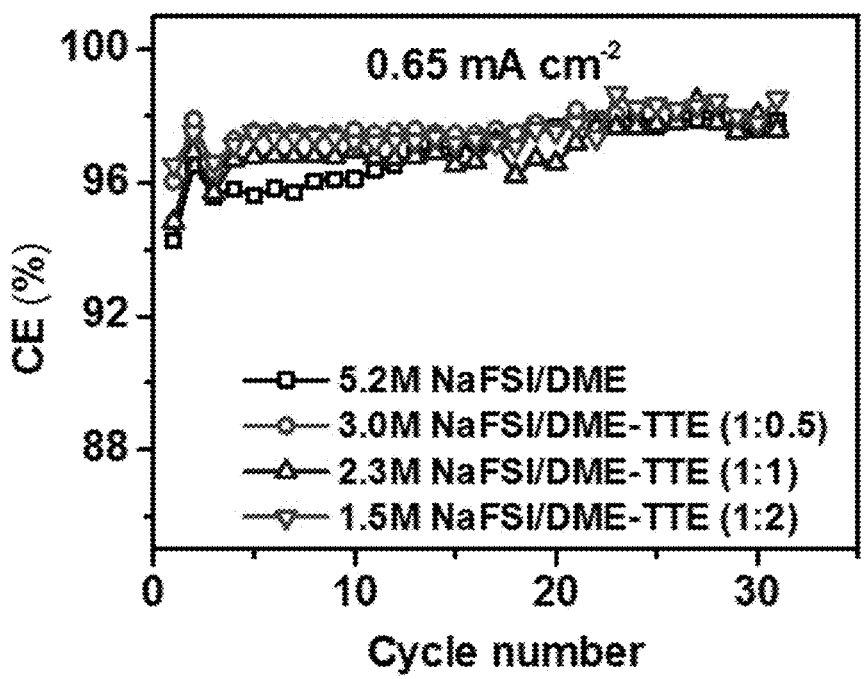

FIGS. 25A and 25B show the initial Na plating/stripping voltage profiles (FIG. 25A) and CE vs. cycle number of Na∥Cu cells with Na deposition areal capacity of 1.3 mAh cm$^{-2}$ (FIG. 25B). CE was evaluated as a function of cycle number tested at 0.65 mA cm$^{-2}$ after two formation cycles at 0.26 mA cm$^{-2}$, with Na deposition areal capacity of 1.3 mAh cm$^{-2}$. The initial CEs for NaFSI/DME and NaFSI/DME-TTE electrolytes with 5.2 M, 3.0 M, 2.3 M and 1.5 M NaFSI salt were 94.3%, 96.1%, 94.8% and 96.5%, respectively. During the following cycling, the CEs of the diluted electrolytes were comparable or higher than that of the parent 5.2 M NaFSI/DME electrolyte.

Figure 26A:
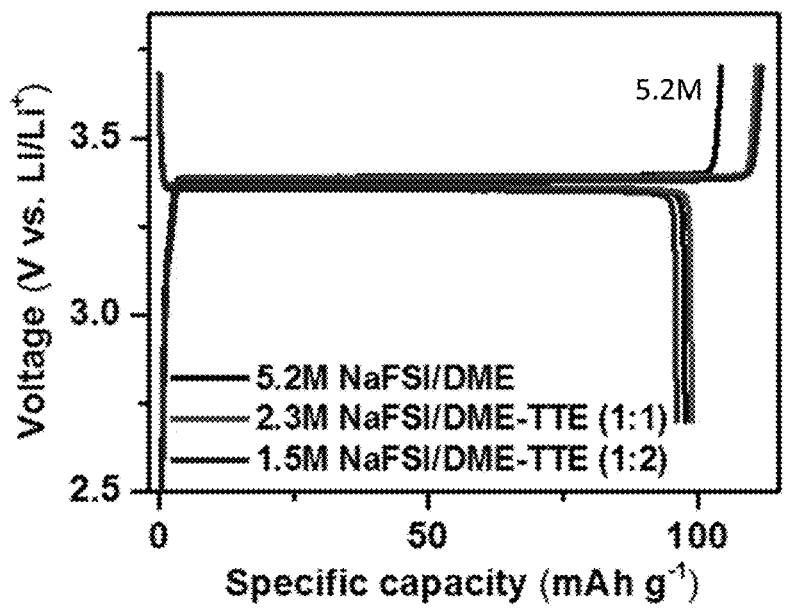
FIGS. 26A and 26B show initial charge/discharge voltage profiles (FIG. 26A) and cycling stability (FIG. 26B) of Na∥Na$_3$V$_2$(PO$_4$)$_3$ cells containing superconcentrated NaFSI/DME electrolyte and LSEs with TTE diluent at C/3.
Figure 26B:
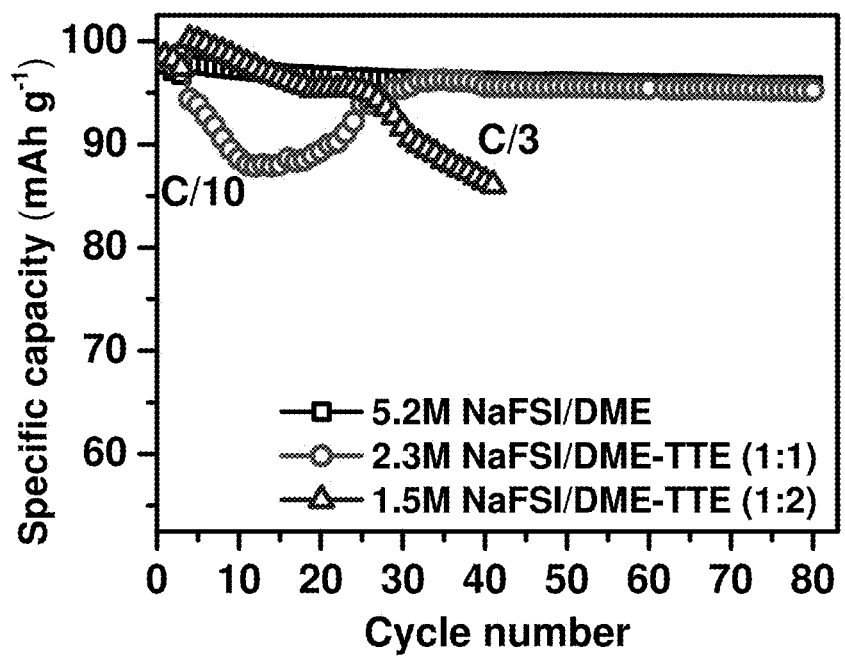
Figure 27A:
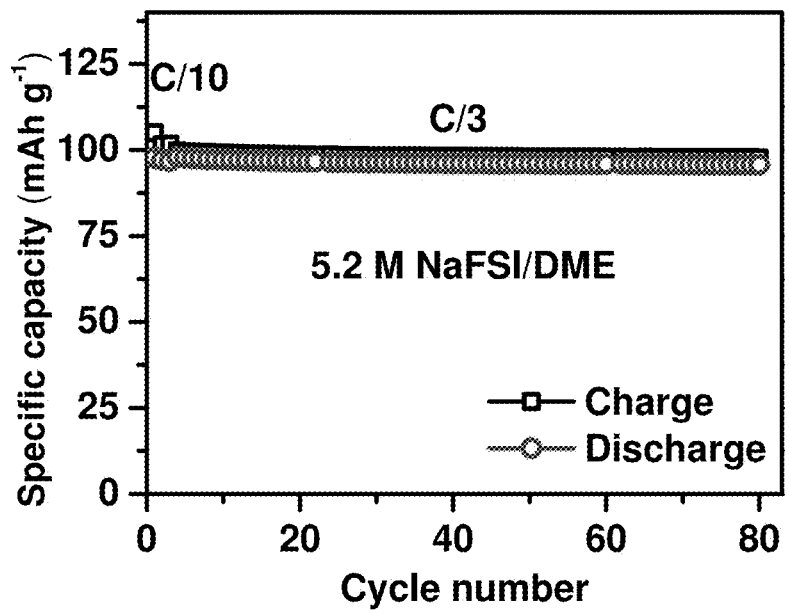
FIGS. 27A and 27B show the charge and discharge capacities of Na∥Na$_3$V$_2$(PO$_4$)$_3$ cells containing 5.2 M NaFSI/DME (FIG. 27A) and 2.3 M NaFSI/DME-TTE (DME:TTE molar ratio 1:1) (FIG. 27B) electrolytes.
Figure 27B:
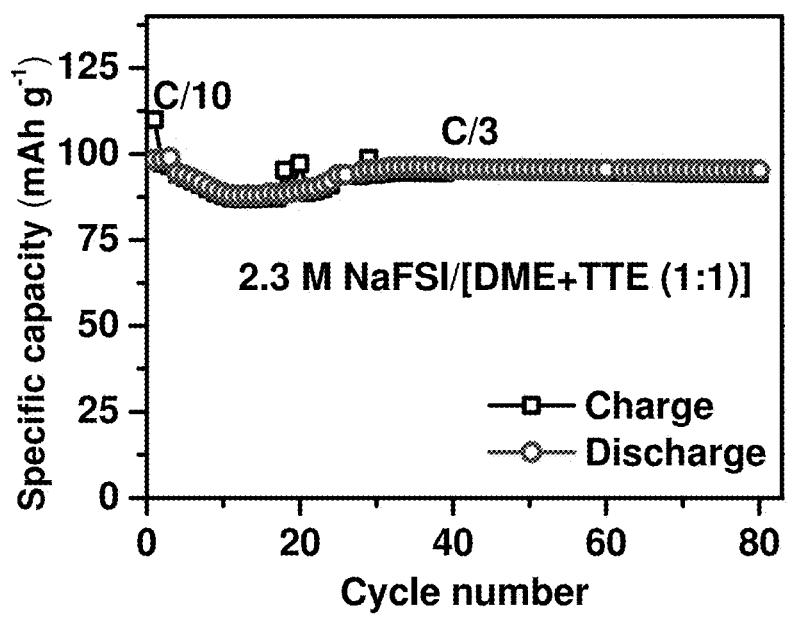

FIGS. 26A, and 26B show the electrochemical performance of Na∥Na$_3$V$_2$(PO$_4$)$_3$ cells using concentrated 5.2 M NaFSI/DME electrolyte and TTE-diluted NaFSI/DME-TTE electrolytes (2.3 M and 1.5 M) at a rate of C/3. The cells using TTE diluted NaFSI/DME-TTE electrolytes showed similar initial specific discharge capacity of ca. 97 mAh g$^{-1}$ as compared to concentrated NaFSI/DME electrolyte (FIG. 26B). FIGS. 27A and 27B, respectively, show the charge and discharge capacities of the cells using 5.2 M NaFSI/DME electrolyte and 2.3 M NaFSI/DME-TTE electrolyte.

Figure 28A:
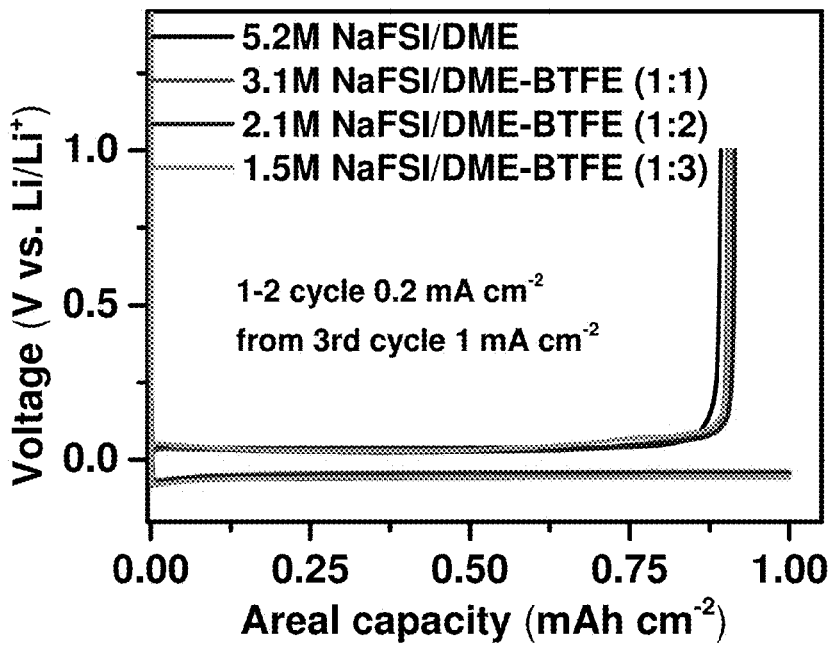
FIGS. 28A and 28B show initial Na deposition/stripping voltage profiles (FIG. 28A) and CE of Na∥Cu cells as a function of cycle number tested at 1 mA cm$^{-2}$ after 2 formation cycles at 0.2 mA cm$^{-2}$, (FIG. 28B) with 5.2 M NaFSI/DME, 3.1 M NaFSI/DME-BTFE (1:1), 2.1 M NaFSI/DME-BTFE (1:2), and 1.5 M NaFSI/DME-BTFE (1:3) electrolytes. The ratios in the parentheses indicate the molar ratios of DME:BTFE in different BTFE diluted LSEs.
Figure 28B:
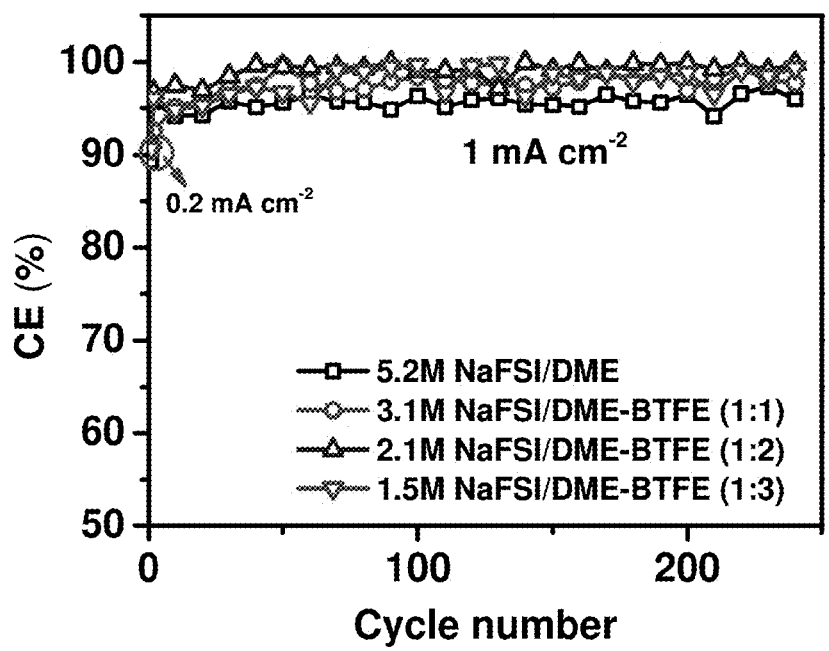

FIGS. 28A and 28B show the initial Na plating/stripping voltage profiles (FIG. 28A) and CE vs. cycle number of Na∥Cu cells with Na deposition areal capacity of 1.0 mAh cm$^{-2}$ (FIG. 28B) with 5.2 M NaFSI/DME, 3.1 M NaFSI/DME-BTFE (1:1), 2.1 M NaFSI/DME-BTFE (1:2), and 1.5 M NaFSI/DME-BTFE (1:3). The ratios in the parentheses are the mole ratios of DME:BTFE. CE was evaluated as a function of cycle number tested at 1 mA cm$^{-2}$ after two formation cycles at 0.2 mA cm$^{-2}$. As shown in FIG. 28B, the LSE, 2.1 M NaFSI/DME-BTFE (1:2), exhibited stable cycling with a CE of nearly 100% over 200+ cycles.

Figure 29A:
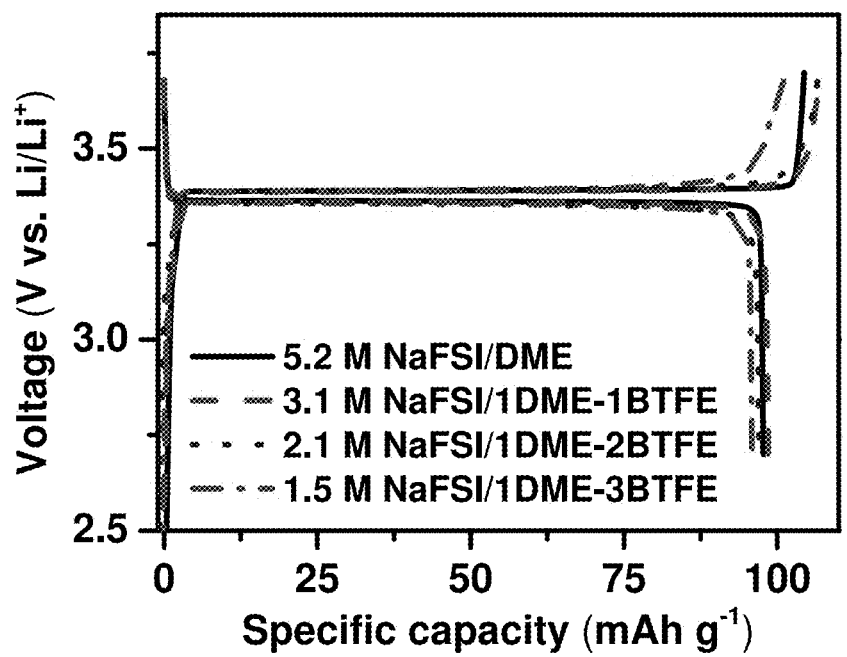
FIGS. 29A-29C show the electrochemical performance of Na∥Na$_3$V$_2$(PO$_4$)$_3$ cells using 5.2 M NaFSI/DME and BTFE-diluted NaFSI/DME-BTFE electrolytes.
Figure 29B:
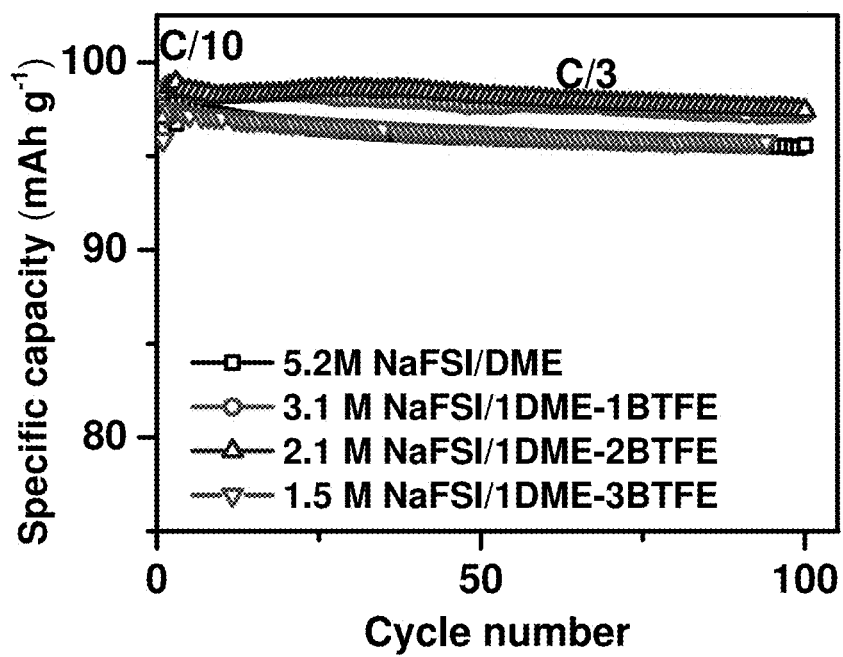
Figure 29C:
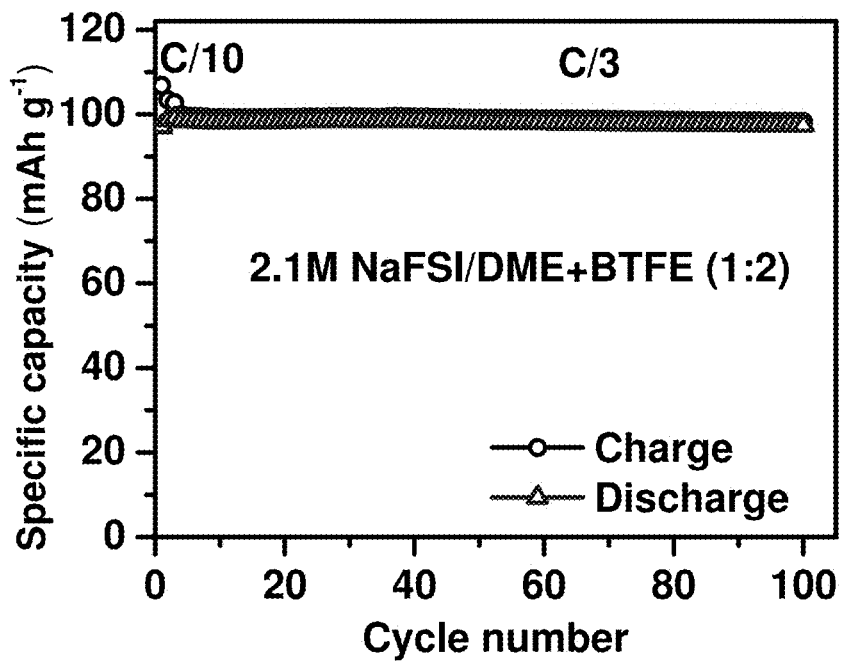

FIGS. 29A-29C show the electrochemical performance of Na∥Na$_3$V$_2$(PO$_4$)$_3$ cells using 5.2 M NaFSI/DME and BTFE-diluted NaFSI/DME-BTFE electrolytes—3.1 M NAFSI/DME-BTFE (1:1), 2.1 M NaFSI/DME-BTFE (1:2), and 1.5 M NaFSI/DME-BTFE (1:3). FIG. 29A shows the initial Na plating/stripping voltage profiles. FIG. 29B shows the cycling stability over 100 cycles at rates of C/10 and C/3. FIG. 29C shows the charge and discharge capacities of 2.1 M NaFSI/DME-BTFE (1:2 mol) over 100 cycles at rates of C/10 and C/3. The results indicate that BTFE is a superior diluent for concentrated NaFSI/DME electrolytes.

Example 7

Li—S Batteries with LiTFSI/DOL-DME-TTE Electrolyte

The concept of localized superconcentrated electrolyte also works well for lithium sulfur batteries. The electrolyte formulations evaluated in this example are shown in Table 5. With addition of TTE, the concentration of 3.3 M LiTFSI in DOL-DME (1:1, v:v) electrolyte was diluted to 1.06 M.

TABLE 5

Electrolyte number and formulations

| Electrolyte number | Electrolyte formulation | Concentration |
| --- | --- | --- |
| E21 | LiTFSI in DOL-DME (1:1, v:v) | 1 mol L$^{-1}$ |
| E22 | LiTFSI in DOL-DME (1:1, v:v) | 3.3 mol L$^{-1}$ |
| E23 | LiTFSI in DOL-DME-TTE (1:1:9, v:v:v) | 1.06 mol L$^{-1}$ |

For charge/discharge performance testing, Li—S coin cells were assembled in an argon-filled glove box (MBraun, Inc.) using a Ketjen black conductive carbon (KB)/S cathode, lithium metal as the anode, one piece of polyethylene as separator, and the LiTFSI/DOL-DME electrolytes with or without TTE diluent. The KB/S cathode was prepared by coating a slurry containing 80% KB/S composite, 10% PVDF and 10% Super P® conductive carbon. The KB/S composite was prepared by mixing 80% S and 20% KB, followed by heat treatment at 155° C. for 12 hrs.

Figure 30A:
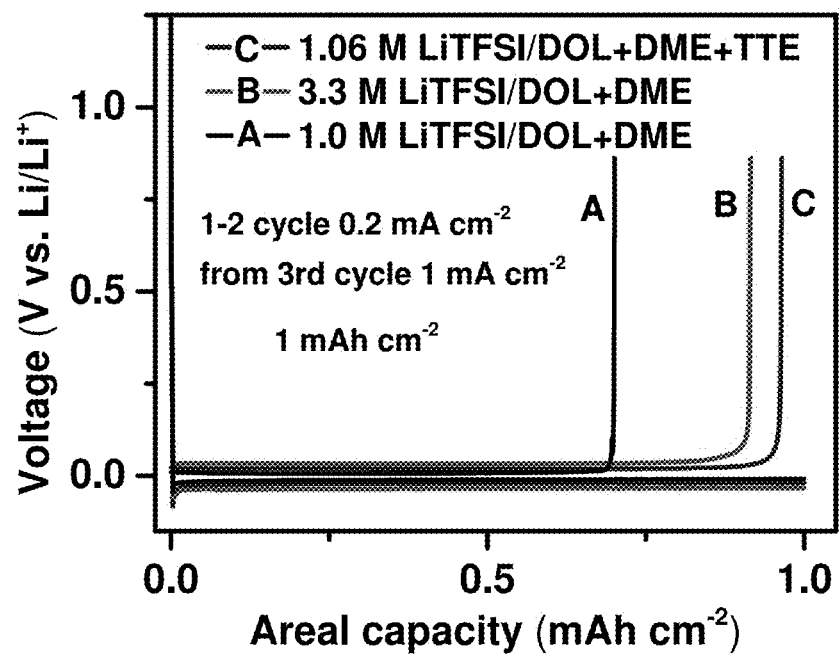
FIGS. 30A and 30B show initial Li deposition/stripping voltage profiles (FIG. 30A) and CE (FIG. 30B) of the Li∥Cu cells as a function of cycle number tested at 1 mA cm$^{-2}$ after 2 formation cycles at 0.2 mA cm$^{-2}$ with Li deposition areal capacity of 1 mAh cm$^{-2}$ using low concentration 1M LiTFSI/DOL-DME, concentrated 3.3M LiTFSI/DOL-DME electrolyte, LSE of 1.06 M LiTFSI/DOL-DME-TTE electrolyte.
Figure 30B:
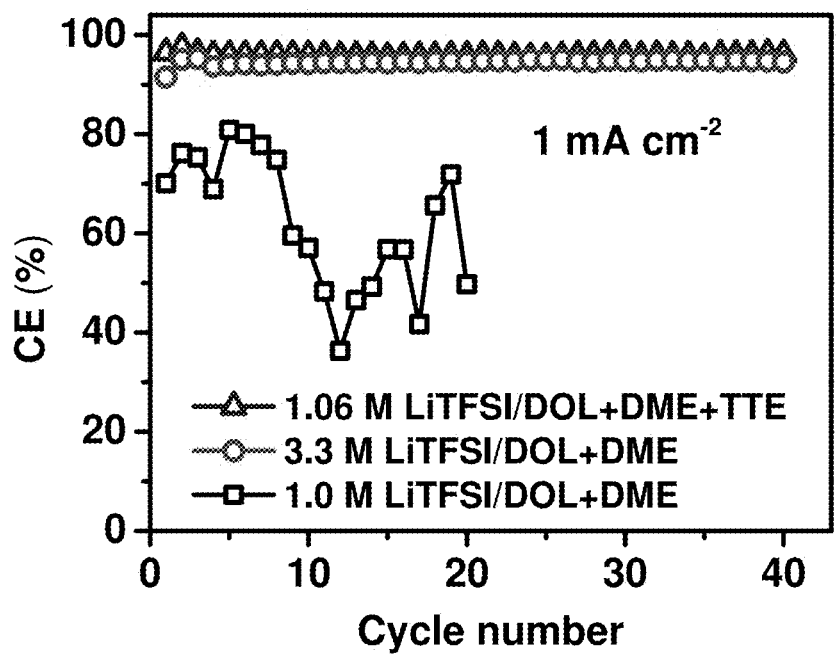

FIGS. 30A and 30B show the initial Li plating/stripping voltage profiles (FIG. 30A) and CE vs. cycle number (FIG. 30B) of Li∥Cu cells with a Li deposition areal capacity of 1 mAh cm$^{-2}$. The results were obtained at 1 mA cm$^{-2}$ after 2 formation cycles at 0.2 mA cm$^{-2}$ with a Li deposition areal capacity of 1 mAh cm$^{-2}$. The superconcentrated 3.3 M LiTFSI/DOL-DME electrolyte showed an initial CE of 91.6%, which was much higher than the 70.1% for the low concentration 1 M LiTFSI/DOL-DME electrolyte. With dilution the 3.3 M LiTFSI/DOL-DME electrolyte with TTE, the localized superconcentrated Li+ solvation structure was maintained and the diluted 1.06 M LiTFSI in DOL-DME-TTE (1:1:9, v:v:v) electrolyte showed a higher CE of 96.4% during the initial plating/stripping process.

Figure 31A:
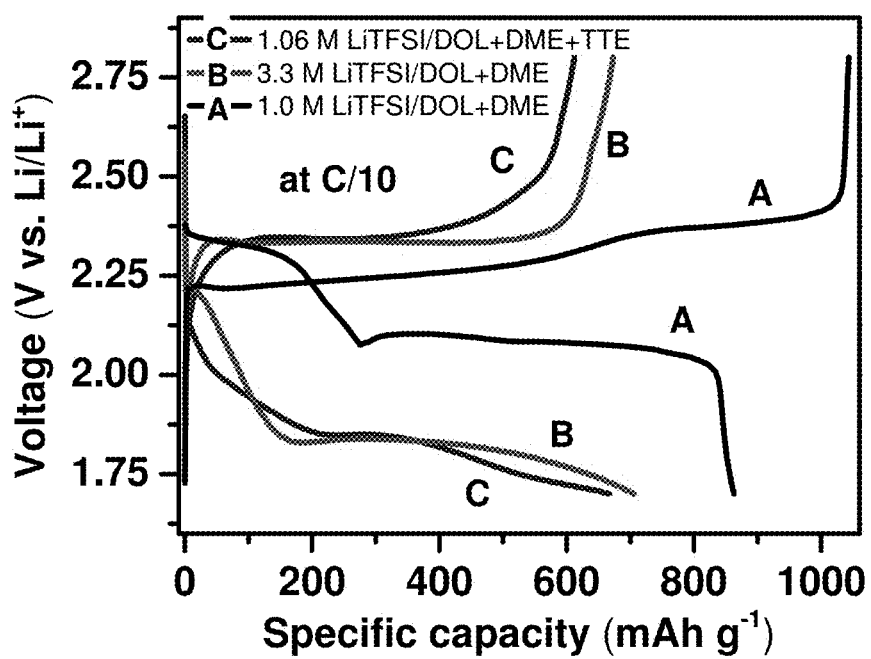
FIGS. 31A-31C show the electrochemical performance of Li—S cells containing low concentration 1M LiTFSI/DOL- DME, concentrated 3.3M LiTFSI/DOL-DME electrolyte and LSE of 1.06 M LiTFSI/DOL-DME-TTE electrolyte.
Figure 31B:
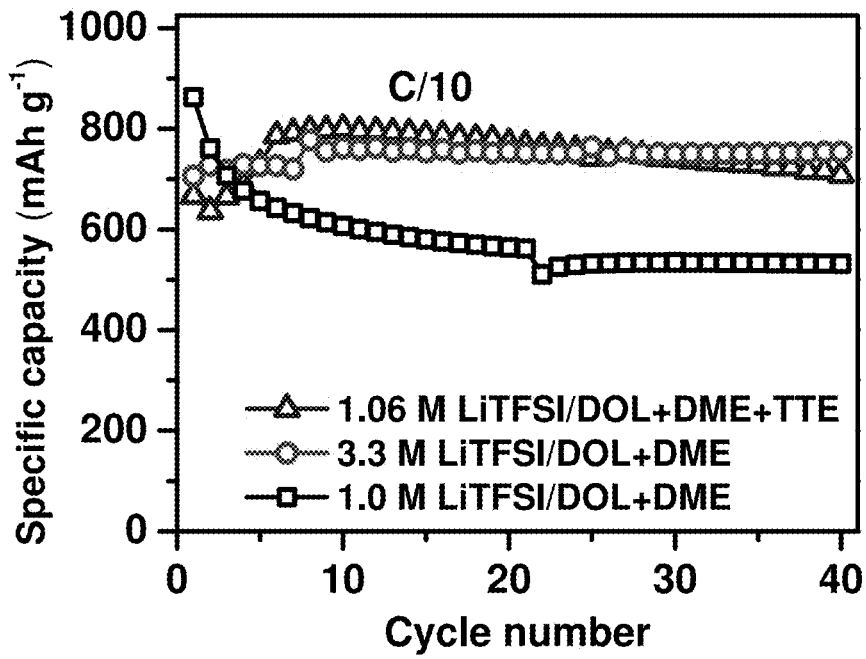
Figure 31C:
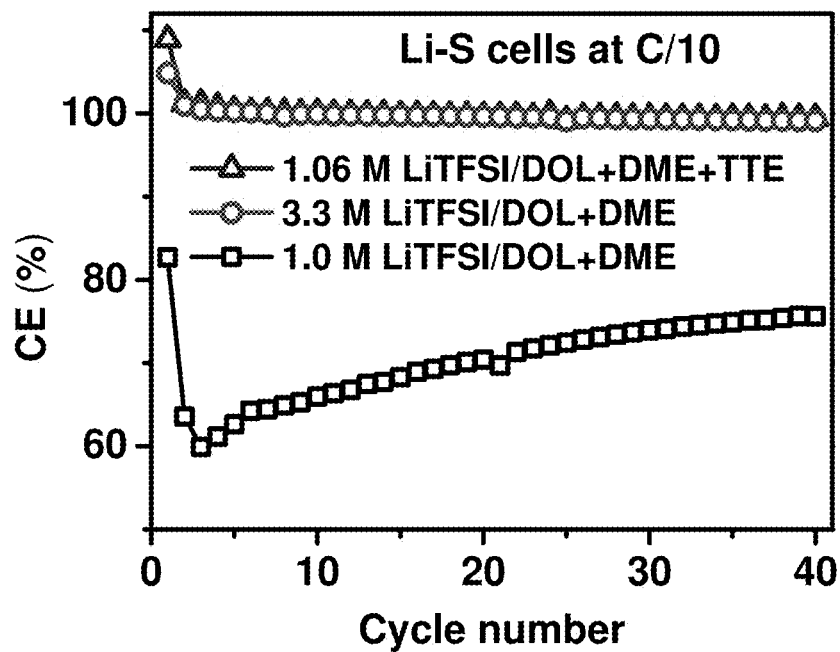

The electrochemical performance for Li—S cells containing regular low concentration 1 M LiTFSI/DOL-DME, concentrated 3.3 M LiTFSI/DOL-DME electrolyte, and diluted 1.06 M LiTFSI in DOL-DME-TTE electrolyte is shown in FIGS. 31A-31C. FIG. 31A shows the initial charge/discharge voltage profiles. In FIG. 31A, curves A were obtained with 1.0 M LiTFSI/DOL-DME, curves B were obtained with 3.3 M LiTFSI/DOL-DME, and curves C were obtained with 1.06 M LiTFSI/DOL-DME-TTE. The Li—S cells with electrolyte/sulfur ratio of 50 mL/g were cycled at a low current rate of C/10 (168 mA/g). Diluting the concentrated LiTFSI/DOL-DME electrolyte from 3.3 M to 1.06 M, the Li—S cells showed even better long-term cycling stability (FIG. 31B) and higher CE (FIG. 31C) as compared to the cell using parent concentrated 3.3M LiTFSI/DOL-DME electrolyte.

Example 8

Li—$O_2$ Batteries with LiTFSI/DMSO-TTE Electrolyte

The concept of localized superconcentrated electrolyte was also investigated in lithium oxygen battery. The electrolyte formulations evaluated are listed in Table 6. With addition of TTE, the concentration of 2.76 M LiTFSI in DMSO (LiTFSI:DMSO molar ratio 1:3) electrolyte was diluted to 1.23 M (LiTFSI:DMSO:TTE molar ratio 1:3:3).

TABLE 6

Electrolyte number and formulations

| Electrolyte number | Electrolyte denotation | Molar ratio of salt to solvent (LiTFSI:DMSO:TTE) | Concentration (mol/L) |
|---|---|---|---|
| E24 | LiTFSI-12DMSO | 1:12 | 1M |
| E25 | LiTFSI-3DMSO | 1:3 | 2.76M |
| E26 | LiTFSI-3DMSO-3TTE | 1:3:3 | 1.23M |

Figure 32:
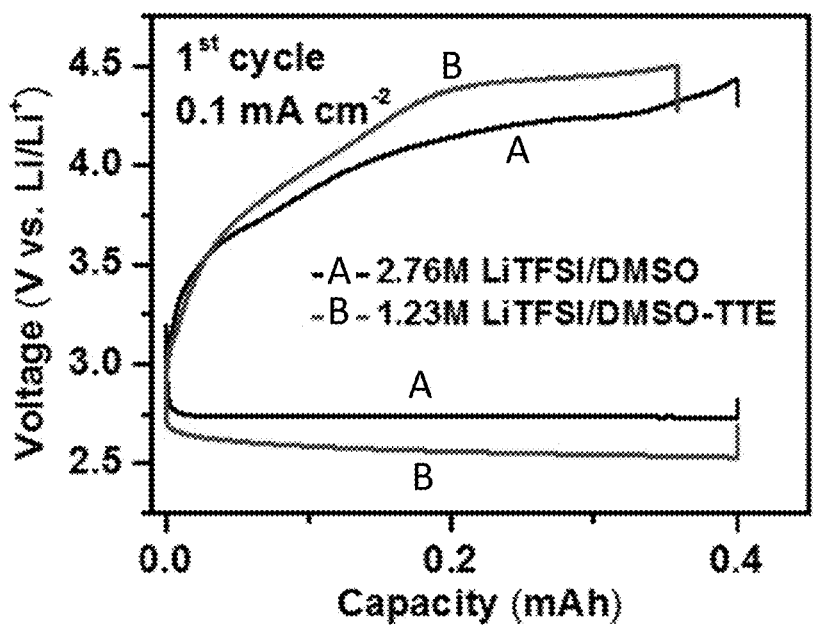
FIG. 32 shows charge/discharge profiles of Li—$O_2$ cells using LiTFSI-3DMSO (dimethyl sulfoxide) (2.76 M) and LiTFSI-3DMSO-3TTE (1.23 M) electrolytes with limited discharge capacity of 600 mAh g$^{-1}$ at a current density of 0.1 mA cm$^{-2}$.

FIG. 32 shows the charge/discharge profiles of Li—$O_2$ cells using LiTFSI-3DMSO (2.76 M) and LiTFSI-3DMSO-3TTE (1.23 M) electrolytes with limited discharge capacity of 600 mAh g$^{-1}$ at a current density of 0.1 mA cm$^{-2}$. After dilution of LiTFSI concentration from 2.76 M to 1.23 M, the Li—$O_2$ cells demonstrated similar capacity as those observed in the Li—$O_2$ cells using the highly concentrated electrolyte. For charge/discharge performance testing, Li—$O_2$ coin cells were assembled in the argon-filled glove box (MBraun, Inc.). A piece of separator (Whatman glass fiber B) soaked with 200 μL of LiTFSI-DMSO electrolyte with and without TTE diluent was placed between an air electrode disc and a Li metal chip. After crimping, the assembled cells were transferred into PTFE (polytetrafluoroethylene) containers and taken out of the glove box. The PTFE containers were filled with ultrahigh purity 02. These Li—$O_2$ cells were allowed to rest for at least 6 h in $O_2$ atmosphere and then discharge/charge evaluations were performed at room temperature on an Arbin BT-2000 battery tester (Arbin Instruments, College Stations, Tex.) at a current density of 0.1 mA cm$^{-2}$.

Example 9

Aqueous Electrolytes with Bridge Solvents

Water based electrolytes with superconcentrated lithium salt LiTFSI (e.g., 21 mol LiTFSI in 1 kg of $H_2O$) have been reported to widen their electrochemical stability window to about 3.0 V (i.e. 1.9~4.9 vs. Li/Li+). As demonstrated in the above examples, diluting this concentrated water based electrolyte while maintaining the wide electrochemical stability window could be a good strategy to reduce the cost of the electrolyte. However, the fluoroalkyl ethers having low dielectric constants and low donor numbers are not miscible with water. Therefore, the superconcentrated aqueous electrolyte (21 mol LiTFSI in 1 kg of $H_2O$) was diluted with TTE with the assistance of a 'bridge' solvent. The evaluated electrolyte formulations are shown in Tables 7 and 8. The 'bridge' solvents included DMC, PC, AN, and DMSO. By fixing the ratio of $H_2O$:TTE to be 1:1, the optimal content of 'bridge' solvent was carefully optimized. The optimal content is different for different solvents, depending on the strength of the interaction between 'bridge' solvent and $H_2O$ and TTE diluent.

TABLE 7

Electrolyte number and formulations

| Electrolyte number | $H_2O$-solvent-TTE | wt. ratio | m (mol/kg) | M (mol/L) |
|---|---|---|---|---|
| E27 | $H_2O$ | 1 | 21 | 5.04 |
| E28 | $H_2O$-DMC-TTE | 1:0.85:1 | 7.37 | 3.78 |
| E29 | $H_2O$-PC-TTE | 1:1.05:1 | 6.89 | 3.69 |
| E30 | $H_2O$-AN-TTE | 1:0.5:1 | 8.4 | 3.87 |
| E31 | $H_2O$-DMSO-TTE | 1:1.15:1 | 6.67 | 3.69 |

Figure 33:
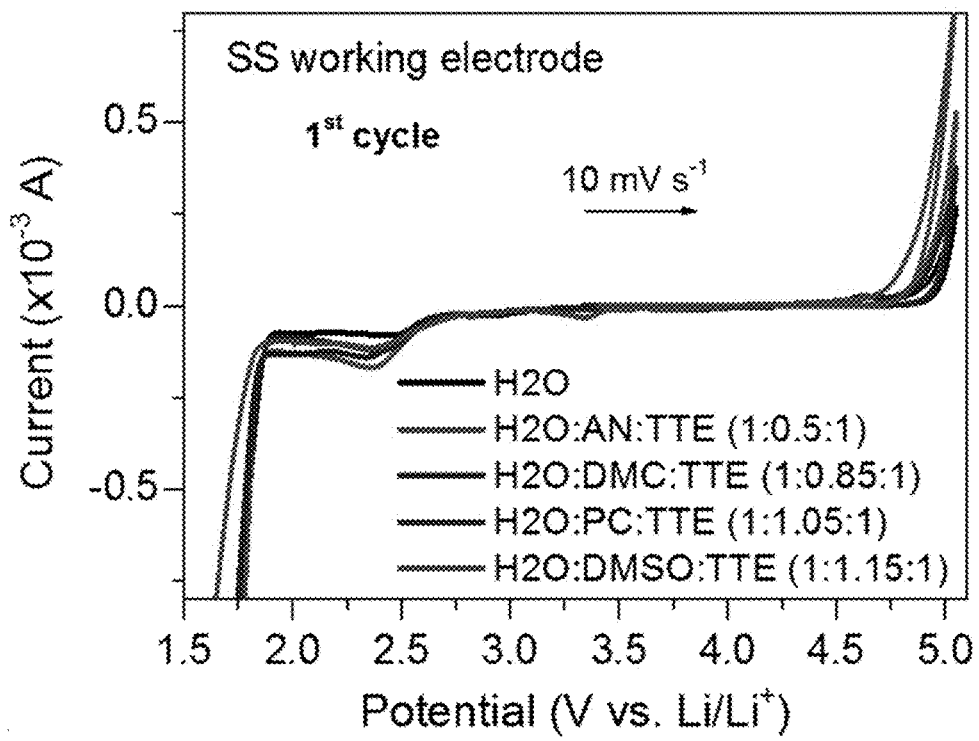
FIG. 33 shows cyclic voltammograms of concentrated aqueous electrolyte before and after dilution with TTE with the assistance of different 'bridge' solvents (acetonitrile (AN), dimethyl carbonate (DMC), propylene carbonate (PC), and DMSO), using a stainless steel working electrode and counter electrode, and Ag/AgCl as reference electrode at a scan rate of 10 mV s$^{-1}$. The potential was converted to those versus to Li/Li$^+$ redox couple.

FIG. 33 shows the cyclic voltammograms of concentrated aqueous electrolyte before and after dilution with TTE with the assistance of different 'bridge' solvents, including DMC, PC, AN, and DMSO, using a stainless steel working electrode and counter electrode, and Ag/AgCl as reference electrode at a scan rate of 10 mV s$^{-1}$. The potential was converted to those versus to Li/Li+ redox couple. In comparison, it was found that the dilution with TTE using PC as the 'bridge' solvent did not compromise much of the oxidation and reduction stability. However, with a $H_2O$:TTE ratio of 1:1, the concentration of the LiTFSI/$H_2O$ solution was only diluted from 5.04 M to 3.69 M.

To further dilute the concentrated LiTFSI/$H_2O$ solution, more TTE was used with the addition of increased PC as 'bridge' solvent. The ratio between PC:TTE was very close to 1:1 in diluted electrolytes. With the increased addition of PC and TTE, the concentration of the concentrated LiTFSI/$H_2O$ solution was diluted from 5.04 M to 2.92 M.

TABLE 8

Electrolyte number and formulations

| Electrolyte number | $H_2O$-solvent-TTE | wt. ratio | m (mol/kg) | M (mol/L) |
|---|---|---|---|---|
| E32 | $H_2O$ | 1 | 21 | 5.04 |
| E33 | $H_2O$-PC-TTE | 1:0.55:0.5 | 10.3 | 4.30 |
| E34 | $H_2O$-PC-TTE | 1:1.05:1 | 6.89 | 3.69 |
| E35 | $H_2O$-PC-TTE | 1:1.5:1.5 | 5.25 | 3.27 |
| E36 | $H_2O$-PC-TTE | 1:2:2 | 4.29 | 2.92 |

Figure 34A:
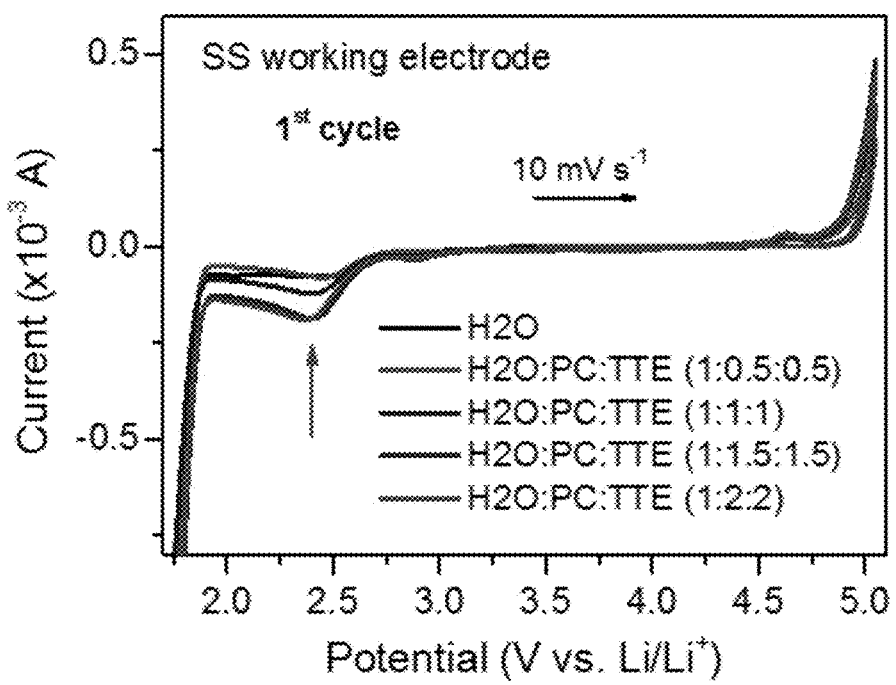
FIGS. 34A and 34B, respectively, show first cycle and second cycle cyclic voltammograms of concentrated aqueous electrolyte diluted with different amounts of TTE with the assistance of PC. Stainless steel was the working electrode and counter electrode, and Ag/AgCl was the reference electrode. Scan rate of 10 mV s$^{-1}$. The potential was converted to those versus to Li/Li$^+$ redox couple.
Figure 34B:
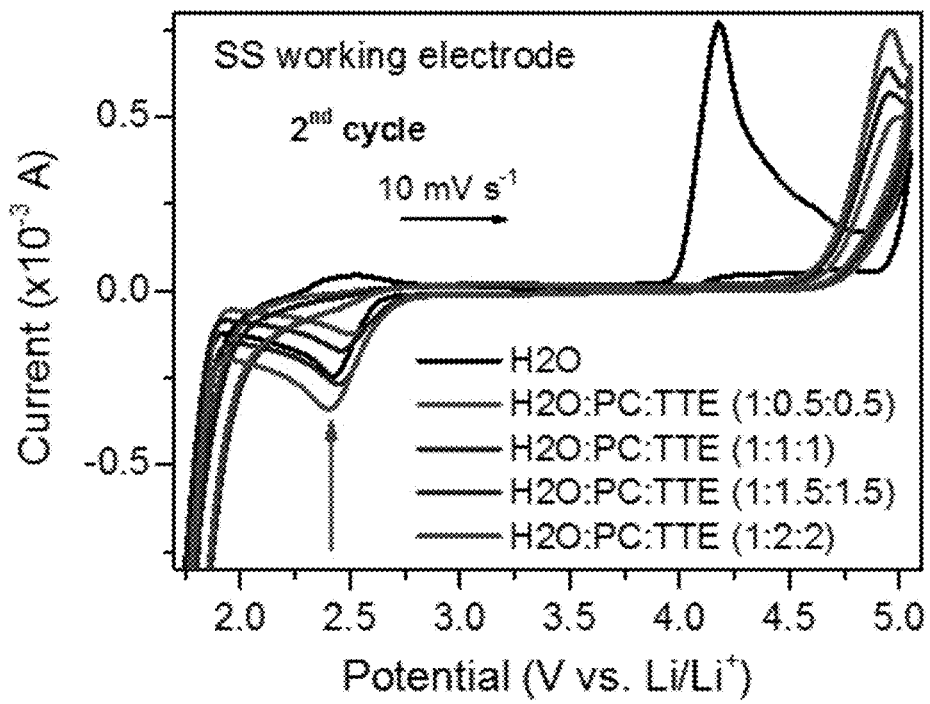

FIGS. 34A and 34B show the first and second cycle cyclic voltammograms, respectively, of concentrated aqueous electrolyte diluted with different amounts of TTE with the assistance of PC. Stainless steel was the working electrode and counter electrode, and Ag/AgCl was the reference electrode; scan rate of 10 mV s$^{-1}$. The potential was converted to those versus to Li/Li$^+$ redox couple. In the first cycle (FIG. 34A), the increased addition of PC-TTE leads to a slight increase in the reduction instability at ~2.35V (arrow), as reflected by the higher current response during the negative scan. However, dilution of an appropriate amount of PC-TTE improves the reduction stability and oxidation stability, probably due to the formation of an enhanced SEI layer on the working electrode (FIG. 34B). The optimum dilution of the concentrated electrolyte is identified as H$_2$O:PC:TTE ratio of 1:1.5:1.5.

Example 10

Molecular Simulations

Without wishing to be bound by a particular theory of operation, the exceptional electrochemical performances of LMBs achieved in the BTFE diluted LiFSI/DMC-BTFE electrolytes is believed to stem from its unique highly localized superconcentrated Li salt solvation structure. First-principles density functional theory (DFT) and ab initio molecular dynamics (AIMD) simulations were used to characterize the DMC-LiFSI solvation structure in localized superconcentrated electrolyte. All calculations were performed using the Vienna ab Initio Simulation Package (VASP) (Kresse et al., *Phys Rev B* 1996, 54:11169-11186; Kresse et al., *Phys Rev B* 1993, 47:558-561; Kresse et al., *Phys Rev B* 1994, 49:14251-14269). Electron-ion interactions were described by the projector-augmented wave (PAW) pseudopotentials with the cutoff energy of 400 eV (Blochl, *Phys Rev B* 1994, 50:17953-17979; Kresse et al., *Phys Rev B* 1999, 59:1758-1775). The exchange-correlation functional was represented using the Perdew-Burke-Ernzerhof generalized gradient approximation (GGA-PBE) (Perdew et al., *Phys Rev Lett* 1996, 77:3865-3868). The exchange-correlation functional with a Gaussian smearing width term of 0.05 eV was used in the calculations of electrolytes and LiFSI salt interacting with Li metal anode surface systems. The Monkhorst-Pack k-point mesh grid scheme (4×4×1) was used to obtain the optimized Li anode surface and adsorption of electrolyte and salt molecules in the ground state. The convergence criteria for electronic self-consistent iteration and ionic relaxation were set to 1×10$^{-5}$ eV and 1×10$^{-4}$ eV, respectively. AIMD simulations of electrolyte-salt mixtures were performed in the canonical (NVT) ensemble at 303 K. The constant temperature of AIMD simulation systems was controlled using the Nose thermostat method with a Nose-mass parameter of 0.5. The time step of 0.5 fs was used in all AIMD simulations. A Monkhorst-Pack k-point mesh grid scheme (2×2×2) was used in AIMD simulations. The total AIMD simulation time for each electrolyte/salt system was 15 ps. The AIMD trajectory of final 5 ps was used to obtain radial distribution functions of Li—O pairs.

FIG. 35 shows the optimized geometries of DMC, BTFE, LiFSI, and pairs of DMC/LiFSI, BTFE/LiFSI in vacuum using VASP. The Li, O, C, H, S, N, and F atoms are colored as magenta, red, gray, white, yellow, blue, and light blue, respectively. Only Γ-centered k-point mesh was used for above calculations. Similar results were also obtained using the Gaussian 09 package with PBE and the 6-311++G(p,d) basis set (Frisch et al., *Gaussian 09*, 2009, Gaussian Inc., Wallingford, Conn.), Table 10. It was found that LiFSI salt is preferentially coordinated with DMC via the Li—O$_{DMC}$ bond, with an optimized Li—O$_{DMC}$ bond length of 1.85 Å and strong interaction between LiFSI and DMC (−88.7 kJ/mol). On the other hand, the interaction between LiFSI and another electrolyte solvent BTFE is comparatively weak as reflected by the Li—O$_{BTFE}$ bond distance of 2.70 Å, which is much longer than the optimized Li—O$_{DMC}$ bond, and much weaker interaction of −41.4 kJ/mol between LiFSI and BTFE.

As suggested by previous theoretical work of Li bulk and surfaces (Camacho-Forero et al., *J Phys Chem C* 2015, 119:26828-26839; Doll et al., *J Phys Condens Matter* 1999, 11:5007-5019), the most stable (100) surface among three low index surface structures, i.e., (100), (110), and (111) crystallographic planes, was used to model the Li anode surface. The periodic Li (100) surface has a p(4×4) super cell with seven atomic Li layers. The optimized structures of DMC, BTFE, LiFSI and the DMC/LiFSI pair on the Li (100) surface are shown in FIGS. 36A-36F.

Bader charge analyses (Henkelman et al., *Comput Mater Sci* 2006, 36:354-360) were performed to obtain the possible charge transfer between the electrolytes and the salt species upon adsorption. DFT calculated adsorption energies and Bader charges of each species were summarized in Table 9. Compared with DMC, LiFSI and the DMC/LiFSI pair, the interaction between BTFE and the Li anode surface is very weak and barely reductive. This indicates that BTFE molecule is nearly inert and barely being reduced. While DMC and the DMC/LiFSI pair are slightly reduced by obtaining the fractional charges of −0.19 and −0.40 |e|, respectively, implying that both are reduced thus leading to possible decomposition. In summary, BTFE is found to be more stable than DMC and the DMC/LiFSI pair on the Li anode.

Figure 37B:
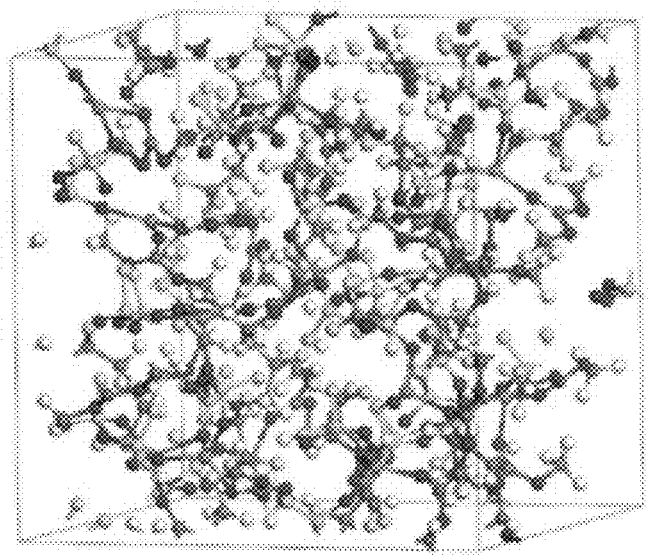
Figure 37C:
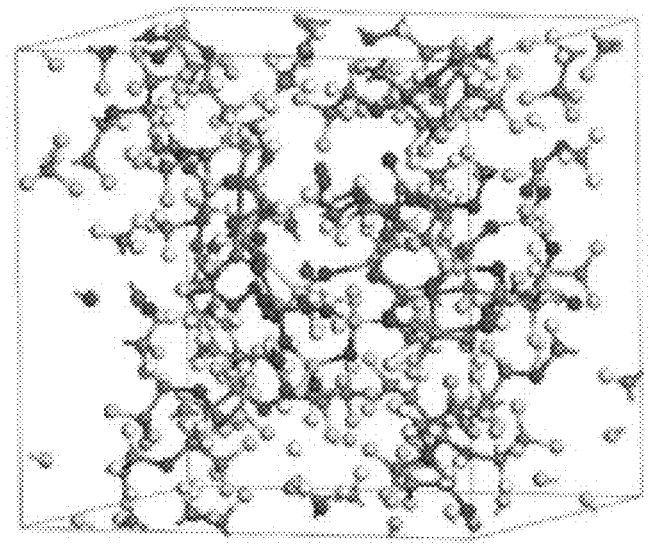
Figure 38:
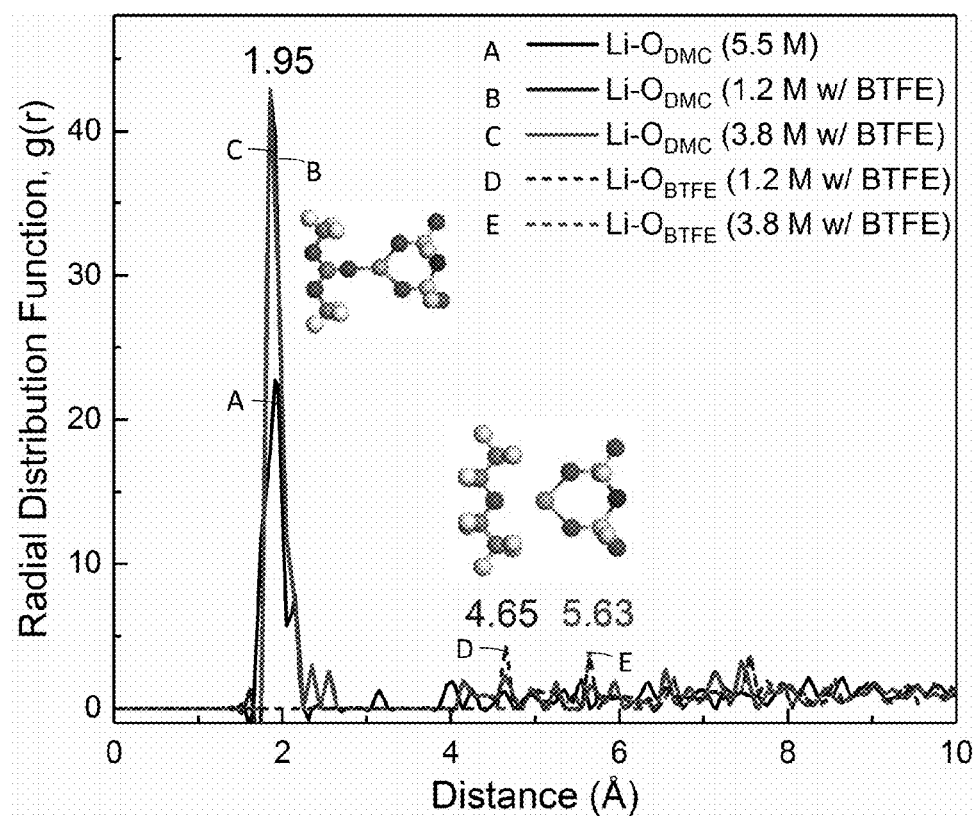
FIG. 38 is a graph of the radial distribution functions of Li—$O_{DMC}$ and Li—$O_{BTFE}$ pairs calculated from AIMD simulation trajectories at 303 K.

To understand the effect of adding the second electrolyte solvent BTFE on the microscopic structures of DMC/LiFSI mixtures, three electrolyte/salt mixture systems, i.e., one binary DMC/LiFSI mixture and two ternary DMC/BTFE/LiFSI mixtures with two different molar ratios, were investigated using AIMD simulations. The initial structure of each liquid electrolyte/salt mixture system was set up by randomly placing the numbers of DMC, BTFE and LiFSI molecules on the basis of experimental densities and molar ratios (concentration). The size of simulation system is 20 Å×20 Å×20 Å. These initial structures were firstly relaxed using a house-made classical molecular dynamics simulation method with the flexible force field (Han et al., *J Electrochem Soc* 2014, 161:A2042-2053; Soetens et al., *J Phys Chem A* 1998, 102:1055-1061). Upon quasi-equilibration of the system, a total of 15 ps AIMD simulations were carried out for each mixture system. The snapshots of three electrolyte/salt mixture systems from AIMD summations are shown in FIGS. 37A-37C. FIG. 38 shows the radial distribution functions of Li—O$_{DMC}$ and Li—O$_{BTFE}$ pairs calculated from AIMD simulation trajectories at 303 K. It is clearly seen from the snapshots (FIGS. 37A-37C) of the three electrolyte/salt mixture systems and the radial distribution functions of Li—O$_{DMC}$ and Li—O$_{BTFE}$ pairs (FIG. 38) that all LiFSI salt molecules are closely coordinated with DMC instead of BTFE. The last 5 ps AIMD simulation trajectories were used to calculate the radial distribution functions of Li—O$_{DMC}$ and Li—O$_{BTFE}$ pairs. As shown in FIG. 38, a sharp peak of the Li—O$_{DMC}$ pair is identified at 1.95 Å for all three studied systems, indicating that all LiFSI salts are surrounded by DMC solvent molecules as the first coordination shell. This is due to the strong attractive interaction between DMC and LiFSI. Two small peaks of the Li—O$_{BTFE}$ pair at 4.65 and 5.63 Å are found for two ternary mixture systems with high and low BTFE concentrations. This suggests that BTFE is not coordinated to LiFSI in the two DMC/BTFE/LiFSI mixtures, clearly indicative of the existence of the localized superconcentration of DMC/LiFSI pairs, independent of the concentration of the BTFE diluent molecules.

Figure 39A:
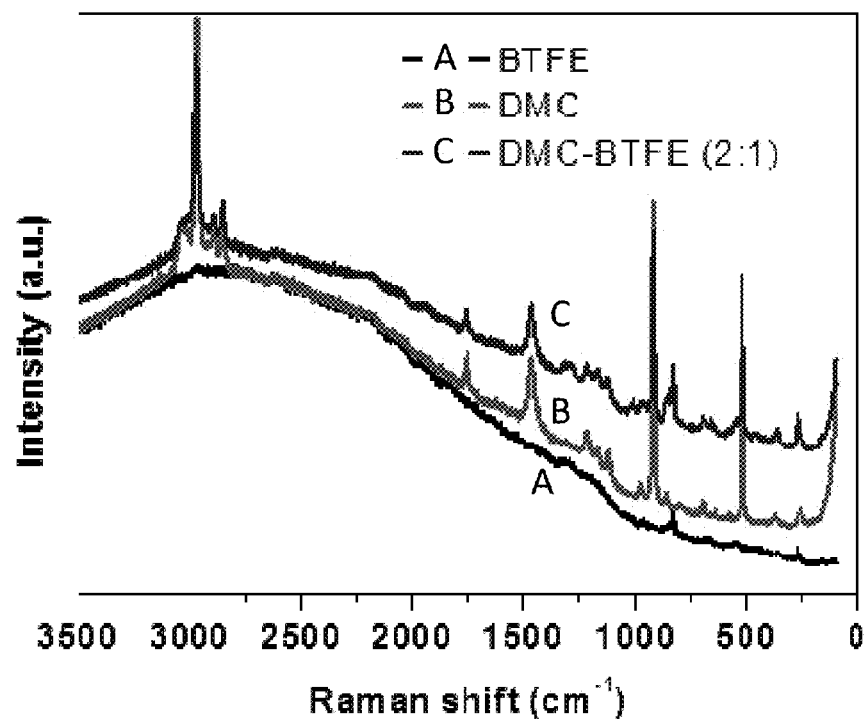
FIGS. 39A and 39B are Raman spectra of pure DMC solvent, pure BTFE solvent, and solvent mixture of DMC-BTFE (2:1)
Figure 39B:
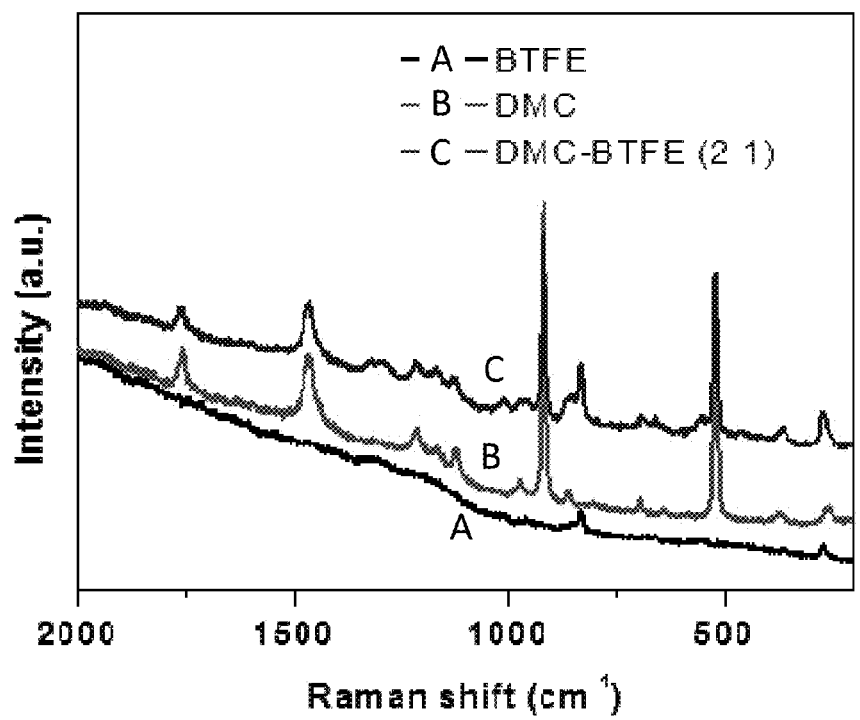

Raman spectroscopy and NMR spectroscopy were employed to investigate the solvation structures of concentrated LiFSI/DMC electrolyte and BTFE diluted LiFSI/DMC-BTFE electrolytes. FIGS. 39A and 39B show Raman spectra of pure DMC, BTFE, and a DMC-BTFE (2:1) solvent mixture. There is no observable Raman shift in the peak locations of DMC and BTFE in the mixture of DMC and BTFE. This result indicates that there is no significant interaction between DMC and BTFE.

Figure 40A:
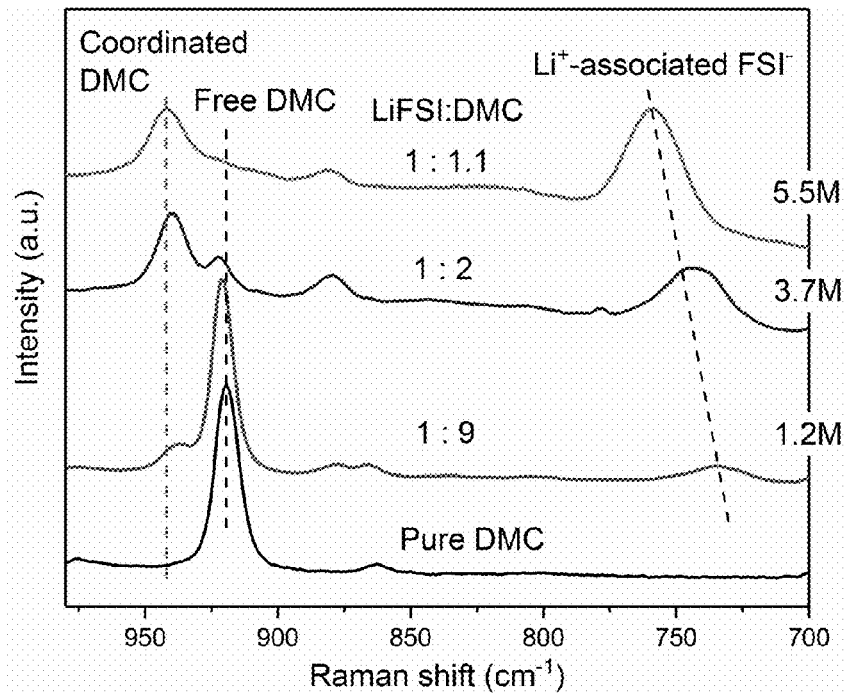
FIGS. 40A and 40B are Raman spectra of different concentrations of LiFSI/DMC solutions (FIG. 40A) and different concentrations of BTFE diluted LiFSI/DMC-BTFE solutions (FIG. 40B).
Figure 40B:
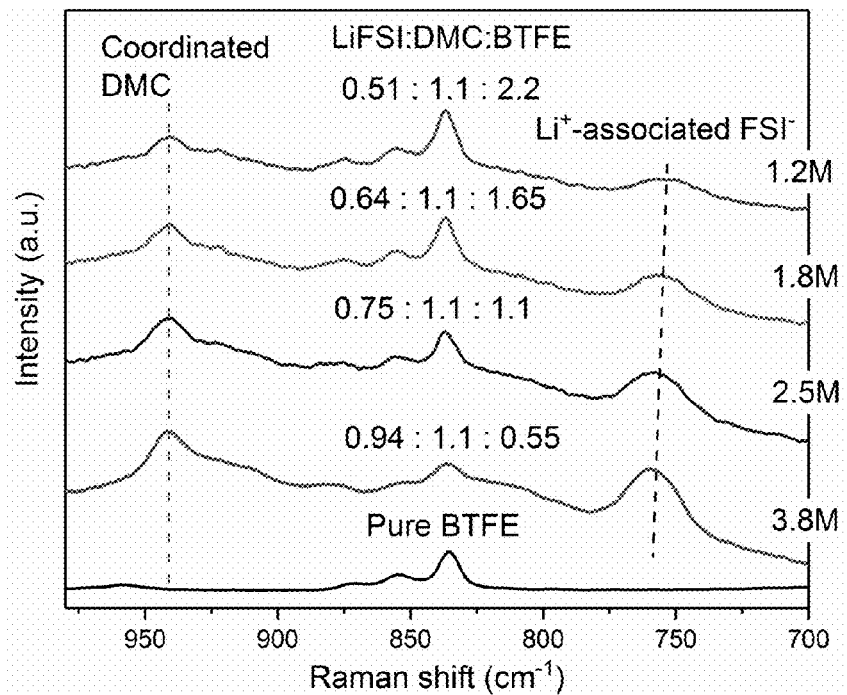

In the Raman spectra of different concentrations of LiFSI/DMC solutions, as presented in FIG. 40A, the dilute LiFSI/DMC (1:9) solution is featured by the dominating O—CH$_3$ stretching vibration band at ~920 cm$^{-1}$ for free DMC solvent molecules and the minor vibration band at ~940 cm$^{-1}$ for Li$^+$-coordinated DMC. As the LiFSI concentration is increased (higher LiFSI:DMC molar ratio), the free DMC diminishes and disappears to form the contact ion pairs (CIPs, FSI-coordinating to single Li$^+$ ion) and aggregates (AGGs, FSI$^-$ coordinating to two or more Li$^+$ ions). Formation of CIPs and AGGs in concentrated 5.5 M LiFSI/DMC is also proved by the obvious upshift of the FSI$^-$ Raman band at 710~780 cm-1. FIG. 40B shows the Raman spectra of different concentrations of BTFE diluted LiFSI/DMC solutions. With dilution by BTFE, it is found that the Li$^+$-coordinated DMC solvation structure is well preserved, without any shift of the vibration band at ~940 cm$^{-1}$ being observed. Moreover, the vibration band of BTFE at 830~840 cm$^{-1}$ does not change in different LiFSI/DMC-BTFE solutions. The result suggests that the diluent BTFE is not involved in the solvation of Li$^+$ cation because of its low dielectric constant and low donor number, confirming the LSE solvation structures. One feature of note is that the dilution with BTFE weakens slightly the association between the Li$^+$ cation and FSI-anion, as evidenced by the downshift of the FSI$^-$ Raman band (710780 cm$^{-1}$), which would be beneficial for enhancing the Li$^+$ ion diffusion and improving the kinetic properties of the LMBs.

Figure 41:
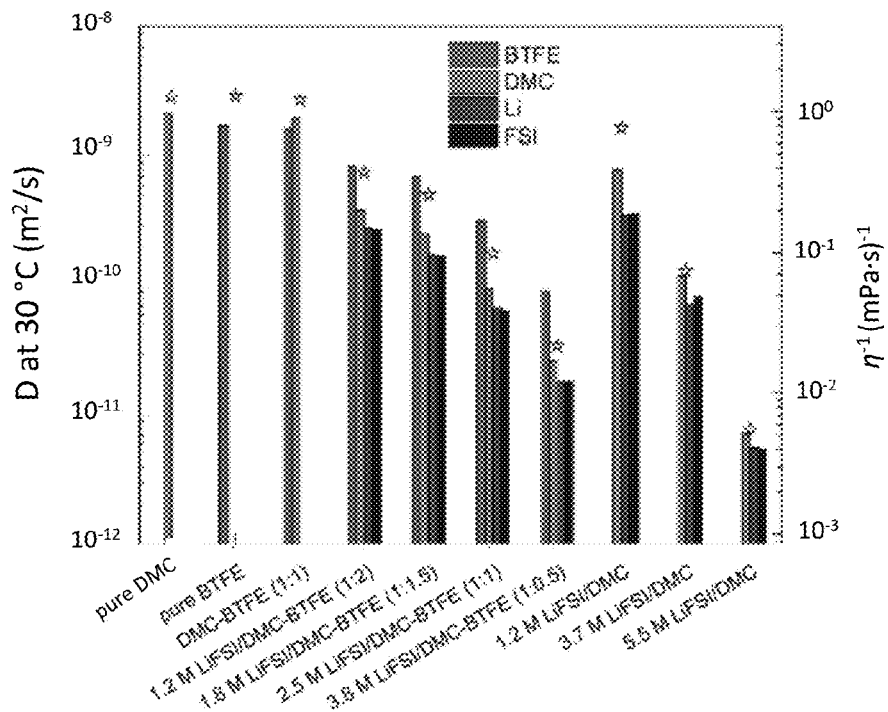
FIG. 41 shows diffusion coefficients (Ds) of Li$^+$, FSI$^-$ and solvent molecules (DMC and BTFE) at 30° C. across the samples plotted with the inverse of viscosity ($\eta^{-1}$), which is denoted with stars. The bars, from left to right, indicate the following species where present—BTFE, DMC, Li, FSI.

The LSE solvation structure is also confirmed by NMR characterization. NMR data (FIG. 41) shows that all diffusion coefficients (Ds) are globally proportional to the inverse of viscosity ($\eta^{-1}$) of solutions while its variations are slightly different depending on the ion-ion and ion-solvent interactions as predicted by the Stokes-Einstein theory of diffusion (Pregosin et al., *Chemical Reviews* 2005, 105: 2977-2998)). It is found D$_{DMC}$>D$_{BTFE}$ in pure DMC, BTFE solvent and their mixture, but with introduction of LiFSI salt, D$_{DMC}$ and D$_{BTFE}$ become smaller and larger than $\eta^{-1}$, respectively. This strongly suggests that the Li$^+$ cation solvation occurs mainly by DMC molecules, with BTFE interaction to other electrolyte components being quite weak. It also indicates that Li$^+$ cation diffusion is enhanced (D$_{Li}$≥D$_{FSI}$) by addition of BTFE, which is in line with Raman observation, while is reversed in the LiFSI/DMC electrolytes (D$_{Li}$≤D$_{FSI}$).

Figure 42:
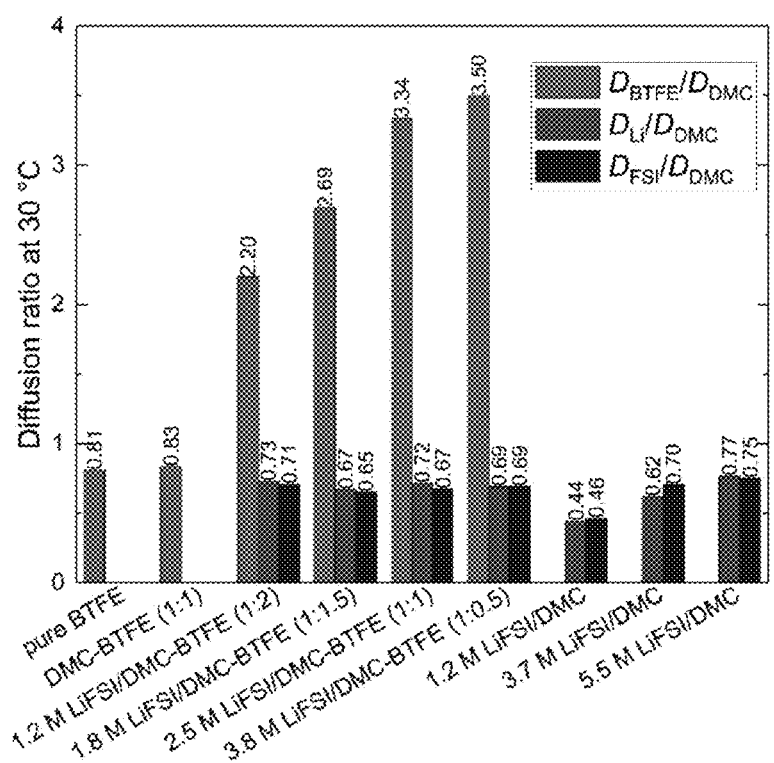
FIG. 42 shows diffusion ratios of BTFE, Li, and FSI in DMC—$D_{BTFE}/D_{DMC}$, $D_{Li}/D_{DMC}$ and $D_{FSI}/D_{DMC}$ at 30° C.

The stable diffusion ratios D$_{Li}$/D$_{DMC}$ and D$_{FSI}$/D$_{DMC}$ suggest that the LSE solvation structure composed of Li$^+$ cation, FSI$^-$ anion and DMC solvent is not sensitive to the population of BTFE in the LiFSI/DMC-BTFE electrolytes (FIG. 42). The temperature dependent Ds appears to obey the Stokes-Einstein theory of diffusion, D=k$_B$T/6$\pi\eta$r$_s$, where D is diffusion coefficient, k$_B$ is the Boltzmann constant, T is the absolute temperature, n is the viscosity and r$_s$ is the hydrodynamic radius of diffusing molecule. The D$_{Li}$/D$_{DMC}$ and D$_{FSI}$/D$_{DMC}$ values are closer to unity and D$_{BTFE}$/D$_{DMC}$ values are much larger than the unity due to the preferential solvation of Li$^+$ cation by DMC molecules. Relatively constant D$_{Li}$/D$_{DMC}$ and D$_{FSI}$/D$_{DMC}$ values in DMC:BTFE electrolytes suggests that the solvation structure composed of Li$^+$ cation, FSI$^-$ anion and DMC is less sensitive to the concentration of LiFSI and the ratio between DMC:BTFE. It can be concluded that the ion-ion and ion-solvent interactions, which depend strongly on the concentration of Li salt, are less likely to change as a function of LiFSI concentration in a DMC:BTFE binary electrolyte system.

Figure 43A:
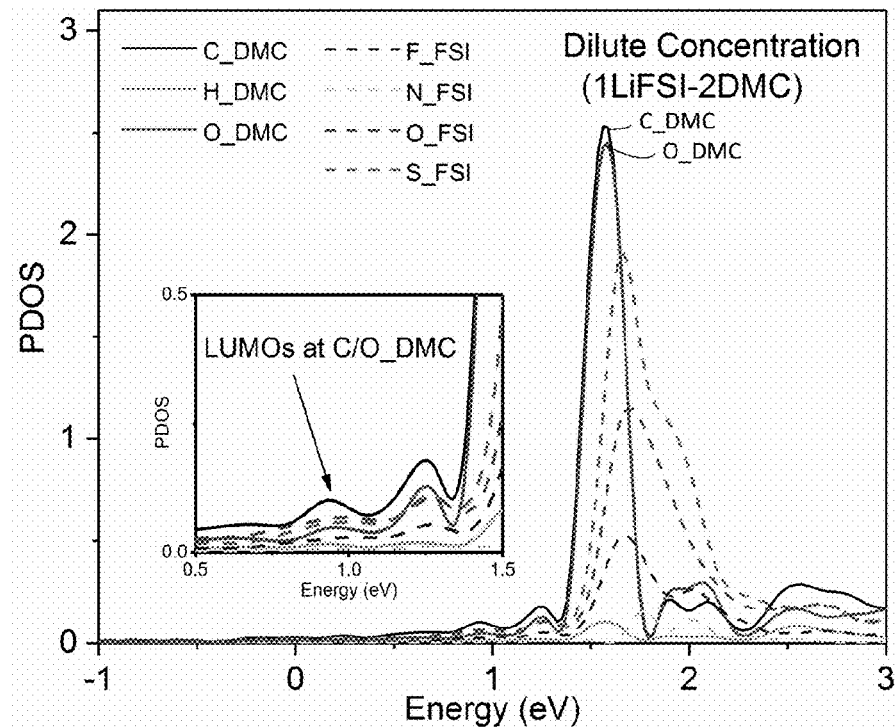
FIGS. 43A-43C are graphs showing projected density of states (PDOS) for dilute electrolyte (LiFSI/DMC, LiFSI: DMC molar ratio 1:2) (FIG. 43A), superconcentrated electrolyte (5.5M LiFSI/DMC, LiFSI:DMC molar ratio 1:1) (FIG. 43B), and BTFE-diluted electrolyte (LiFSI/DMC-BTFE, LiFSI:DMC:BTFE molar ratio 1:2:4) (FIG. 43C) on the lithium anode surface.
Figure 43B:
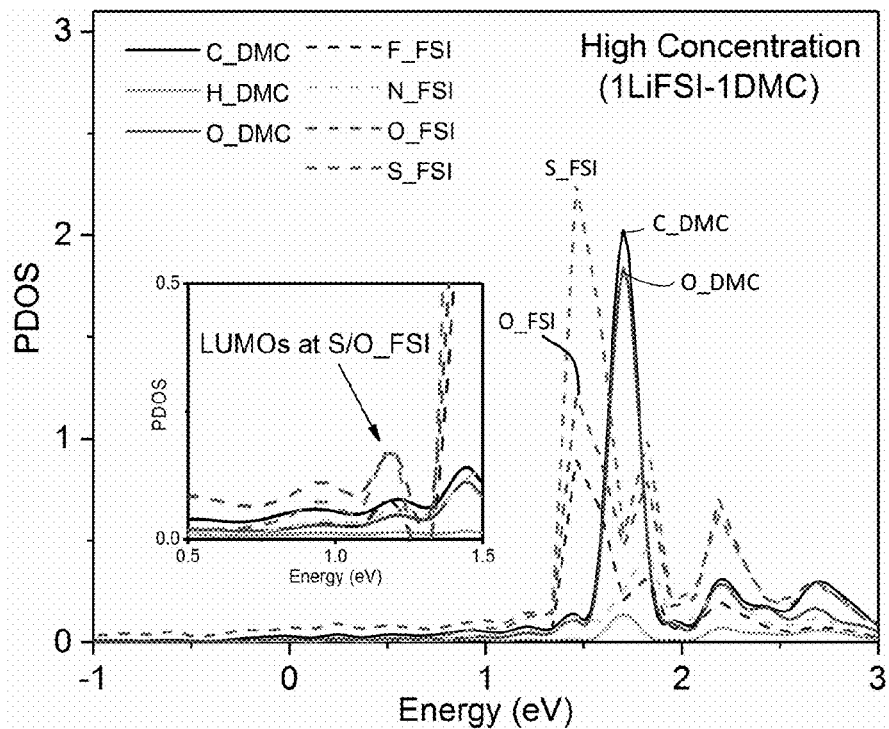
Figure 43C:
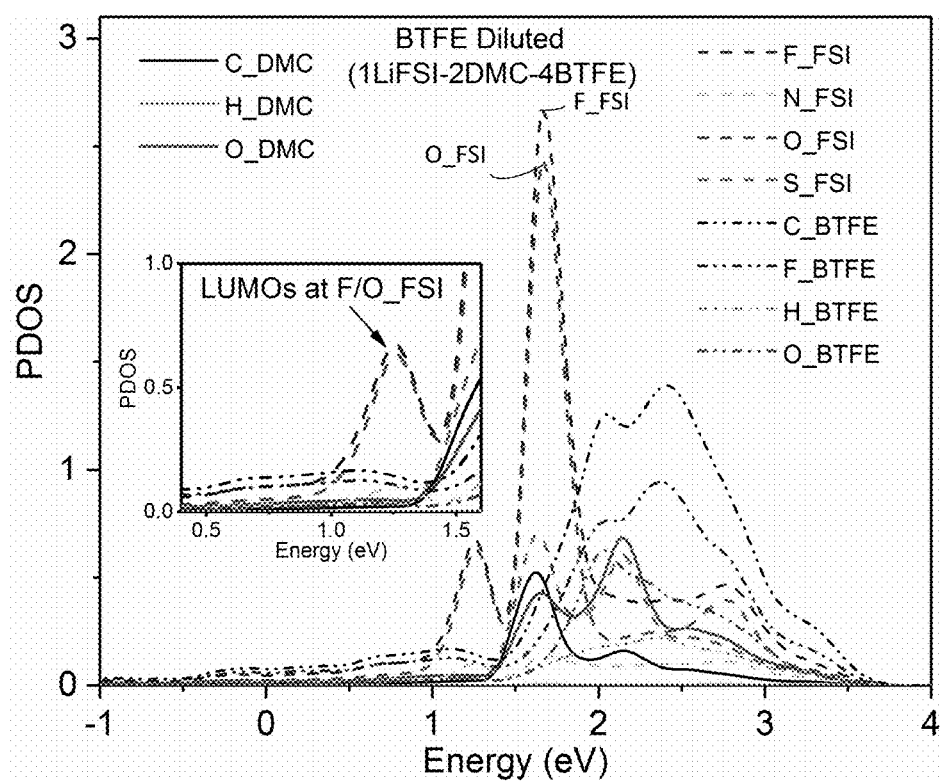
Figure 44A:
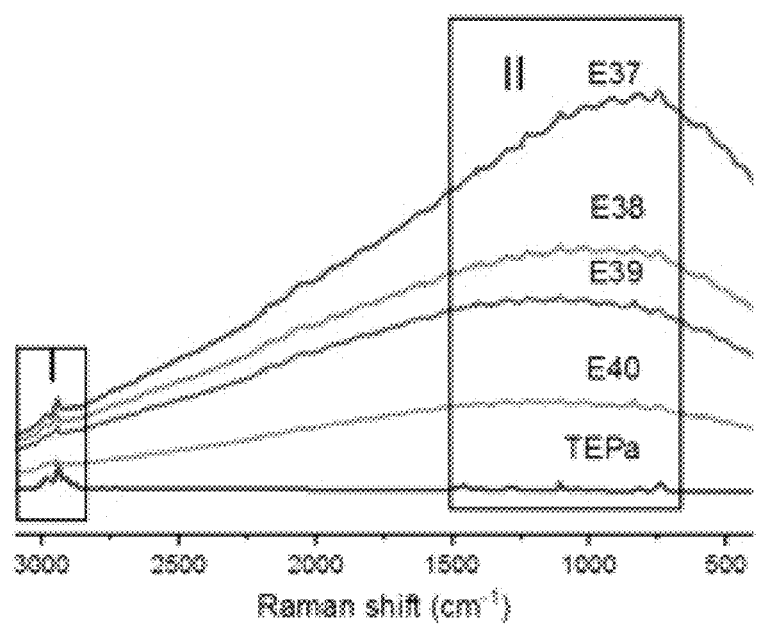
FIGS. 44A-44D show the Raman spectra of pure triethyl phosphate (TEPa) solvent, 3.2 M LiFSI:TEPa (E37) and varying concentrations of BTFE-diluted LiFSI:TEPa electrolytes (E38-E40) (FIG. 44A)
Figure 44B:
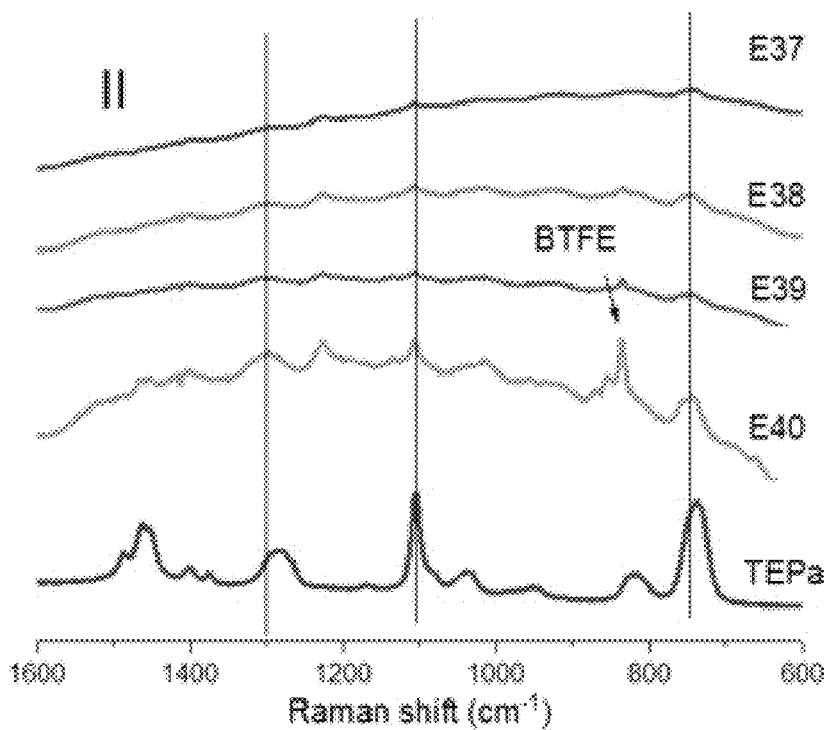
Figure 44C:
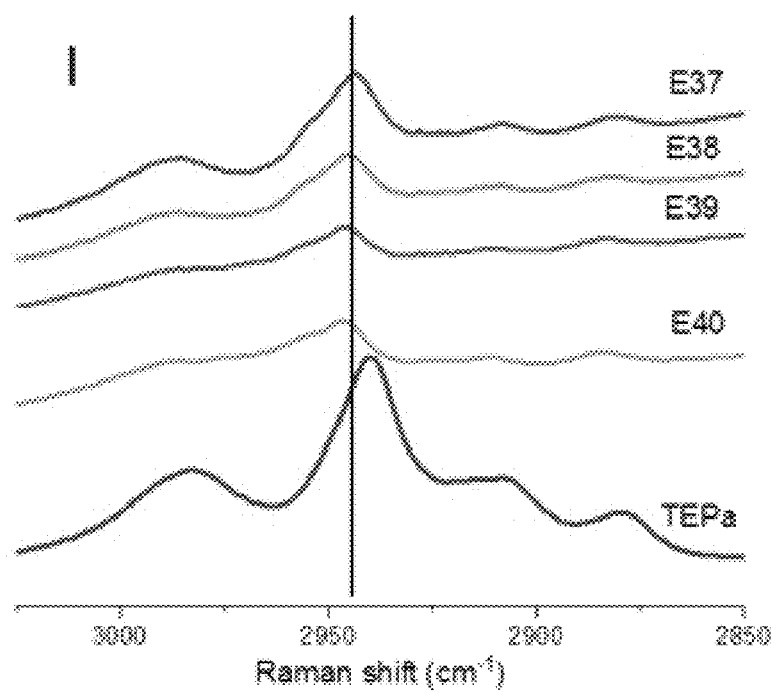
Figure 44D:
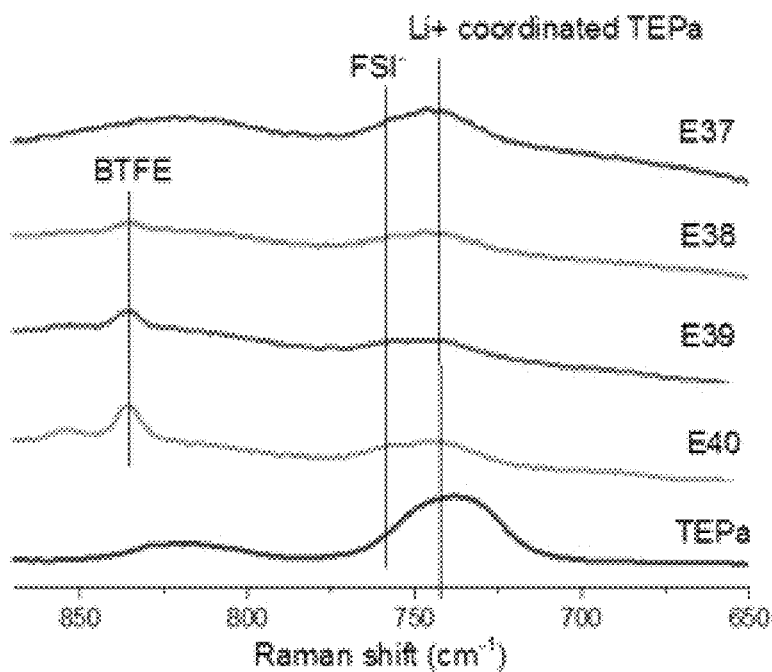

To gain insight into the stability of electrolyte components with Li metal, the moderately dilute 3.7 M LiFSI/DMC, SE (5.5 M LiFSI/DMC), and LSE (1.2 M LiFSI/DMC-BTFE (1:2)) are modeled by using solution of 1 LiFSI: 2 DMC, 1 LiFSI: 1 DMC, and 1 LiFSI: 2 DMC: 4 BTFE as three types of adsorption configurations on the most stable Li (100) surface. For the moderately dilute solution, the LiFSI adsorbs with two DMC molecules (FIG. 36F) while only the DMC-LiFSI pair adsorbs the Li (100) surface (FIG. 36D) in the case of the high concentration of LiFSI. As suggested by the previous work (Yamada et al., *J Am Chem Soc* 2014, 136:5039-5046), the reduction of LiFSI and DMC on the Li anode is examined using the lowest unoccupied molecular orbital (LUMO) energies. FIGS. 43A-43C show projected density of states (PDOS) of each atom in adsorbed LiFSI and DMC molecules for the three configurations. Clearly, in the dilute LiFSI/DMC solution (FIG. 43A), the LUMOs of the conduction bands are located at the DMC molecules. As a result, DMC molecules are reductively decomposed over the Li anode, leading to continuous corrosion of Li metal anode and fast capacity degradation of LMBs upon cycling. In contrast, for the 5.5 M LiFSI concentrated solution (FIG. 43B), the new LUMOs peaks associated with the FSI$^-$ anion appear. The lowest energy level of conduction bands of FSI-then is lower than those of DMC, indicating the FSI$^-$ anions instead of DMC solvents will be decomposed as the dominant reduction reaction, forming a FSI-derived surface film. Importantly, with dilution with inert BTFE to 1.2 M (FIG. 43C), the Li$^+$-DMC-FSI$^-$ solvation structures are well maintained, and the LUMOs of the conduction bands are still located on the FSI$^-$ anion, rather than the DMC or BTFE molecules. In this regard, FSI$^-$ anions are still preferentially reduced to form a robust FSI-derived surface film on Li metal, hence enabling improved stability of LMBs in such a low concentration electrolyte (1.2 M LiFSI/DMC-BTFE).

TABLE 9

DFT calculated adsorption energies and Bader charges of DMC, BTFE, and LiFSI on the Li(100) anode surface.

| Solvent/salt | Adsorption energy (kJ · mol$^{-1}$) | Bader charge (|e|) |
|---|---|---|
| DMC | −54.9 | −0.19 |
| BTFE | −2.9 | −0.06 |
| LiFSI | −87.4 | −1.97 |
| DMC-LiFSI | −148.9 | −0.40 |
| 2DMC + LiFSI | −198.3 | −2.14 |
| DMC + DMC-LiFSI | −223.2 | −2.03 |

TABLE 10

Mullikan charges of LiFSI salt, DMC and BTFE electrolytes calculated using Gaussian 09

| | LiFSI | | | DMC | | | BTFE | |
|---|---|---|---|---|---|---|---|---|
| 1 | O | −0.513511 | 1 | O | −0.302932 | 1 | O | −0.484765 |
| 2 | O | −0.583827 | 2 | O | −0.302935 | 2 | C | −0.008499 |
| 3 | O | −0.583829 | 3 | O | −0.350118 | 3 | H | 0.119682 |
| 4 | O | −0.513513 | 4 | C | 0.404178 | 4 | H | 0.119680 |
| 5 | S | 1.275462 | 5 | C | −0.452945 | 5 | F | −0.253411 |
| 6 | S | 1.275462 | 6 | C | −0.452947 | 6 | C | 0.789574 |
| 7 | N | −0.486613 | 7 | H | 0.242245 | 7 | F | −0.271213 |
| 8 | F | −0.371232 | 8 | H | 0.244359 | 8 | F | −0.253404 |
| 9 | F | −0.371232 | 9 | H | 0.242246 | 9 | C | −0.008475 |
| 10 | Li | 0.872833 | 10 | H | 0.244359 | 10 | H | 0.119652 |
| | | | 11 | H | 0.242245 | 11 | H | 0.119655 |
| | | | 12 | H | 0.242245 | 12 | F | −0.253424 |
| | | | | | | 13 | C | 0.789568 |
| | | | | | | 14 | F | −0.271221 |
| | | | | | | 15 | F | −0.253400 |

| | LiFSI + DMC | | | LiFSI + BTFE | | | LiFSI + DMC + BTFE | |
|---|---|---|---|---|---|---|---|---|
| 1 | O | −0.512027 | 1 | O | −0.353656 | 1 | O | −0.349474 |
| 2 | O | −0.568559 | 2 | C | −0.206384 | 2 | C | −0.209249 |
| 3 | O | −0.573433 | 3 | C | 0.469200 | 3 | C | 0.475247 |
| 4 | O | −0.513097 | 4 | C | −0.206491 | 4 | C | −0.208819 |
| 5 | S | 1.269010 | 5 | C | 0.469573 | 5 | C | 0.474330 |
| 6 | S | 1.270952 | 6 | H | 0.267227 | 6 | H | 0.268250 |
| 7 | N | −0.486903 | 7 | H | 0.268456 | 7 | H | 0.266506 |
| 8 | F | −0.369713 | 8 | H | 0.269107 | 8 | H | 0.267816 |

TABLE 10-continued

Mullikan charges of LiFSI salt, DMC and BTFE electrolytes calculated using Gaussian 09

| 9 | F | −0.370487 | 9 | H | 0.266375 | 9 | H | 0.266573 |
|---|---|---|---|---|---|---|---|---|
| 10 | Li | 0.713270 | 10 | F | −0.190602 | 10 | F | −0.187169 |
| 11 | O | −0.278551 | 11 | F | −0.193998 | 11 | F | −0.194059 |
| 12 | O | −0.275832 | 12 | F | −0.191335 | 12 | F | −0.195904 |
| 13 | O | −0.386995 | 13 | F | −0.190062 | 13 | F | −0.194621 |
| 14 | C | 0.465780 | 14 | F | −0.194829 | 14 | F | −0.193822 |
| 15 | C | −0.451501 | 15 | F | −0.190852 | 15 | F | −0.188438 |
| 16 | C | −0.453985 | 16 | O | −0.513004 | 16 | O | −0.514689 |
| 17 | H | 0.253230 | 17 | O | −0.575146 | 17 | O | −0.554408 |
| 18 | H | 0.251398 | 18 | O | −0.570364 | 18 | O | −0.552391 |
| 19 | H | 0.253073 | 19 | O | −0.514274 | 19 | O | −0.515485 |
| 20 | H | 0.253083 | 20 | S | 1.270093 | 20 | S | 1.252134 |
| 21 | H | 0.255599 | 21 | S | 1.268717 | 21 | S | 1.251197 |
| 22 | H | 0.255689 | 22 | N | −0.488169 | 22 | N | −0.486900 |
| | | | 23 | F | −0.370392 | 23 | F | −0.372415 |
| | | | 24 | F | −0.371383 | 24 | F | −0.371326 |
| | | | 25 | Li | 0.772192 | 25 | Li | 0.657434 |
| | | | | | | 26 | O | −0.279513 |
| | | | | | | 27 | O | −0.280496 |
| | | | | | | 28 | O | −0.377120 |
| | | | | | | 29 | C | 0.448938 |
| | | | | | | 30 | C | −0.469410 |
| | | | | | | 31 | C | −0.461821 |
| | | | | | | 32 | H | 0.256012 |
| | | | | | | 33 | H | 0.248965 |

TABLE 10-continued

Mullikan charges of LiFSI salt, DMC and BTFE electrolytes calculated using Gaussian 09

| | | | | | | 34 | H | 0.262868 |
|---|---|---|---|---|---|---|---|---|
| | | | | | | 35 | H | 0.249022 |
| | | | | | | 36 | H | 0.254477 |
| | | | | | | 37 | H | 0.257759 |

| LiFSI: −0.14e | LiFSI: −0.09 | LiFSI: −0.20 |
|---|---|---|
| DMC: +0.14e | BTFE: +0.09 | DMC: +0.11 |
| | | BTFE: +0.09 |

Example 11

Lithium Metal Cells with LiFSI:TEPa:BTFE Electrolytes

The performances of Li∥Cu and Li∥LiNi$_x$Mn$_y$Co$_z$O$_2$ where x+y+z=1 (i.e. Li∥NMC) cells using different electrolyte formulations were investigated at a constant temperature of 30° C. A high concentration electrolyte (HCE) of LiFSI in triethyl phosphate (TEPa), 3.8 M LiFSI/TEPa, was prepared and diluted with varying amounts of BTFE. The electrolyte formulations and the physical properties of these electrolytes are shown in Table 11.

TABLE 11

Electrolyte number and formulations

| Electrolyte number | Electrolyte formulation LiFSI:TEPa:BTFE molar ratio | M (mol L$^{-1}$) | m (mol kg$^{-1}$) | TEPa content (wt %) | Viscosity (cp, 25° C.) | Conductivity (mS cm$^{-1}$) |
|---|---|---|---|---|---|---|
| E37 | 0.75:1:0 | 3.2 | 4.1 | 56.5 | 150.0 | 0.52 |
| E38 | 0.75:1:1 | 2.0 | 2.1 | 36.1 | 16.7 | 1.13 |
| E39 | 0.75:1:2 | 1.5 | 1.5 | 26.5 | 7.8 | 1.29 |
| E40 | 0.75:1:3 | 1.2 | 1.2 | 21.0 | 2.9 | 1.21 |

By adding BTFE to the 3.8 M HCE, LiFSI:TEPa having a molar ratio of 0.75:1, the concentration of the diluted electrolyte was decreased to 1.2 M with a LiFSI:TEPa:BTFE molar ratio of 0.75:1:3. The viscosity of the diluted LSEs was decreased by 2-orders of magnitude, and ionic conductivity increased by >2 times when compared to the original concentrated LiFSI/TEPa. The self-extinguishing time (SET) of all of the electrolytes in Table 11 was found to be effectively zero, indicating that they are nonflammable due to the high mass content (21-57 wt %) of TEPa.

The LiFSI salt is insoluble in the BTFE solvent. Therefore, BTFE is considered as an 'inert' diluent of the electrolyte without participating in the solvation of LiFSI. Raman spectroscopy was employed to detect the solution coordination structures of concentrated LiFSI/TEPa electrolyte and BTFE diluted LiFSI/TEPa-BTFE electrolytes. There was no observable Raman shift in the peak location of BTFE and Li$^+$-TEPa solvates in the BTFE-diluted electrolytes (FIGS. 44A-44D). The result demonstrates that dilution with BTFE does not alter the localized high concentration LiFSI-TEPa solvation structures and minimizes the presence of free TEPa solvent molecules, therefore well maintaining the high stability of the electrolyte toward the Li metal anode during repeated plating/stripping processes.

FIG. 45 shows the CE of Li∥Cu cells during long-term cycling using concentrated LiFSI/TEPa electrolyte (E37)

and those LSEs with BTFE diluent. Cycling was performed at 0.5 mA·cm$^{-2}$ with a Li deposition areal capacity of 1 mAh·cm$^{-2}$. When the LiFSI concentration was reduced to 1.5 M (E39) and 1.2 M (E40) with the addition of BTFE as diluent, the average CEs of Li||Cu cells over 140 cycles were 98.63% and 98.82%, respectively, which are comparable to or even superior to that of the original concentrated LiFSI/TEPa (98.60%).

Figure 46:
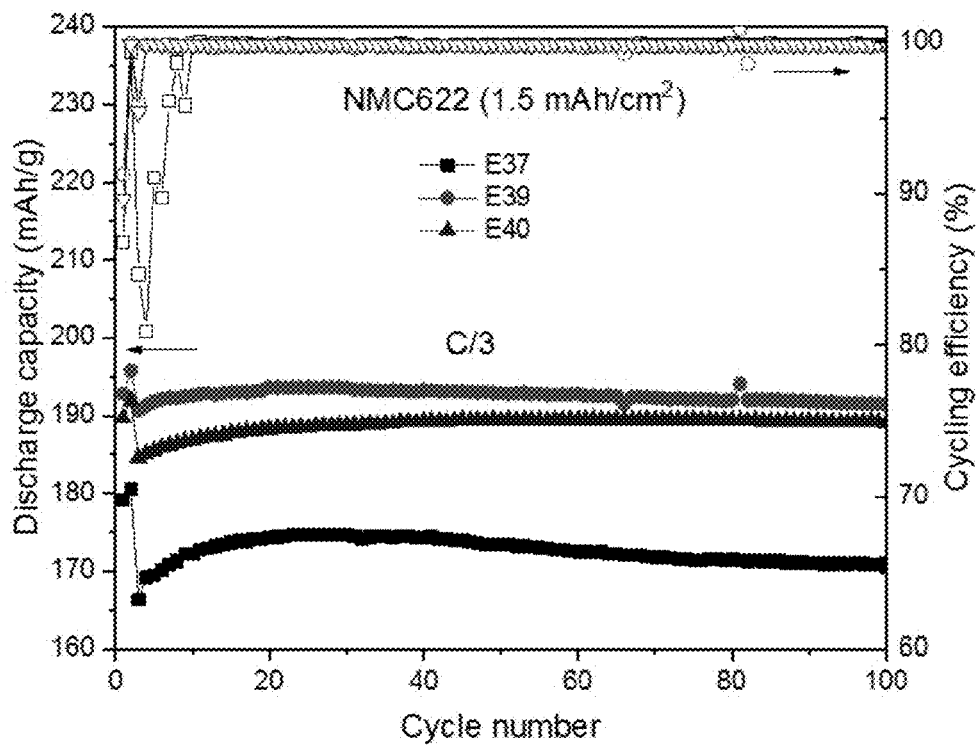
FIG. 46 is a graph showing the cycling stability of Li‖NMC (LiNi$_{0.6}$Mn$_{0.2}$Co$_{0.2}$O$_2$ with an areal capacity loading of 1.5 mAh/cm$^2$) cells containing concentrated LiFSI/ TEPa electrolytes without (E37) and with BTFE diluent (E39 and E40) at C/3 rate with a charge cutoff voltage of 4.4 V.

The cycling performances of Li||NMC (LiNi$_{0.6}$Mn$_{0.2}$Co$_{0.2}$O$_2$ with an areal capacity loading of 1.5 mAh/cm$^2$) cells using the concentrated LiFSI/TEPa electrolytes without (E1) and with BTFE diluent (E39 and E40) were further investigated. FIG. 46 shows that the Li||NMC cells using BTFE-diluted LSEs exhibited higher discharge capacities, better cycling stability and efficiency during cycling than the 3.8 M LiFSI/TEPa electrolyte. Cycling stability was performed at a C/3 rate with a charge cutoff voltage of 4.4 V.

Figure 47:
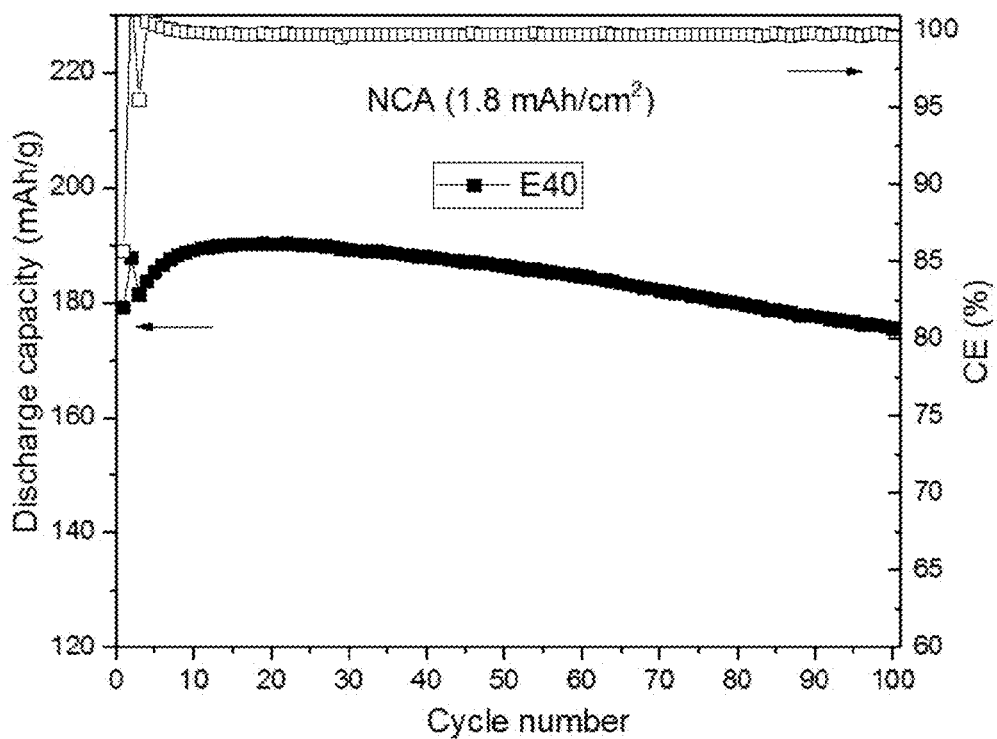
FIG. 47 is a graph showing the cycling stability of Li‖NCA (LiNi$_{0.85}$Co$_{0.1}$Al$_{0.05}$O$_2$ with an areal capacity loading of 1.8 mAh/cm$^2$) cells containing concentrated LiFSI/ TEPa electrolytes with BTFE diluent (E40) at C/3 rate with a charge cutoff voltage of 4.4 V.
Figure 48:
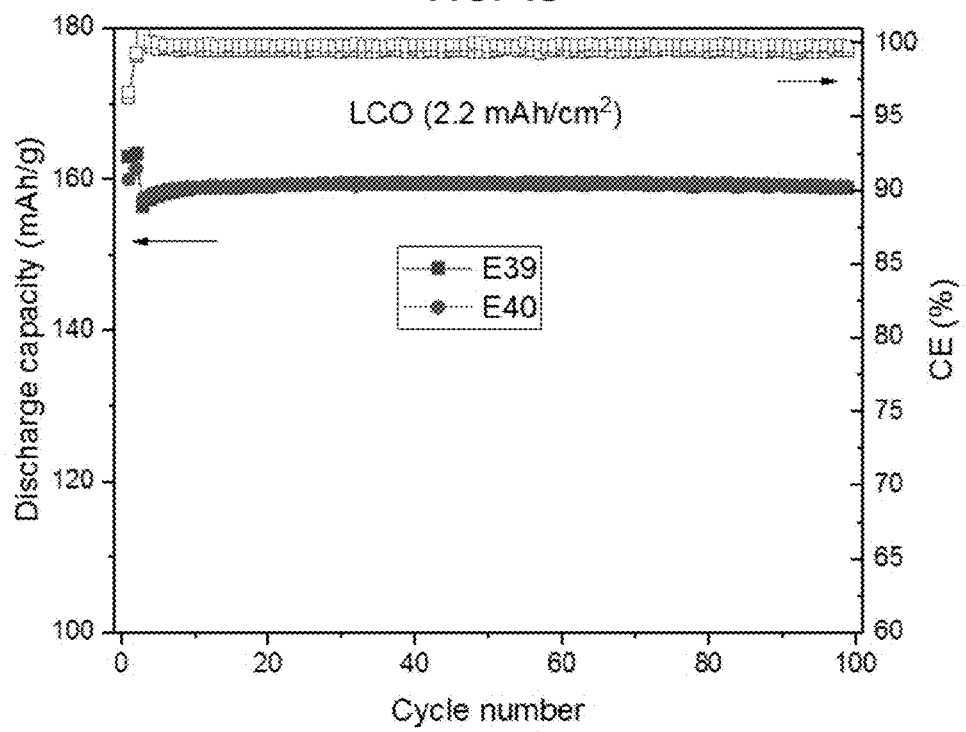
FIG. 48 is a graph showing the cycling stability of Li‖LCO (LiCoO$_2$ with an areal capacity loading of 2.2 mAh/cm$^2$) cells containing concentrated LiFSI/TEPa electrolytes with BTFE diluent (E39 and E40) at C/5 charge and 1 C discharge rate with a charge cutoff voltage of 4.35 V.

The BTFE-diluted LSEs also provided high discharge capacities and good cycling stability of Li||NCA (LiNi$_{0.85}$Co$_{0.1}$Al$_{0.05}$O$_2$ with an areal capacity loading of 1.8 mAh/cm$^2$, as shown in FIG. 47) and Li||LCO (LiCoO$_2$ with an areal capacity loading of 2.2 mAh/cm$^2$, as shown in FIG. 48) cells. The results suggest that the nonflammable BTFE-diluted TEPa-based LSEs can enable safe and stable cycling of LMBs. Cycling stability of the Li||NCA cells was performed at a C/3 rate with a charge cutoff voltage of 4.4 V. Cycling stability of the Li||LCO cells was performed at a C/5 charge and 1 C discharge rate with a charge cutoff voltage of 4.35 V.

Example 12

Lithium Metal Cells with LiFSI:TEPa:TTE Electrolytes

Electrolytes were prepared with LiFSI, TEPa, and varying concentrations of TTE to produce TTE-diluted LSEs as shown in Table 12. With TTE diluent, the concentration of LSEs was decreased to 1.9-1.0 M with a TEPa:TTE molar ratio of 1:1 to 1:3. The TTE-diluted LSEs are also nonflammable due to the high mass contents (18-33 wt %) of TEPa.

TABLE 12

Electrolyte number and formulations.

| Electrolyte number | Electrolyte formulation LiFSI:TEPa:TTE molar ratio | M (mol L$^{-1}$) | m (mol kg$^{-1}$) | TEPa content (wt %) | Conductivity (mS cm$^{-1}$) |
| --- | --- | --- | --- | --- | --- |
| E41 | 0.75:1:1 | 1.9 | 1.8 | 32.9 | 0.61 |
| E42 | 0.75:1:2 | 1.4 | 1.2 | 23.2 | 0.57 |
| E43 | 0.72:1:3 | 1.0 | 0.82 | 18.0 | 0.56 |

Figure 49:
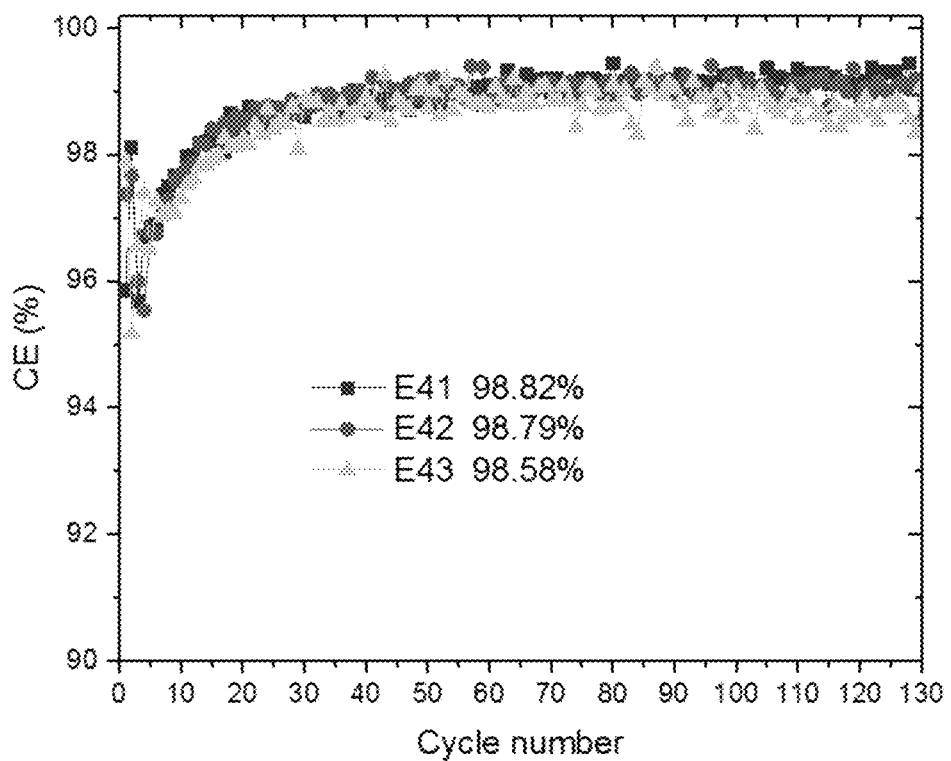
FIG. 49 is a graph of coulombic efficiency as a function of cycle number for Li‖Cu cells using TTE-diluted LSEs of LiFSI/TEPa-TTE (E41-E43) as a function of cycle number tested at 0.5 mA cm$^{-2}$ with Li deposition areal capacity of 1 mAh cm$^{-2}$.
Figure 50:
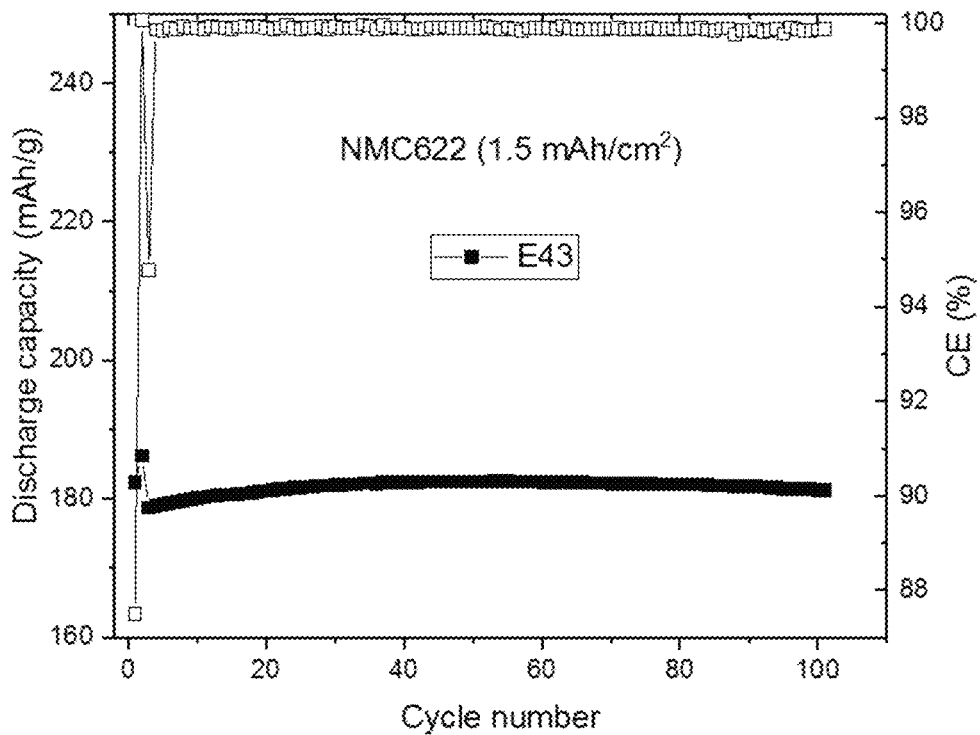
FIG. 50 is a graph showing the cycling stability of Li‖NMC (LiNi$_{0.6}$Mn$_{0.2}$Co$_{0.2}$O$_2$ with an areal capacity loading of 1.5 mAh/cm$^2$) cells containing TTE-diluted concentrated LiFSI/TEPa (E43) electrolyte at C/3 rate with a charge cutoff voltage of 4.4 V.

As shown in FIG. 49, with the addition of TTE as diluent, the average CEs of Li||Cu cells over 130 cycles were up to 98.59-98.82%, which is comparable to or even superior to that of the original concentrated LiFSI/TEPa electrolyte (98.60%). Cycling was performed at 0.5 mA cm$^{-2}$ with a Li deposition areal capacity of 1 mAh cm$^{-2}$. Similarly, the TTE-diluted TEPa-based LSEs also provided high capacity, good cycling stability and high efficiency of Li||NMC cells (FIG. 50). Cycling was performed at a C/3 rate with a charge cutoff voltage of 4.4 V.

Example 13

Lithium Metal Cells with LiFSI:TMPa:BTFE Electrolytes

Electrolytes were prepared with LiFSI, trimethyl phosphate (TMPa), and varying concentrations of BTFE as shown in Table 13. With addition of BTFE, a 4.1 M LiFSI/TMPa electrolyte could be diluted to 1.8 M by using a TMPa/BTFE molar ratio of 1:2. The TMPa-based HCE and LSE were nonflammable due to the high mass content (22-43 wt %) of TMPa.

TABLE 13

Electrolyte number and formulations.

| Electrolyte number | Electrolyte formulation LiFSI:TMPa:BTFE molar ratio | M (mol L$^{-1}$) | m (mol kg$^{-1}$) | TMPa content (wt %) |
| --- | --- | --- | --- | --- |
| E44 | 1:1:0 | 4.1 | 7.1 | 42.8 |
| E45 | 0.75:1:2 | 1.8 | 1.5 | 21.8 |

Figure 51A:
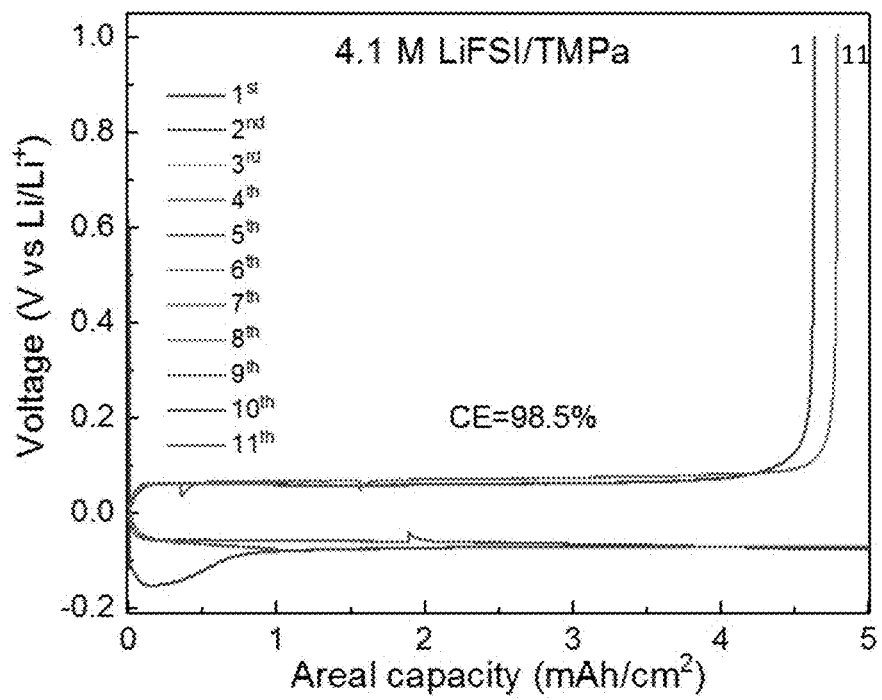
FIGS. 51A and 51B show Li plating/stripping profiles of Li‖Cu cells using concentrated 4.1 M LiFSI/TMPa (E44) (51A), and 1.8 M LiFSI/TMPa-BTFE (1:2 by mol) (E45) (51B).
Figure 51B:
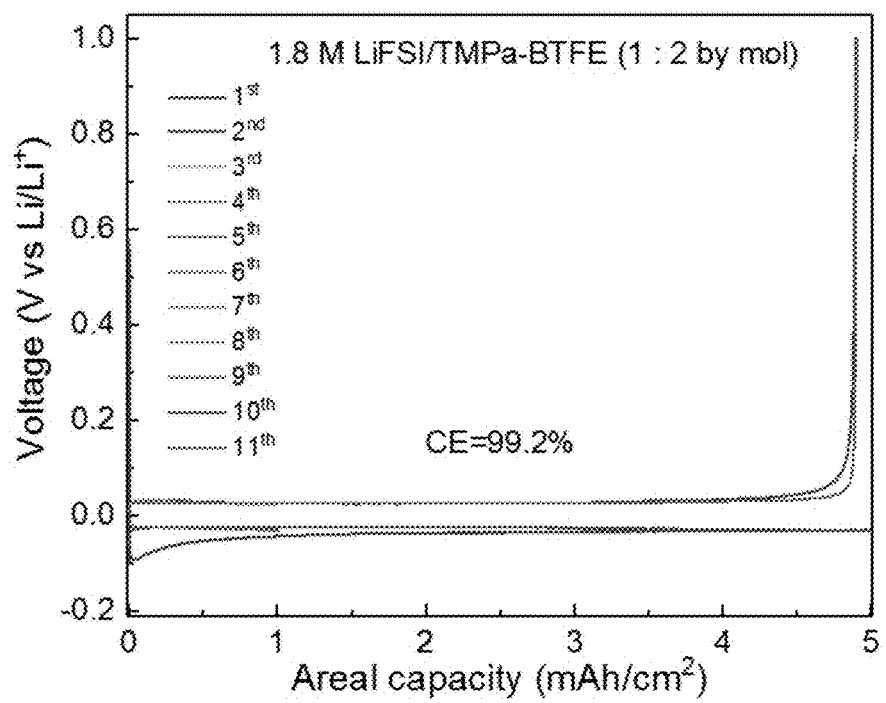

Li plating/stripping profiles of Li||Cu cells using the concentrated 4.1 M LiFSI/TMPa (E44) and 1.8 M LiFSI/TMPa-BTFE (1:2 by mol, E45) electrolytes are presented in FIGS. 51A and 51B, respectively. The following protocol was used: 1) one formation cycle with an initial Li plating of 5 mAh cm$^{-2}$ on Cu at 0.5 mA cm$^{-2}$; and then Li stripping at 0.5 mA cm$^{-2}$ to 1 V; 2) plate 5 mAh cm$^{-2}$ Li on Cu at 0.5 mA cm$^{-2}$ as Li reservoir; 3) strip/plate Li with 1 mAh cm$^{-2}$ for 10 cycles; 4) strip all Li at 0.5 mA cm$^{-2}$ to 1 V. The average CE was calculated by dividing the total Li stripping capacity by the total Li plating capacity after the initial formation cycle. Both electrolytes showed very high stability towards Li metal, providing high CE of 98.5% and 99.2% for the HCE and LSE, respectively.

Figure 52:
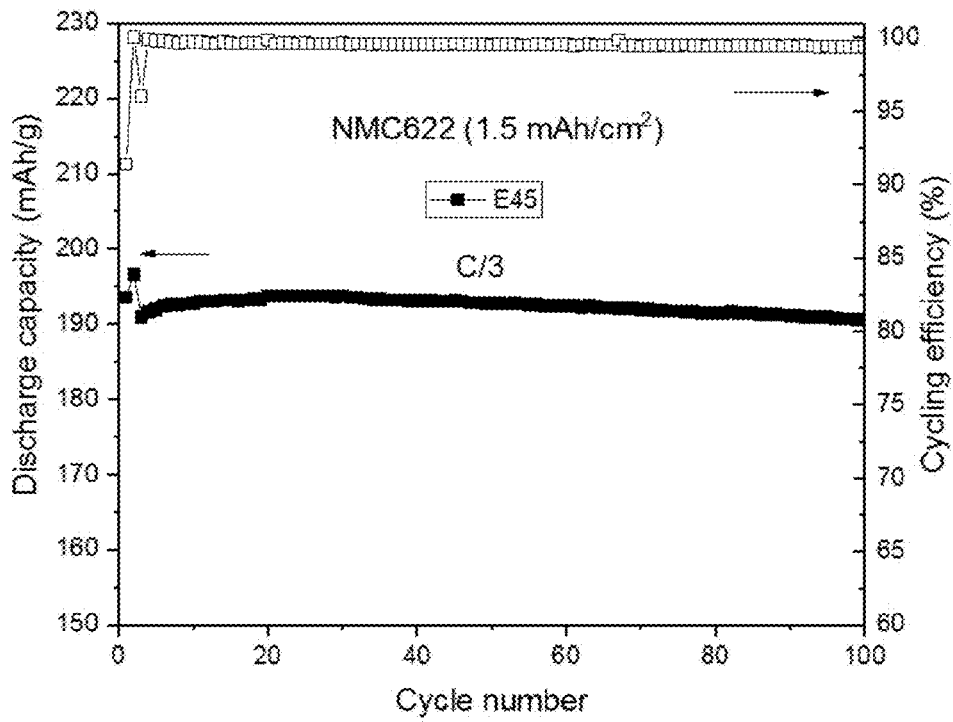
FIG. 52 is a graph showing the cycling stability of Li‖NMC (LiNi$_{0.6}$Mn$_{0.2}$Co$_{0.2}$O$_2$ with an areal capacity loading of 1.5 mAh/cm$^2$) cells containing BTFE-diluted concentrated LiFSI/TMPa (E45) electrolyte at C/3 rate with a charge cutoff voltage of 4.4 V.

The BTFE-diluted TMPa-based LSEs also exhibited high capacity, good cycling stability and high efficiency in Li||NMC cells (FIG. 52). Cycling was performed at a C/3 rate with a charge cutoff voltage of 4.4 V.

Example 14

Lithium Metal Cells with LiFSI:TMPa:DMC:BTFE Electrolytes

Nonflammable LSEs can be modified by replacing portions of the flame retardants (FRs) and diluents with other conventional solvents or additives, while still retaining a sufficiently high content of FRs to maintain the nonflammable characteristics and retain the localized high concentration solvation structures for high stability towards the Li metal anode. Electrolytes were prepared where DMC replaced some of the TMPa in LiFSI:TMPa:BTFE LSEs. The electrolyte formulations and properties are shown in Table 14.

TABLE 14

Electrolyte number and formulations used in Example 4 study

| Electrolyte number | Electrolyte formulation LiFSI:TMPa:DMC:BTFE molar ratio | M (mol L$^{-1}$) | m (mol kg$^{-1}$) | TMPa content (wt %) |
| --- | --- | --- | --- | --- |
| E46 | 1.4:1:1:4 | 1.6 | 1.1 | 11.5 |
| E47 | 1.4:1:1:6 | 1.2 | 0.88 | 8.8 |

Figure 53A:
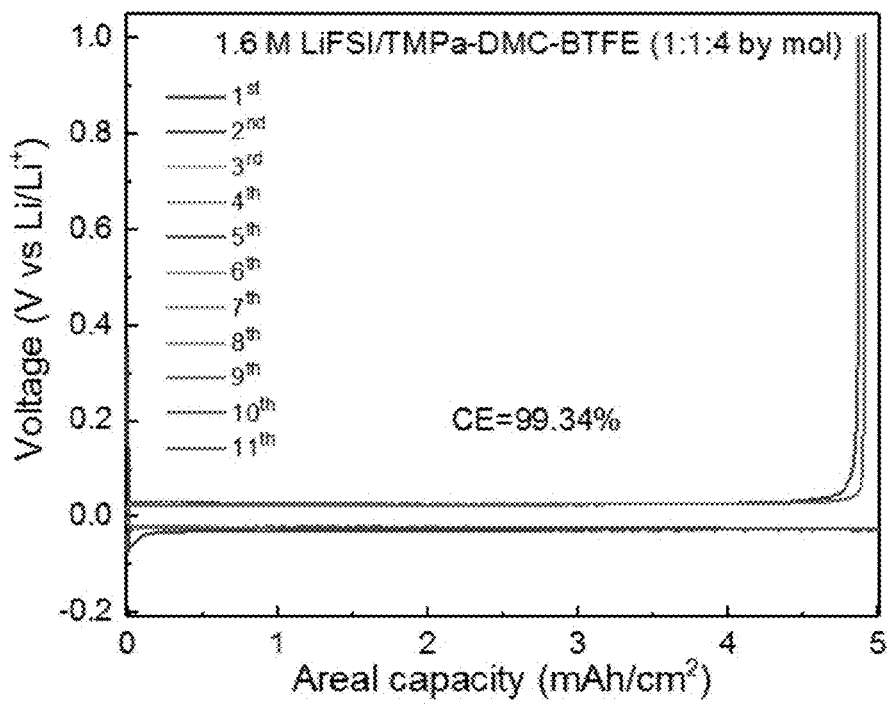
FIGS. 53A and 53B show Li plating/stripping profiles of Li‖Cu cells using 1.6 M LiFSI/TMPa-DMC-BTFE (1:1:4 by mol) (E46) (53A), and 1.2 M LiFSI/TMPa-DMC-BTFE (1:1:6 by mol) (E47) (53B).
Figure 53B:
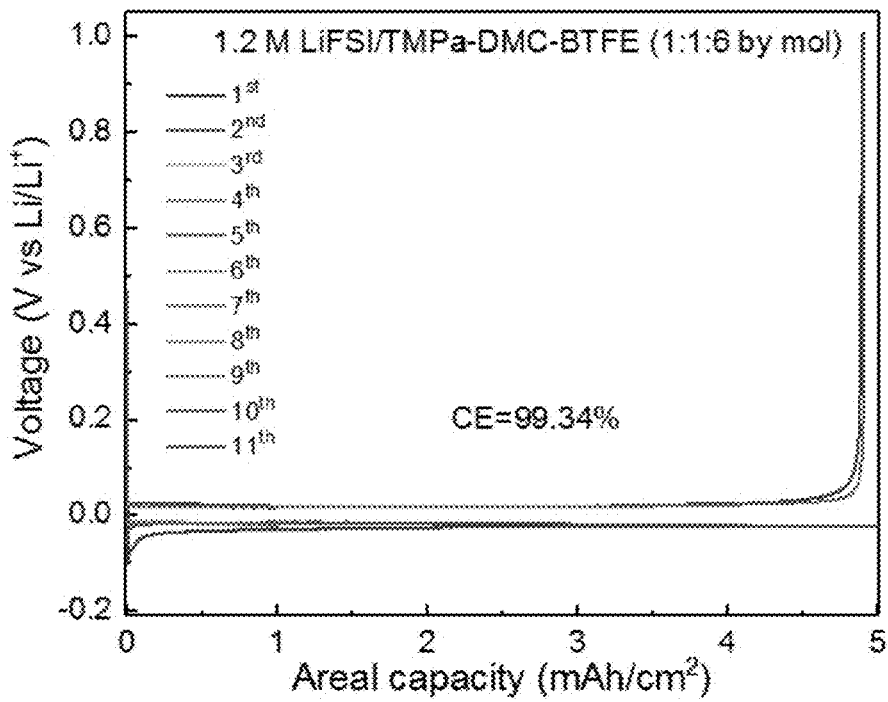

The electrolytes (E46 and E47) both provided a very high CE of 99.34% in Li‖Cu cells (FIGS. 53A and 53B, respectively). Li plating/stripping profiles were prepared using the following protocol: 1) one formation cycle with an initial Li plating of 5 mAh cm$^{-2}$ on Cu at 0.5 mA cm$^{-2}$; and then Li stripping at 0.5 mA cm$^{-2}$ to 1 V; 2) plate 5 mAh cm$^{-2}$ Li on Cu at 0.5 mA cm$^{-2}$ as Li reservoir; 3) strip/plate Li at 1 mAh cm$^{-2}$ for 10 cycles; 4) strip all Li at 0.5 mA cm$^{-2}$ to 1 V. The average CE was calculated by dividing the total Li stripping capacity by the total Li plating capacity after the initial formation cycle.

Figure 54:
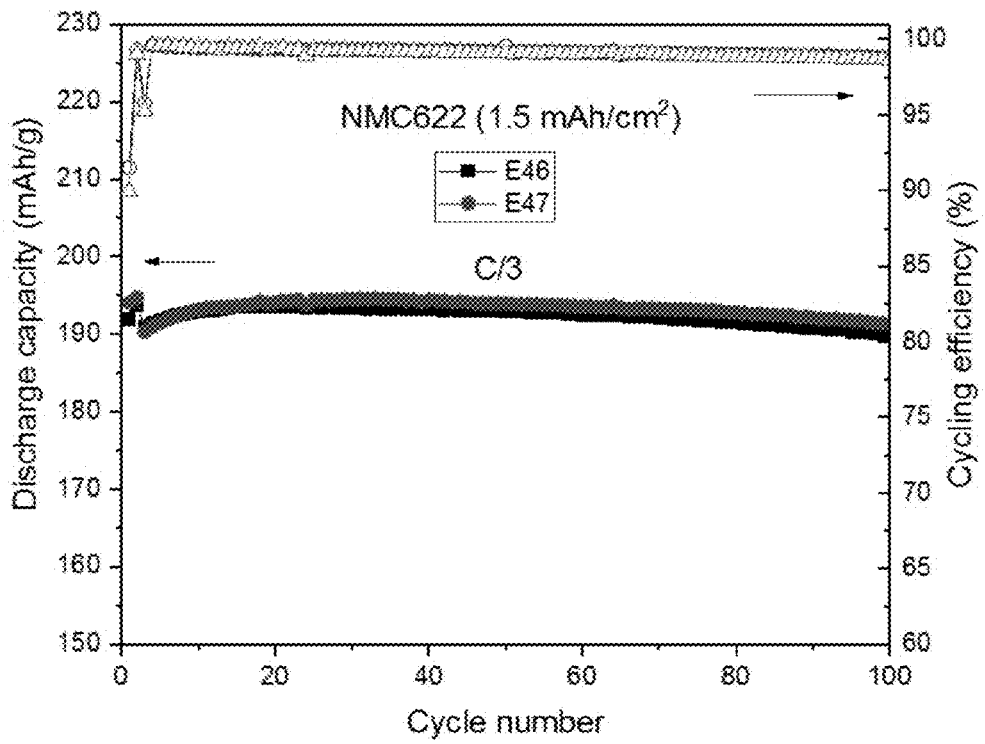
FIG. 54 is a graph showing the cycling stability of Li‖NMC (LiNi$_{0.6}$Mn$_{0.2}$Co$_{0.2}$O$_2$ with an areal capacity loading of 1.5 mAh/cm$^2$) cells containing LHCEs of LiFSI/ TMPa-DMC-BTFE (E46 and E47) electrolyte at C/3 rate with a charge cutoff voltage of 4.4 V.

The electrolytes also provided high capacity, good cycling stability and high efficiency in Li‖NMC cells (FIG. 54). Cycling was performed at a C/3 rate with a charge cutoff voltage of 4.4 V.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An electrolyte, comprising:
   an active salt comprising lithium bis(fluorosulfonyl)imide (LiFSI), lithium bis(trifluoromethanesulfonyl)imide (LiTFSI), lithium bis(pentafluoroethanesulfonyl)imide (LiBETI), sodium bis(fluorosulfonyl)imide (NaFSI), sodium bis(trifluoromethylsulfonyl)imide (NaTFSI), lithium bis(oxalato)borate (LiBOB), sodium bis(oxalato)borate (NaBOB), LiPF$_6$, LiAsF$_6$, LiBF$_4$, LiCF$_3$SO$_3$, LiClO$_4$, lithium difluoro oxalato borate anion (LiDFOB), LiI, LiBr, LiCI, LiSCN, LiNO$_3$ Li$_2$SO$_4$ or any combination thereof;
   a solvent comprising a flame retardant compound, the flame retardant compound comprising an organic phosphate, an organic phosphite, an organic phosphonate, an organic phosphoramide, a phosphazene, or any combination thereof, wherein the active salt is soluble in the solvent and a molar ratio of the active salt to the solvent is within a range of from 0.7 to 1.5; and
   a diluent comprising a fluoroalkyl ether, wherein the active salt has a solubility in the diluent at least 10 times less than a solubility of the active salt in the solvent, and
   wherein the electrolyte comprises at least 5 wt % of the flame retardant compound.

2. The electrolyte of claim 1, wherein the flame retardant compound comprises trimethyl phosphate, triethyl phosphate, tributyl phosphate, triphenyl phosphate, tris(2,2,2-trifluoroethyl) phosphate, bis(2,2,2- trifluoroethyl) methyl phosphate; trimethyl phosphite, triphenyl phosphite, tris(2,2,2- trifluoroethyl) phosphite; dimethyl methylphosphonate, diethyl ethylphosphonate, diethyl phenylphosphonate, bis(2,2,2- trifluoroethyl) methylphosphonate; hexamethylphosphoramide; hexamethoxyphosphazene, hexafluorophosphazene, or any combination thereof.

3. The electrolyte of claim 1, wherein the solvent further comprises a cosolvent, wherein the active salt is soluble in the cosolvent.

4. The electrolyte of claim 3, wherein the cosolvent comprises a carbonate solvent, an ether solvent, dimethyl sulfoxide, or any combination thereof.

5. The electrolyte of claim 3, wherein the cosolvent comprises 1,2-dimethoxyethane (DME), 1,3-dioxolane (DOL), allyl ether, diethylene glycol ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (VEC), 4-methylene-1,3-dioxolan-2-one (MEC), 4,5-dimethylene-1,3-dioxolan-2-one, dimethyl sulfoxide (DMSO), dimethyl sulfone (DMS), ethyl methyl sulfone (EMS), ethyl vinyl sulfone (EVS), tetramethylene sulfone (TMS), methyl butyrate, ethyl propionate, gamma-butyrolactone, acetonitrile, succinonitrile, triallyl amine, triallyl cyanurate, triallyl isocyanurate, or any combination thereof.

6. The electrolyte of claim 1, wherein:
   (i) the active salt has a molar concentration in the electrolyte within a range of from 0.5 M to 2 M;
   (ii) the active salt has a molar concentration in the solvent of greater than 3 moles of active salt per liter of the solvent;
   (iii) the molar concentration of the active salt in the electrolyte is at least 20% less than a molar concentration of the active salt in the solvent in the absence of the diluent; or
   (iv) any combination of (i), (ii), and (iii).

7. The electrolyte of claim 1, wherein:
   (i) a molar ratio of the active salt to the solvent is within a range of from 0.7-1.2;
   (ii) a molar ratio of the solvent to the diluent is within a range of from 0.2 to 5; or (iii) both (i) and (ii).

8. The electrolyte of claim 1, wherein:
   (i) at least 90% of molecules of the solvent are associated with cations of the active salt;
   (ii) fewer than 10% of molecules of the diluent are associated with cations of the active salt; or
   (iii) both (i) and (ii).

9. The electrolyte of claim 1, wherein the active salt comprises a lithium salt or lithium salts mixture, a sodium salt or sodium salts mixture, a potassium salt or potassium salts mixture, or a magnesium salt or magnesium salts mixture.

10. The electrolyte of claim 1, wherein:
    the active salt is (i) LiFSI, LiTFSI, or a combination thereof, or (ii) NaFSI, NaTFSI, or a combination thereof;
    the solvent comprises trimethyl phosphate, triethyl phosphate, or a combination thereof; and
    the active salt has a molar concentration in the electrolyte within a range of from 0.75 M to 1.5 M.

11. The electrolyte of claim 1, wherein the diluent comprises 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2 -trifluoroethyl ether (TFTFE), methoxynonafluorobutane (MOFB), ethoxynonafluorobutane (EOFB), or any combination thereof.

12. The electrolyte of claim 1, wherein the solvent and the diluent are immiscible, the electrolyte further comprising a bridge solvent having a different composition than the solvent and a different composition than the diluent, wherein the bridge solvent is miscible with the solvent and with the diluent.

13. The electrolyte of claim 12, wherein the bridge solvent comprises acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), or any combination thereof.

14. A battery, comprising:
an electrolyte comprising
   an active salt comprising lithium bis(fluorosulfonyl)imide (LiFSI), lithium bis(trifluoromethanesulfonyl)imide (LiTFSI), lithium bis(pentafluoroethanesulfonyl)imide (LiBETI), sodium bis(fluorosulfonyl)imide (NaFSI), sodium bis(trifluoromethylsulfonyl)imide (NaTFSI), lithium bis(oxalato)borate (LiBOB), sodium bis(oxalato)borate (NaBOB), $LiPF_6$, $LiAsF_6$, $LiBF_4$, $LiCF_3SO_3$ $LiC_1O_4$ lithium difluoro oxalato borate anion (LiDFOB), LiI, LiBr, LiCl, LiSCN, $LiNO_3$ $Li_2SO_4$ or any combination thereof,
   a solvent comprising a flame retardant compound comprising an organic phosphate, an organic phosphite, an organic phosphonate, an organic phosphoramide, a phosphazene, or any combination thereof, wherein the active salt is soluble in the solvent and a molar ratio of the active salt to the solvent is within a range of from 0.7 to 1.5, and
   a diluent comprising a fluoroalkyl ether, wherein the active salt has a solubility in the diluent at least 10 times less than a solubility of the active salt in the solvent, the active salt has a concentration in the electrolyte within a range of 0.75 to 2 M, and the electrolyte comprises at least 5 wt % of the flame retardant compound;
an anode; and
a cathode, wherein the battery has a coulombic efficiency ≤95%.

15. The battery of claim 14, wherein the flame retardant compound comprises trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

16. The battery of claim 14, wherein:
the anode is lithium metal;
the active salt comprises LiFSI, LiTFSI, $LiPF_6$, $LiAsF_6$, $LiBF_4$, $LiCF_3SO_3$, $LiClO_4$, LiBOB, LiDFOB, LiI, LiBr, LiCl, LiSCN, $LiNO_3$, $Li_2SO_4$, or any combination thereof;
the flame retardant compound comprises trimethyl phosphate triethyl phosphate, or a combination thereof:
the diluent comprises TTE, BTFE, TFTFE, MOFB, EOFB, or any combination thereof; and
the cathode is $Li_{1+w}Ni_xMn_yCo_zO_2$ (x+y+z+w=1, 0≤w≤0.25), $LiNi_xMn_yCo_zO_2$ (x+y+z=1), $LiCoO_2$, $LiNi_{0.8}Co_{0.15}Al_{0.05}O_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤y≤1). $Cr_3O_8$, $Cr_2O_5$, a carbon/sulfur composite, or an air electrode.

17. The battery of claim 14, wherein:
the anode is sodium metal;
the active salt comprises NaFSI, NaTFSI, or a combination thereof;
the flame retardant compound comprises trimethyl phosphate, triethyl phosphate, or a combination thereof;
the diluent comprises BTFE, TTE, TFTFE, MOFB, EOFB, or any combination thereof; and
the cathode is $NaFePO_4$, $Na_2FePO_4F$, $Na_2FeP_2O_7$, $Na_3V_2(PO_4)_3$, $Na_3V_2(PO_4)_2F_3$, $NaVPO_4F$, NaVPOPOF, $Na_{1.5}VOPO_4F_{0.5}$, $NaCo_2O_4$, $NaFeO_2$, $Na_xMO_2$ where 0.4<x≤1, and M is a transition metal or a mixture of transition metals, $Na_{2/3}Ni_{1/3}Mn_{2/3}O_2$, $Na_{2/3}Fe_{1/2}Mn_{1/2}O_2$, $Na_{2/3}Ni_{1/6}Co_{1/6}Mn_{2/3}O_2$, $NaNi_{1/3}Fe_{1/3}Mn_{1/3}O_2$, $NaNi_{1/3}Fe_{1/3}CO_{1/3}O_2$, $NaNi_{1/2}Mn_{1/2}O_2$, a Prussian white analogue cathode, or a Prussian blue analogue cathode.

18. The battery of claim 14, wherein the solvent further comprises a cosolvent comprising a carbonate solvent, an ether solvent, dimethyl sulfoxide, or a combination thereof.

19. The battery of claim 14, wherein the solvent and the diluent are immiscible, the electrolyte further comprising a bridge solvent having a different composition than the solvent and a different composition than the diluent, wherein the bridge solvent is miscible with the solvent and with the diluent.

* * * * *